(12) United States Patent
Kong et al.

(10) Patent No.: US 12,103,770 B2
(45) Date of Patent: Oct. 1, 2024

(54) SORTING ROBOT AND SORTING METHOD

(71) Applicant: HAI ROBOTICS CO., LTD., Shenzhen (CN)

(72) Inventors: Zhe Kong, Shenzhen (CN); Yuqi Chen, Shenzhen (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 322 days.

(21) Appl. No.: 17/682,516

(22) Filed: Feb. 28, 2022

(65) Prior Publication Data

US 2022/0185583 A1    Jun. 16, 2022

Related U.S. Application Data

(63) Continuation of application No. PCT/CN2020/112215, filed on Aug. 28, 2020.

(30) Foreign Application Priority Data

Aug. 30, 2019  (CN) .......................... 201910817691.7
Aug. 30, 2019  (CN) .......................... 201910819027.6
Sep. 12, 2019  (CN) .......................... 201910865203.X

(51) Int. Cl.
 *B65G 1/04*  (2006.01)
 *B07C 3/00*  (2006.01)
 (Continued)

(52) U.S. Cl.
 CPC ............ *B65G 1/0435* (2013.01); *B07C 3/008* (2013.01); *B07C 3/08* (2013.01); *B65G 1/137* (2013.01)

(58) Field of Classification Search
 CPC ...... B65G 1/0435; B65G 1/137; B07C 3/008; B07C 3/08
 See application file for complete search history.

(56) References Cited

U.S. PATENT DOCUMENTS

| 4,678,390 A | 7/1987 | Bonneton et al. |
| 2018/0208397 A1 | 7/2018 | Schack et al. |

(Continued)

FOREIGN PATENT DOCUMENTS

| CN | 102341326 A | 2/2012 |
| CN | 202594275 U | 12/2012 |

(Continued)

OTHER PUBLICATIONS

International Search Report for PCT/CN2020/112215.

*Primary Examiner* — Saul Rodriguez
*Assistant Examiner* — Willie W Berry, Jr.
(74) *Attorney, Agent, or Firm* — Frank Gao, Esq.

(57) ABSTRACT

The present invention relates to a sorting robot and a sorting method. The sorting method is applicable to the foregoing sorting robot, where the sorting robot is configured to deliver specific goods to be sorted to a specific sorting position, and a sorting mechanism carrying the specific goods to be sorted corresponds to the specific sorting position. The sorting method includes: S130: the sorting mechanism receiving goods to be sorted; S140: the sorting mechanism being raised or lowered to a height corresponding to the sorting position under drive of a lifting mechanism; and S160: the sorting mechanism performing an action to deliver the goods to be sorted that is placed on the sorting mechanism to the corresponding sorting position.

15 Claims, 35 Drawing Sheets

(51) Int. Cl.
  *B07C 3/08* (2006.01)
  *B65G 1/137* (2006.01)

(56) References Cited

U.S. PATENT DOCUMENTS

2018/0339858 A1* 11/2018 Iwata .................. B65G 1/0435
2019/0352092 A1* 11/2019 Zheng .................... B66F 9/141

FOREIGN PATENT DOCUMENTS

| | | |
|---|---|---|
| CN | 105730956 A | 7/2016 |
| CN | 106477217 A | 3/2017 |
| CN | 106938260 A | 7/2017 |
| CN | 107226310 A | 10/2017 |
| CN | 107380997 A | 11/2017 |
| CN | 107618850 A | 1/2018 |
| CN | 107840059 A | 3/2018 |
| CN | 108069180 A | 5/2018 |
| CN | 108126903 A | 6/2018 |
| CN | 108217038 A | 6/2018 |
| CN | 108313606 A | 7/2018 |
| CN | 108357585 A | 8/2018 |
| CN | 108455157 A | 8/2018 |
| CN | 108584268 A | 9/2018 |
| CN | 208117852 U | 11/2018 |
| CN | 108945918 A | 12/2018 |
| CN | 208249076 U | 12/2018 |
| CN | 109229232 A | 1/2019 |
| CN | 208429497 U | 1/2019 |
| CN | 109383974 A | 2/2019 |
| CN | 109573443 A | 4/2019 |
| CN | 109573449 A | 4/2019 |
| CN | 109720767 A | 5/2019 |
| CN | 109795832 A | 5/2019 |
| CN | 110510315 A | 11/2019 |
| CN | 110589327 A | 12/2019 |
| CN | 110626691 A | 12/2019 |
| CN | 211055925 U | 7/2020 |
| CN | 211637352 U | 10/2020 |
| DE | 3533063 A1 | 3/1987 |
| DE | 102015015127 A1 | 5/2017 |
| DE | 102017112658 A1 | 12/2018 |
| JP | H01203105 A | 8/1989 |
| JP | 2014133654 A | 7/2014 |
| WO | WO2004087542 A1 | 10/2004 |
| WO | WO2012113679 A1 | 8/2012 |
| WO | WO2016031352 A1 | 3/2016 |

* cited by examiner

SORTING ROBOT AND SORTING METHOD

CROSS-REFERENCE TO RELATED APPLICATIONS

This application is a continuation under 35 U.S.C. § 120 of International Patent Application No. PCT/CN/2020/112215, which claims priority to Chinese Patent Application No. 2019108176917 filed on Aug. 30, 2019, Chinese Patent Application No. 201910865203X filed on Sep. 12, 2019, and Chinese Patent Application No. 2019108190276 filed on Aug. 30, 2019, all of which are incorporated herein by reference in their entireties.

TECHNICAL FIELD

The present invention relates to the technical field of intelligent warehousing and logistics, and in particular, to a sorting robot and a sorting method.

BACKGROUND

The rapid development of warehousing logistics has brought more and more convenience to people's lives. As a key link in the warehousing logistics process, the sorting of goods, to a large extent, determines the overall efficiency of warehousing logistics. At present, the sorting of goods is mainly completed manually or by simple mechanical equipment. The disadvantages of manual sorting are high labor intensity and high labor cost, while the simple mechanical equipment, which is basically special equipment, can only disperse goods in specific areas, with low efficiency, occupation of large space, and poor adaptability to different working conditions. The main goods sorting methods at present seriously restrict the overall efficiency of the warehousing logistics process.

SUMMARY

Based on this, it is necessary to provide a sorting robot and a sorting method with low cost, high efficiency, and strong universality to solve the problems of high cost, low efficiency, and poor universality in the existing goods sorting methods.

A sorting robot, including:
a chassis, capable of moving on ground;
a vertical framework, fixedly disposed on the chassis, and disposed along a vertical direction;
a lifting mechanism, capable of rising or falling along a vertical direction relative to the vertical framework;
a sorting mechanism, disposed movably along the vertical direction on the vertical framework, where the sorting mechanism is connected to the lifting mechanism, the sorting mechanism can be raised or lowered along the vertical direction under drive of the lifting mechanism, the sorting mechanism is synchronously raised or lowered with goods to be sorted, and the sorting mechanism can deliver the goods to be sorted to a corresponding sorting position; and
a control center, respectively electrically connected to the chassis, the lifting mechanism, and the sorting mechanism, where the control center is configured to control the chassis, the lifting mechanism, and the sorting mechanism to individually or jointly perform an action.

A sorting method, applicable to the sorting robot, where the sorting robot is configured to deliver specific goods to be sorted to a specific sorting position, and the sorting mechanism carrying the specific goods to be sorted corresponds to the specific sorting position, the sorting method including:
S30: the sorting mechanism receiving the goods to be sorted;
S40: the sorting mechanism being raised or lowered to a height corresponding to the sorting position under drive of the lifting mechanism; and
S60: the sorting mechanism performing an action to deliver the goods to be sorted that is placed on the sorting mechanism to the corresponding sorting position.

According to the foregoing sorting robot and sorting method, the coordination among the chassis, the lifting mechanism, and the sorting mechanism realizes automation of goods sorting, reduces cost of the goods sorting, and greatly improves efficiency of the goods sorting. In addition, the sorting mechanism is moved to different heights under the drive of the lifting mechanism, so as to put the goods to be sorted into the sorting positions of different heights, which has strong universality and reduces the area occupied by the sorting position.

A sorting robot, including:
a chassis, capable of moving on ground;
a vertical framework, disposed on the chassis, and disposed along a vertical direction;
a lifting mechanism, capable of rising or falling along the vertical direction with respect to the vertical framework;
a sorting mechanism, including a plurality of sorting components, where the plurality of sorting components are disposed on the vertical framework at intervals along the vertical direction, the plurality of soiling components are connected to the lifting mechanism, and can be synchronously raised or lowered along the vertical direction under drive of the lifting mechanism, and each of the sorting components can be synchronously raised or lowered while carrying goods to be sorted, and can deliver the goods to be sorted to a corresponding sorting position; and
a control center, electrically connected to each of the chassis, the lifting mechanism and the sorting mechanism, and configured to control the lifting mechanism and the sorting mechanism to perform actions independently or jointly.

A sorting method, applicable to the sorting robot, where the sorting robot is configured to deliver specific goods to be sorted to a specific sorting position, and the sorting component carrying the specific goods to be sorted corresponds to the specific sorting position, the sorting method including:
S10: the plurality of sorting components respectively receiving goods to be sorted;
S30: a designated sorting component being raised or lowered to a height corresponding to the sorting position under drive of the lifting mechanism; and
S50: the designated sorting component performing an action to deliver the goods to be sorted that is placed on the sorting component to the corresponding sorting position.

According to the foregoing sorting robot and sorting method, the coordination among the lifting mechanism and the sorting mechanism realizes automation of goods sorting, reduces cost of the goods sorting, and greatly improves efficiency of the goods sorting. In addition, the sorting mechanism is moved to different heights under drive of the lifting mechanism, so that the goods to be sorted can be delivered to the sorting positions having different heights, which leads to strong universality and a reduction in the occupation of the sorting positions.

A sorting robot, including:
- a chassis, capable of moving on ground;
- a vertical framework, fixedly disposed on the chassis, and disposed along a vertical direction;
- a circulating lifting mechanism, the circulating lifting mechanism is configured on the vertical frame;
- a sorting mechanism, the sorting mechanism includes a sorting support and a sorting action platform, the sorting support is movably configured on the vertical frame, the sorting support is connected with the circulating lifting mechanism, and the sorting Driven by the circulating lifting mechanism, the bracket can be cyclically raised or lowered along the set circulation path; the sorting action platform is configured on the sorting bracket, and the sorting action platform is used to carry the goods to be sorted. When the sorting action platform performs the action, the goods to be sorted are delivered to the corresponding sorting position;
- a control center, electrically connected to each of the chassis, the circulating lifting mechanism, and the sorting mechanism, and used to control the chassis, the circulating lifting mechanism, and the sorting mechanism to perform actions individually or jointly.

A sorting method, applicable to the sorting robot, where the sorting robot is configured to deliver specific goods to be sorted to a specific sorting position, and the sorting action platform carrying the specific goods to be sorted corresponds to the specific sorting position, the sorting method including:
- S10: the sorting action platform receiving the goods to be sorted;
- S30: the sorting action platform being raised or lowered to a height corresponding to the sorting position under drive of the circulating lifting mechanism; and
- S50: the sorting action platform performing an action to deliver the goods to be sorted that is placed on the sorting action platform to a corresponding sorting position.

According to the foregoing sorting robot and sorting method, the coordination among the circulating lifting mechanism and the sorting mechanism realizes automation of goods sorting, reduces cost of the goods sorting, and greatly improves efficiency of the goods sorting. In addition, the sorting mechanism is moved to different heights under drive of the circulating lifting mechanism, so that the goods to be sorted can be delivered to the sorting positions having different heights, which leads to strong universality and a reduction in the occupation of the sorting positions.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Figure 1:
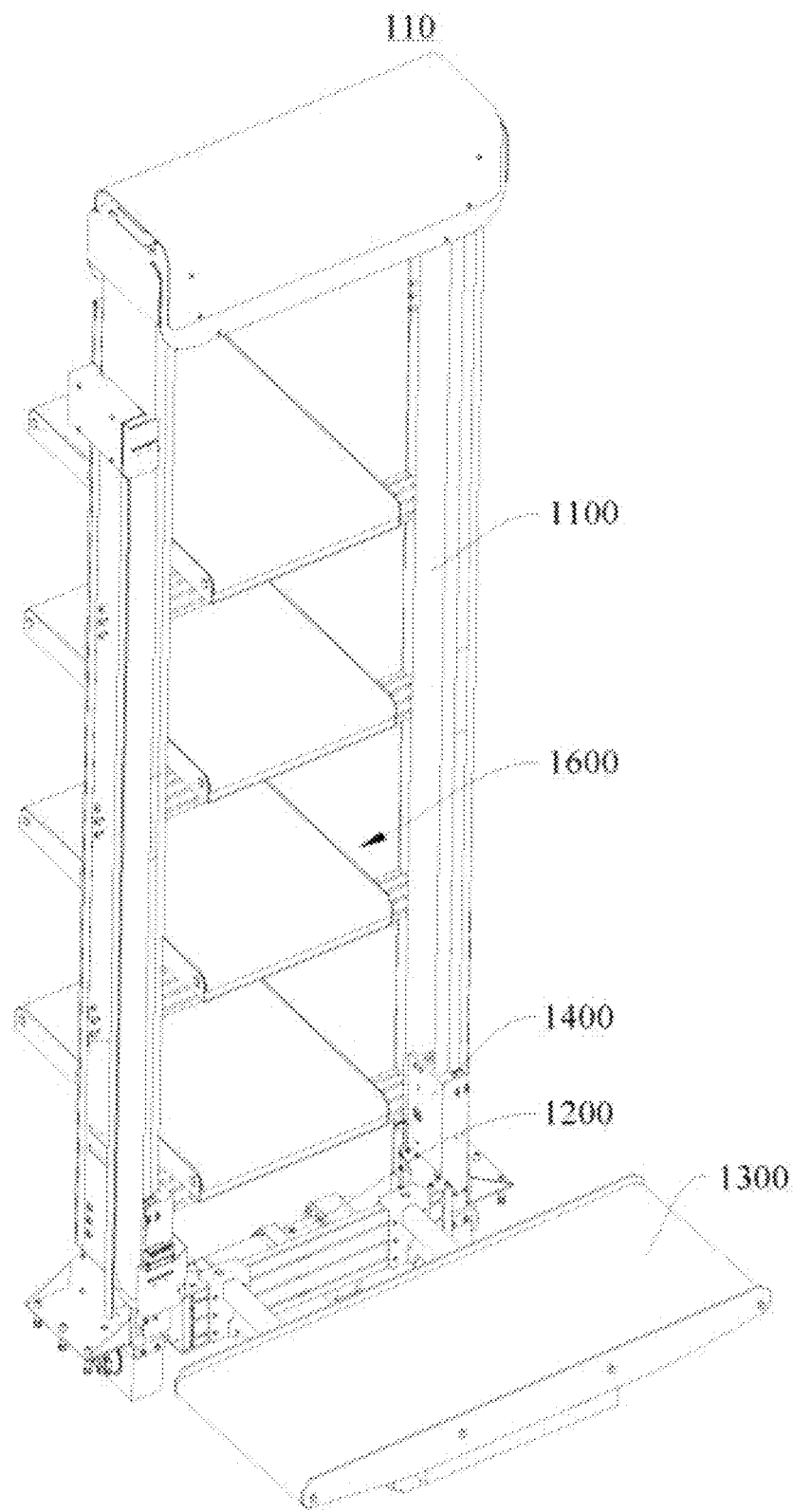
FIG. 1 is a schematic structural diagram of a sorting robot according to an embodiment of the present invention.

In the figures: 110. sorting robot; 1100. vertical framework; 1200. lifting mechanism, 1210. power supply, 1220. transmission component, 1221. hauling rope, 1222. runner, 1230. transmission shaft; 1300. sorting mechanism, 1310. sorting bracket, 1320. sorting action platform, 1321. sorting action frame, 1322. sorting belt; 1330. rotation drive component, 1331. rotation gear, 1332. rotation motor, 1340. horizontal shaft; 1400. guide mechanism, 1410. guide track, 1420. guide component, 1421. guide wheel set, 1422. guide connecting rack; 1500. chassis, 1510. plate frame, 1520. rotating wheel; 1600. storing mechanism, 1610. storing component, 1611. storing bracket, 1612. storing action platform; 180. shelving unit, 1810. sorting position;
210. sorting robot; 2100. vertical frame, 2110. outer frame, 2120. inner frame, 2130. bending suspension; 2200. circulating lifting mechanism, 210. circulating power supply, 2220. circulating transmission component, 2221. circulating hauling rope, 2222. circulating runner, 2230. sprocket wheel mechanism; 2300. sorting mechanism, 2310. sorting bracket, 2320. sorting action platform, 2330. manipulator; 2400. circulating guide mechanism, 2410. guide track, 2411. translational rail, 2412. path rail, 2420. guide component, 2421. translational wheel set, 24211. guide portion, 24212. connecting axial portion, 2422. path wheel set; 2500. chassis, 2510. plate frame, 2520. rotating wheel; 280. shelving unit, 2810. sorting position;

Here, 310. sorting robot; 3100. vertical framework; 3200. lifting mechanism, 3210. power supply, 3220. transmission component, 3221. hauling rope, 3222. runner, 3230. transmission shaft, 3240-lifting frame; 3300-sorting mechanism, 3310-sorting component, 3311-sorting bracket, 3312-sorting action platform, 33121-first sorting position, 33122-second sorting position; 3400-guide mechanism, 3410-guide rail, 3420. guide component; 3500. chassis, 3510. plate frame, 3520. rotating wheel; 3600. rotating mechanism, 3610. ring gear, 3620. rotating track, 3630-rotating slider, 3640. rotating motor; and 380. shelving unit, 3810. sorting position.

DETAILED DESCRIPTION

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

It should be noted that, when a component is referred to as "being fixed to" another component, the component may be directly on the another component, or there may be an intermediate component. When a component is considered to be "connected to" another component, the component may be directly connected to the another component, or an intervening component may also be present. In contrast, when a component is referred to as being "directly on" or "directly connected to" another component, there is no intervening component. In contrast, when a component is referred to as being "directly" connected to another component, there is no intervening component. The terms "vertical", "horizontal", "left", and "right" and similar expressions used in this specification are merely used for the purpose of description.

In the description of the present invention, orientation or position relationships indicated by the terms such as "length", "width", "thickness", "upper", "lower", "front", "back", "left", "right", "top", "bottom", "inner", and "outer" are based on orientation or position relationships shown in the accompanying drawings, and are used only for ease and brevity of illustration and description of the present invention, rather than indicating or implying that the mentioned apparatus or component needs to have a particular orientation or needs to be constructed and operated in a particular orientation. Therefore, such terms should not be construed as limiting of the present invention.

Figure 2:
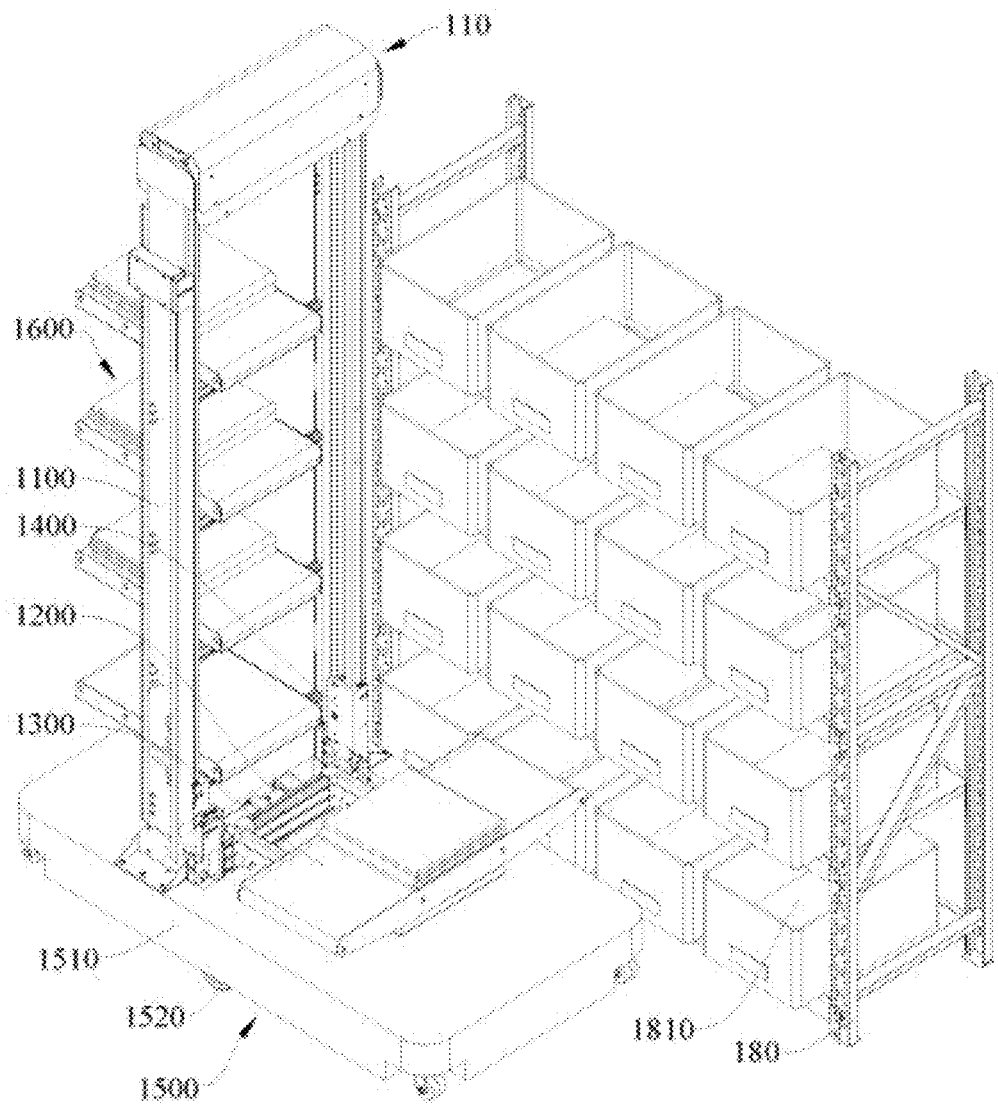
FIG. 2 is a schematic structural diagram of a sorting robot delivering goods to a shelving unit according to an embodiment of the present invention.

As shown in FIG. 1 and FIG. 2, an embodiment of the present invention provides a sorting robot 110. The sorting robot 110 includes a vertical framework 1100, a lifting mechanism 1200, and a sorting mechanism 1300. The vertical framework 1100 is disposed along a vertical direction. The lifting mechanism 1200 can rise or falls along the vertical direction relative to the vertical framework 1100. The sorting mechanism 1300 is disposed movably along the vertical direction on the vertical framework 1100. The sorting mechanism 1300 is connected to the lifting mechanism 1200. The sorting mechanism 1300 can be raised or lowered along the vertical direction under drive of the lifting mechanism 1200. The sorting mechanism 1300 drives goods to be sorted to be synchronously raised or lowered, and the sorting mechanism 1300 can deliver the goods to be sorted to a corresponding sorting position 1810. According to the foregoing sorting machine, coordination between the lifting mechanism 1200 and the sorting mechanism 1300 realizes automation of goods sorting, thereby reducing cost of the goods sorting, and greatly improving efficiency of the goods sorting at the same time. In addition, the sorting mechanism 1300 is moved to different heights under the drive of the lifting mechanism 1200, so as to be capable of putting the goods to be sorted into the sorting positions 1810 of different heights, which has strong universality and reduces the area occupied by the sorting position 1810. The sorting mechanism 1300 that can be raised or lowered is also more suitable for actual working conditions in which the sorting robot 110 receives goods, and the sorting mechanism 1300 can be raised or lowered to a suitable receiving height so as to quickly complete receiving the goods.

Figure 3:
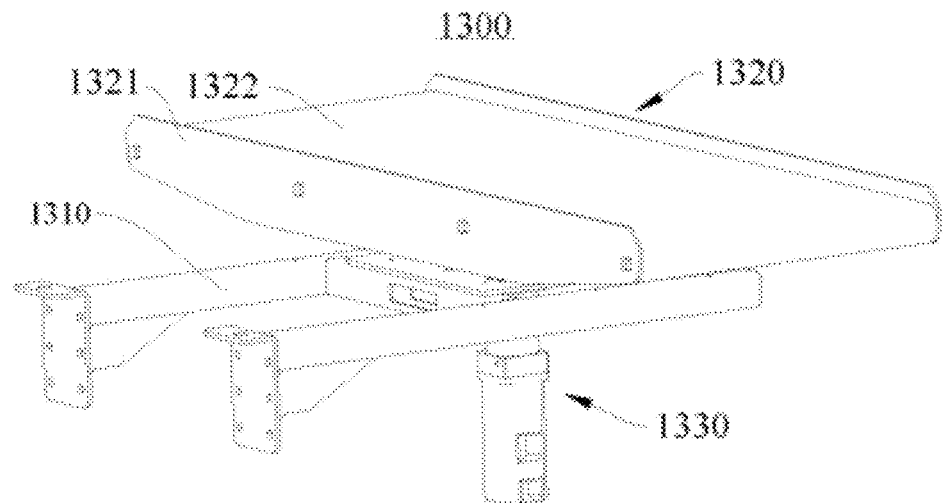
FIG. 3 is a schematic side view of a sorting mechanism according to an embodiment of the present invention.
Figure 4:
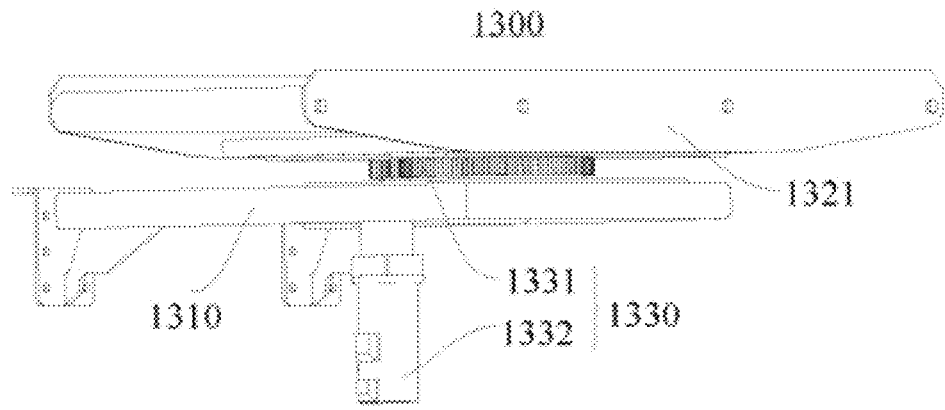
FIG. 4 is a schematic plan view of a sorting mechanism according to an embodiment of the present invention.

The sorting mechanism 1300 is an action execution terminal of the sorting robot 110 provided by the present invention, and a function of the sorting mechanism 1300 is to deliver the goods to be sorted to the corresponding sorting position 1810. Optionally, the sorting mechanism 1300 is a manipulator, a push rod capable of acting, a plane with a conveying function or the like. As shown in FIG. 2 to FIG. 4, in a possible implementation, the sorting mechanism 1300 includes a sorting bracket 1310 and a sorting action platform 1320. The sorting bracket 1310 is disposed movably along the vertical direction on the vertical framework 1100. The sorting bracket 1310 is connected to the lifting mechanism 1200. The sorting bracket 1310 can be raised or lowered along the vertical direction under the drive of the lifting mechanism 1200. The sorting action platform 1320 is disposed on the sorting bracket 1310, the sorting action platform 1320 can carry the goods to be sorted, and the sorting action platform 1320 delivers the goods to be sorted to the corresponding sorting position 1810 when performing an action. Structure manners of the sorting bracket 1310 and the sorting action platform 1320 are convenient for carrying the goods to be sorted, and the sorting action platform 1320 has strong adaptability to goods in different sizes or different weights, which can ensure safe sorting of volatile and fragile goods at the same time.

Optionally, when the sorting action platform 1320 performs a sorting action, a platform surface action of the sorting action platform 1320 or any other action mechanism delivers the goods to be sorted to the corresponding sorting position 1810. In an embodiment of the present invention, as shown in FIG. 3, the sorting action platform 1320 includes a sorting action frame 1321, a sorting belt 1322, and a sorting drive component. The sorting action frame 1321 is disposed on the sorting bracket 1310, the sorting drive component is disposed on the sorting action frame 1321, the sorting belt 1322 is disposed rotatably on the sorting action frame 1321, and the sorting belt 1322 is in transmission connection with the sorting drive component. The sorting belt 1322 is configured to carry the goods to be sorted. The sorting belt 1322 delivers the goods to be sorted to the corresponding sorting position 1810 when rotating under drive of the sorting drive component. A supporting surface for the goods to be sorted is formed on an upper surface of a rotating sorting belt 1322, and a sorting action performed by the sorting action platform 1320 is rotation of the sorting belt 1322. By adopting the sorting action frame 1321, the sorting belt 1322, and the sorting drive component, the sorting action platform 1320 does not need to occupy extra action space when performing the sorting action, and the sorting belt 1322 has advantages such as stable performance, low cost, and easy replacement. In some others embodiment of the present invention, goods placed on the sorting action platform 1320 may be pushed to the sorting position 1810 by an elastic mechanism, or pushed to the sorting position 1810 by a cam mechanism; or the platform surface of the sorting action platform 1320 is formed by a plurality of rotatable rollers. The present invention does not limit a specific structural form of the sorting action platform 1320.

A function of the sorting drive component is to drive the sorting belt 1322 to perform rotation of a set process, so as to deliver the goods to be sorted thereon to the corresponding sorting position 1810, thereby completing the sorting action for the goods. In a possible implementation, the sorting drive component includes a sorting motor and two sorting action shafts. The two sorting shafts are disposed at intervals on the sorting action frame 1321. The sorting belt 1322 is sleeved on the two sorting shafts. At least one of the sorting shafts is in transmission connection with the sorting motor, and the sorting motor can rotate forward or reverse. The combination manner between the motor and the sorting shaft has advantages such as high transmission efficiency, easy control, mature technology, and low cost. Further, an output shaft of the motor is directly connected to the sorting shaft or in transmission connection with the sorting shaft through a gear structure. In an embodiment of the present invention, the motor is a stepper motor. In another possible implementation, the sorting drive component is in a form of combination of an air motor and a rotating shaft or a driving form of a hydraulic motor and a rotating shaft, as long as the sorting belt 1322 can be driven to rotate.

The sorting action platform 1320 can deliver the goods to be sorted to the sorting position 1810 located at its own delivery end. In an embodiment of the present invention, as shown in FIG. 3 to FIG. 4, the sorting action platform 1320 is disposed rotatably on the sorting bracket 1310, and the sorting action platform 1320 can rotate relative to the sorting bracket 1310 in a horizontal plane. Specifically, the sorting action frame 1321 is disposed rotatably on the sorting bracket 1310, and the sorting belt 1322 and the sorting drive component synchronously rotate with the sorting bracket 1310. When the sorting position 1810 is not directly located at a delivery end of the sorting action platform 1320, the sorting action platform 1320 can adjust the delivery end to face the sorting position 1810 by its own rotation, thereby avoiding overall rotation of the sorting robot 110, and greatly improving sorting efficiency of the sorting robot 110. In addition, the sorting action platform 1320 can, when receiving goods, enhance adaptability to receiving conditions by its own rotation, which greatly improves receiving efficiency of the sorting robot 110.

In a possible implementation, as shown in FIG. 3 to FIG. 4, the sorting mechanism 1300 further includes a rotation drive component 1330, the rotation drive component 1330 is disposed on the sorting bracket 1310, and the rotation drive component 1330 is in transmission connection with the sorting action frame 1321 of the sorting action platform 1320. The sorting action platform 1320 can integrally rotate relative to the sorting bracket 1310 in a horizontal plane under drive of the rotation drive component 1330. In a specific embodiment of the present invention, the rotation drive component 1330 includes a rotation gear 1331 disposed on a bottom of the sorting action frame 1321 and a rotation motor 1332 fixedly installed on the sorting bracket 1310. An output shaft of the rotation motor 1332 is in transmission connection with the rotation gear 1331, thereby driving the sorting action platform 1320 to rotate. In an embodiment of the present invention, the sorting robot 110 further includes a storing mechanism 1600, the storing mechanism 1600 is disposed on the vertical framework 1100, and the storing mechanism 1600 is configured to store the goods to be sorted. The storing mechanism 1600 conveys the goods to be sorted to the sorting mechanism 1300 when performing an action, or the sorting mechanism 1300 can convey the goods to the storing mechanism 1600. The storing mechanism 1600 can temporarily store the goods to be sorted, which improves ability of the sorting robot 110 to carry goods.

When the goods to be sorted stored in the storing mechanism 1600 need to be delivered, the storing mechanism 1600 first conveys the goods to be sorted to the sorting action platform 1320 of the sorting mechanism 1300, and then the sorting action platform 1320 performs a delivery action. Further, the storing mechanism 1600 includes a plurality of storing components 1610, and the plurality of storing components 1610 are disposed at intervals on the vertical framework 1100 along the vertical direction. The storing component 1610 conveys the goods to be sorted to the sorting mechanism 1300 when performing an action, and the sorting mechanism 1300 can deliver the goods to be sorted to the corresponding sorting position 1810, or the sorting mechanism 1300 can convey the goods to the corresponding storing component 1610. The plurality of storing components 1610 further increase a quantity of the goods to be sorted carried by the sorting robot 110 provided by this embodiment at a time, which significantly improves the sorting efficiency of the sorting robot 110.

Figure 5:
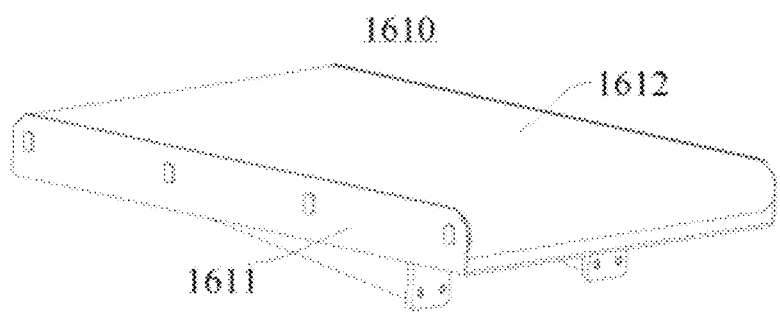
FIG. 5 is a schematic structural diagram of a storing component according to an embodiment of the present invention.

Optionally, the storing component 1610 is a manipulator, a push rod capable of acting, a plane with a conveying function or the like. In a possible implementation, as shown in FIG. 1, FIG. 2, and FIG. 5, the storing component 1610 includes a storing bracket 1611 and a storing action platform 1612. The storing bracket 1611 is fixedly disposed on the vertical framework 1100, the storing action platform 1612 is disposed on the storing bracket 1611, the storing action platform 1612 can store the goods to be sorted, and the storing action platform 1612 conveys the goods to be sorted to the sorting mechanism 1300 when performing an action. Structure manners of the storing bracket 1611 and the storing action platform 1612 are convenient for carrying the goods to be sorted, and the storing action platform 1612 has strong adaptability to goods in different sizes or different weights, which can ensure safe storing for volatile and fragile goods at the same time.

Optionally, when the storing action platform 1612 performs a convey action, a platform surface action of the storing action platform 1612 or any other action mechanism conveys the goods to be sorted to the sorting mechanism 1300. In an embodiment of the present invention, the storing action platform 1612 includes a storing belt and a storing drive component. The storing drive component is disposed on the storing bracket 1611. The storing belt is disposed rotatably on the storing bracket 1611. The storing belt is in transmission connection with the storing drive component. The storing belt is configured to carry goods to be stored. The storing belt conveys the goods to be stored to the sorting mechanism 1300 when rotating under the drive of the storing drive component. A supporting surface for the goods to be sorted is formed on an upper surface of the rotating storing belt, and convey action performed by the storing action platform 1612 is rotation of the storing belt. By using a manner of the storing belt and the storing drive component, the storing action platform 1612 does not need to occupy extra action space when performing the convey action, and the storing belt has advantages such as stable performance, low cost, and easy replacement. In some other embodiments of the present invention, goods placed on the storing action platform 1612 may be pushed to the sorting mechanism 1300 by an elastic mechanism, or pushed to the sorting mechanism 1300 by a cam mechanism; or the platform surface of the storing action platform 1612 is formed by a plurality of rotatable rollers. The present invention does not limit the specific structural form of the storing action platform 1612.

A function of the storing drive component is to drive the storing belt to perform rotation of a set process, so as to deliver the goods to be sorted thereon to the sorting mechanism 1300. In a possible implementation, the storing drive component includes a storing motor and two storing shafts. The two storing shafts are disposed at intervals on the storing bracket 1611. The storing belt is sleeved on the two storing shafts. At least one of the storing shafts is in transmission connection with the storing motor, and the storing motor can rotate forward or reverse. Combination of a motor and a storing shaft has advantages such as high transmission efficiency, easy control, mature technology, and low cost. Further, an output shaft of the motor is directly connected to the storing shaft or is in transmission connection with the storing shaft through a gear structure. In an embodiment of the present invention, the motor is a stepper motor. In another possible implementation, the storing drive component is in a form of combination of an air motor and a rotating shaft or a driving form of a hydraulic motor and a rotating shaft, as long as the storing belt can be driven to rotate.

Further, a photographing component is further installed on the sorting mechanism 1300. The photographing component is configured to obtain image information of goods or the sorting position 1810, so as to determine a height of the sorting action platform 1320 relative to the sorting position 1810, or determine a height of the sorting action platform 1320 relative to the storing action platform 1612. In this embodiment, the image information is a two-dimensional code affixed to the goods to be sorted or the sorting position 1810.

Figure 9:
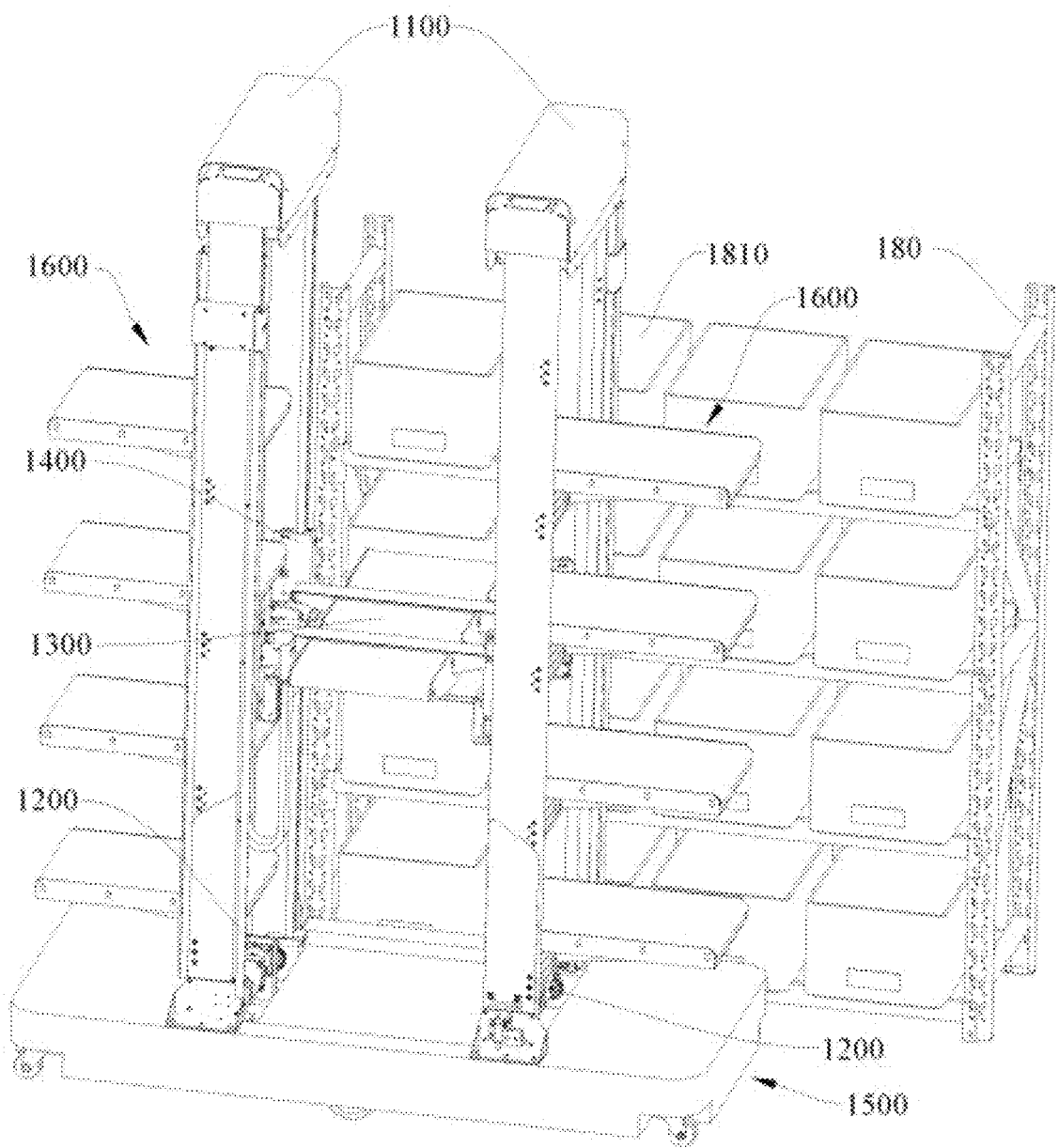
FIG. 9 is a schematic structural diagram of a sorting system according to an embodiment of the present invention.

In an embodiment of the present invention, as shown in FIG. 9, the sorting robot 110 includes two sets of vertical frameworks 1100 and two sets of storing mechanisms 1600. The two sets of vertical frameworks 1100 are spaced apart from each other. The two sets of storing mechanisms 1600 are respectively disposed on opposite sides of the two sets of vertical frameworks 1100. The sorting mechanism 1300 is disposed movably between the two sets of vertical frameworks 1100. The sorting mechanism 1300 can be raised or lowered along the vertical direction under the drive of the lifting mechanism 1200. The two sets of storing mechanisms 1600 further increase a quantity of the goods to be sorted carried by the sorting robot 110 provided in this embodiment at a time, which can significantly improve the sorting efficiency of the sorting robot 110. Further, the sorting robot 110 includes two sets of lifting mechanisms 1200. Each set of lifting mechanisms 1200 is separately disposed on a set of vertical frameworks 1100. The two sets of lifting mechanisms 1200 are respectively connected to two ends of the sorting mechanism 1300 near the vertical frameworks 1100. The sorting mechanism 1300 can be raised or lowered along the vertical direction under the drive of the two sets of lifting mechanisms 1200. The two sets of lifting mechanisms 1200 improve lifting stability of the sorting mechanism 1300.

Figure 6:
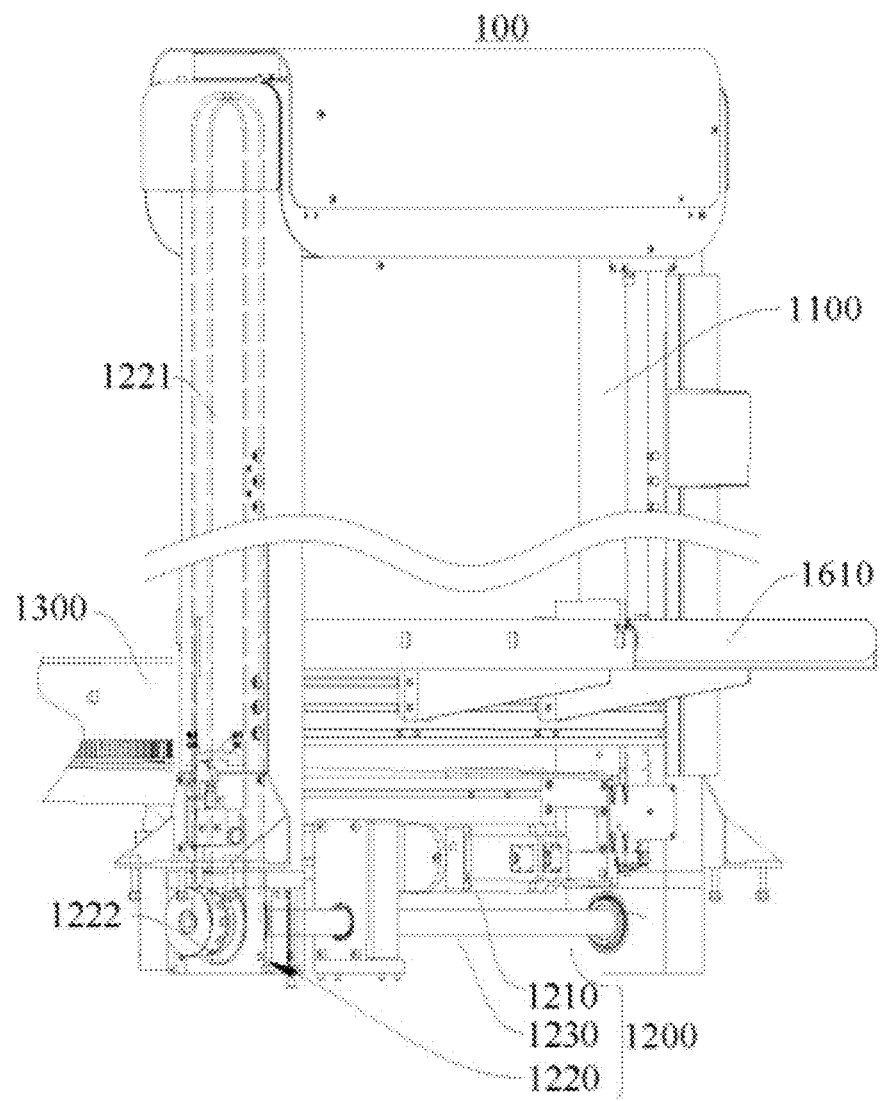
FIG. 6 is a schematic diagram of a sorting robot with a specific lifting mechanism according to an embodiment of the present invention.
Figure 7:
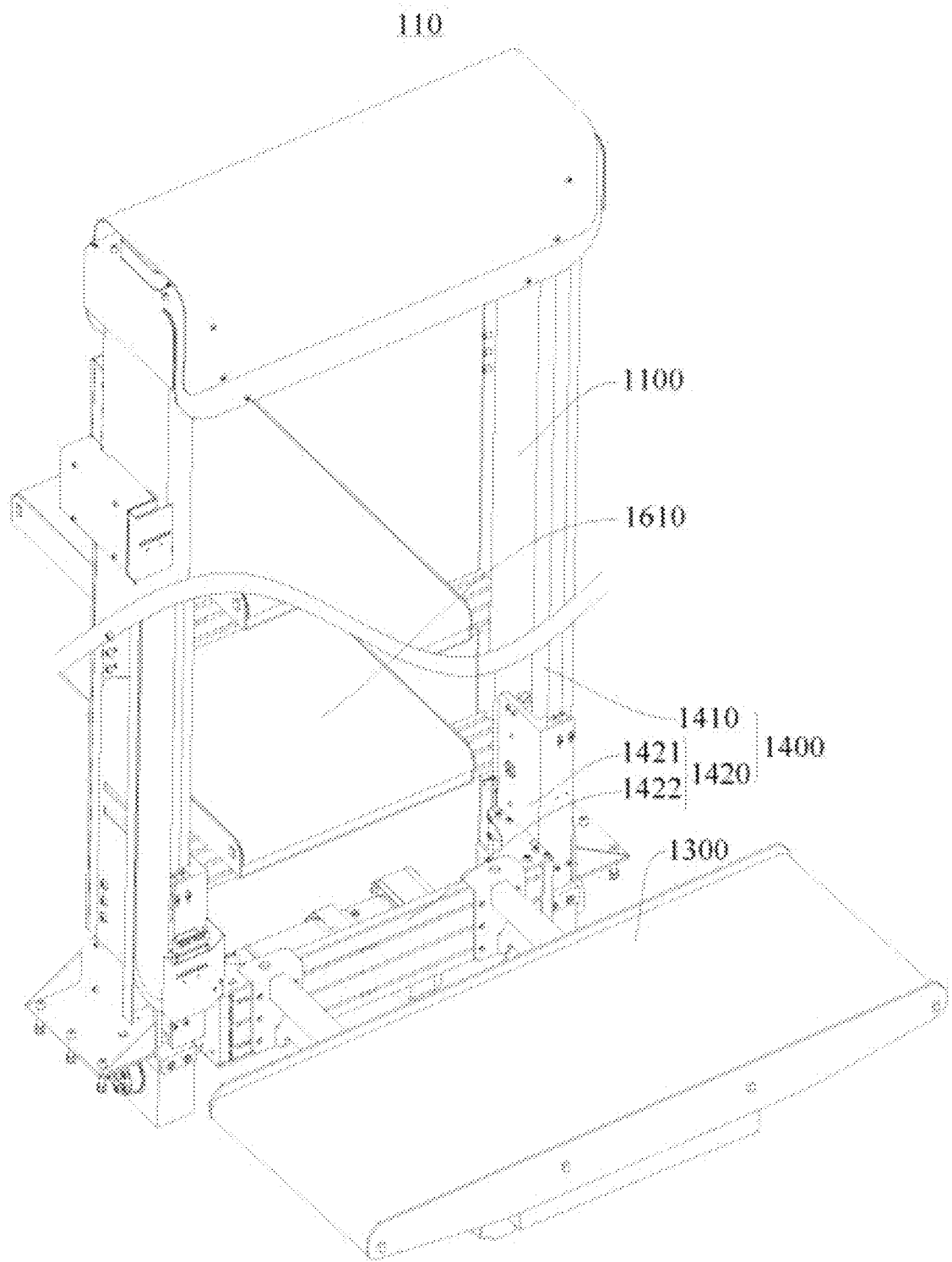
FIG. 7 is a schematic diagram of a sorting robot with a specific guide mechanism according to an embodiment of the present invention.

A function of the lifting mechanism 1200 is to drive the sorting mechanism 1300 in the foregoing embodiments to be raised or lowered along the vertical direction. In an embodiment of the present invention, as shown in FIG. 6 to FIG. 7, the lifting mechanism 1200 includes a power supply 1210 and a transmission component 1220. The power supply 1210 and the transmission component 1220 are respectively disposed on the vertical framework 1100. The power supply 1210 is in transmission connection with an input side of the transmission component 1220. An output side of the transmission component 1220 is in transmission connection with the sorting mechanism 1300. The power supply 1210 and the transmission component 1220 are respectively disposed on the vertical framework 1100, and the transmission connection between the power supply 1210 and the transmission component 1220 facilitates mounting or removal of the lifting mechanism 1200 on the vertical framework 1100. Optionally, the power supply 1210 outputs power in a form of rotation, linear motion, or any other form of motion, and the transmission component 1220 in transmission connection with the power supply 1210 finally outputs motion along the vertical direction. In a possible implementation, the power supply 1210 includes a drive motor. The drive motor is in transmission connection with the input side of the transmission component 1220. The power supply 1210 in the form of a motor operates more stably. Further, the drive motor can rotate forward or reverse, which is convenient for controlling a rising and falling process of the lifting mechanism 1200.

In a possible implementation, as shown in FIG. 6 to FIG. 7, the transmission component 1220 includes a hauling rope 1221 and at least two runners 1222. The at least two runners 1222 are disposed rotatably on the vertical framework 1100. The at least two runners 1222 are disposed at intervals on the vertical framework 1100 along the vertical direction. At least one runner 1222 is in transmission connection with the power supply 1210. The hauling rope 1221 is sleeved on the at least two runners 1222, and the hauling rope 1221 is fixedly connected to the sorting mechanism 1300. At least one runner 1222 drives the hauling rope 1221 to move by meshing or friction when rotating, thereby driving the sorting mechanism 1300 to be raised or lowered along the vertical direction. The transmission component 1220 in a form of the hauling rope 1221 and the runner 1222 has advantages such as simple structure, stable performance, low cost, and easy replacement while realizing rising and falling. In this embodiment, the sorting bracket 1310 is fixedly connected to the hauling rope 1221.

In a specific embodiment of the present invention, as shown in FIG. 6, the hauling rope 1221 is annular, and the sorting bracket 1310 is fixedly installed on the hauling rope 1221. The two runners 1222 are disposed at intervals on the vertical framework 1100 along the vertical direction, and the hauling rope 1221 is sleeved on the two runners 1222 disposed along the vertical direction. Any of the runners 1222 drives the hauling rope 1221 to rotate in a vertical plane by friction or meshing when rotating, thereby driving the sorting mechanism 1300 to be raised or lowered in the vertical plane. The runner 1222 is a V-belt wheel, and the hauling rope 1221 is a V-belt. The V-belt wheel drives the V-belt to move by friction when rotating. According to an actual situation, the runner 1222 may further be a sprocket. Correspondingly, the hauling rope 1221 may be a chain. The sprocket drives the chain to move by meshing when rotating. An output shaft of the drive motor is in transmission connection with one or more V-belt wheels, and the drive motor drives the runner 1222 and the hauling rope 1221 to rotate.

Specifically, in the foregoing embodiment, as shown in FIG. 6, the lifting mechanism 1200 includes two sets of transmission components 1220. The two sets of transmission components 1220 are respectively installed on the vertical framework 1100 along the vertical direction, and output sides of the two sets of transmission components 1220 are respectively fixedly connected to two ends of the sorting bracket 1310. The transmission component 1220 further includes a transmission shaft 1230. An output end of the drive motor is in transmission connection with the middle part of the transmission shaft 1230, and two ends of the transmission shaft 1230 are respectively connected to input ends of the two sets of transmission components 1220, thereby realizing driving the two sets of transmission components 1220 to be synchronously raised or lowered by one power supply 1210, and enhancing lifting stability of the lifting mechanism 1200. Further, the lifting mechanism 1200 includes a plurality of power supplies 1210 and a plurality of sets of transmission components 1220. Each set of transmission components 1220 is driven by a separate power supply 1210, and an output side of each set of transmission components 1220 is respectively in transmission connection with the sorting mechanism 1300.

In an embodiment of the present invention, as shown in FIG. 7, the sorting robot 110 further includes a guide mechanism 1400. The guide mechanism 1400 is disposed on the vertical framework 1100, the guide mechanism 1400 is connected to the sorting mechanism 1300, and the guide mechanism 1400 is configured to keep the sorting mechanism 1300 being smoothly raised or lowered along the vertical direction. Specifically, the guide mechanism 1400 includes a guide rail 1410 and a guide component 1420. The guide rail 1410 is fixedly disposed on the vertical framework 1100 along the vertical direction, the guide component 1420 is fixedly connected to the sorting mechanism 1300, and the guide component 1420 keeps in contact with the guide rail 1410 as the sorting mechanism 1300 is raised or lowered along the vertical direction. Optionally, contact between the guide component 1420 and the guide rail 1410 is rolling contact, sliding contact, or other kinds of contact. Further, the guide component 1420 includes a guide wheel set 1421 and a guide connecting rack 1422. The guide wheel set 1421 is disposed rotatably on the guide connecting rack 1422, and the guide connecting rack 1422 is fixedly connected to the sorting mechanism 1300. The guide wheel set 1421 keeps in rolling contact with the guide rail 1410 as the sorting mechanism 1300 is raised or lowered along the vertical direction.

In an embodiment of the present invention, as shown in FIG. 7 and FIG. 9, the guide mechanism 1400 includes a plurality of guide rails 1410 and a plurality of sets of guide components 1420. The plurality of guide rails 1410 are matched with the plurality of sets of guide components 1420 one by one. The plurality of guide rails 1410 are respectively fixedly configured on the vertical framework 1100 along the vertical direction. Each set of guide components 1420 is respectively fixedly connected to the sorting mechanism 1300. Each set of guide components 1420 respectively keeps in contact with a corresponding guide rail 1410 as the sorting mechanism 1300 is raised or lowered along the vertical direction. The plurality of guide rails 1410 and the plurality of sets of guide components 1420 further ensure that the sorting mechanism 1300 is smoothly raised or lowered along the vertical direction. It is to be understood that the vertical framework 1100 in the present invention may be a closed framework structure, or an open framework structure extending along a vertical direction as a whole. In a possible implementation, the vertical framework 1100 has two uprights disposed in parallel along the vertical direction, and guide rails 1410 are respectively installed on the two uprights. The guide rail 1410 is formed by group welding of sheet material and section bar.

Figure 8:
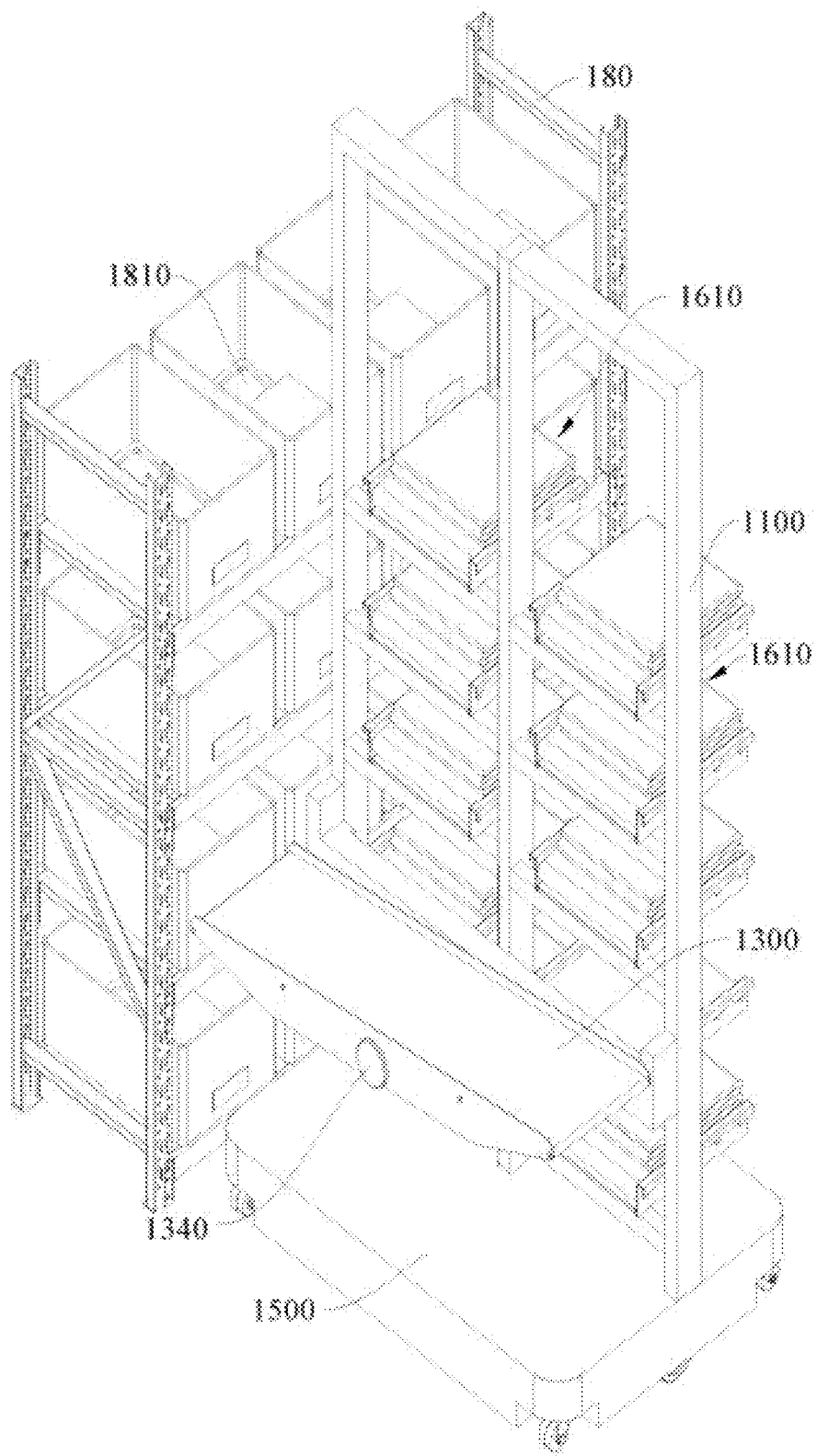
FIG. 8 is a schematic structural diagram of a sorting system according to another embodiment of the present invention.

As shown in FIG. 1, FIG. 8, and FIG. 9, the sorting robot 110 further includes a movable chassis 1500, and the vertical framework 1100 is disposed on the chassis 1500. The movable chassis 1500 may drive the sorting robot 110 to move, which greatly improves adaptability of the sorting robot 110 in this embodiment to actual working conditions. Specifically, the chassis 1500 includes a plate frame 1510, a marching drive component, and a plurality of rotating wheels 1520. The vertical framework 1100 is disposed on an upper part of the plate frame 1510, the plurality of rotating wheels 1520 are disposed on a bottom of the plate frame 1510, and the marching drive component is disposed on the plate frame 1510. At least one rotating wheel 1520 is in transmission connection with the marching drive component. Further, at least two rotating wheels 1520 are respectively in transmission connection with the marching drive component, and the at least two rotating wheels 1520 respectively in transmission connection with the marching drive component are distributed on two sides of the plate frame 1510 along a marching direction, thereby realizing a steering function of the chassis 1500. The marching drive component includes at least two wheel drive motors, and the at least two rotating wheels 1520 distributed on the two sides of the plate frame 1510 along the marching direction are respectively driven by separate wheel drive motors. The at least two rotating wheels 1520 distributed on the two sides of the plate frame 1510 along the marching direction are respectively driven by the separate wheel drive motors, which may simplify a transmission structure on the chassis 1500.

In a specific embodiment, a driving wheel and a driven wheel are installed on the chassis 1500. The driving wheel and the driven wheel may respectively rotate relative to the chassis 1500. The driving wheel and the driven wheel jointly support the chassis 1500. The driving wheel is driven by a wheel drive motor to make the chassis 1500 to move. By configuring the movable chassis 1500, the sorting robot 110 may deliver goods among a plurality of goods shelves 180. The number of the driving wheels is two, and the two driving wheels are symmetrically distributed. Correspondingly, the number of the wheel drive motors is two. The two driving wheels are respectively driven by the two wheel drive motors, which may enable rotation speed of the two driving wheels to be different, so as to realize steering of the chassis 1500. The number of the driven wheels is four, and the four driven wheels are distributed in a rectangular shape. The driven wheel may be a universal wheel or any other wheel structures with a steering function. According to an actual situation, the number of the driven wheels is not limited to four, but may further be six, three, or the like.

In this embodiment, a guide apparatus (not shown) is further installed on the chassis 1500, and the guide apparatus is a camera, which is configured to identify a graphic code attached to the ground, so that the chassis 1500 can march along a preset path. The graphic code may be a two-dimensional code, a barcode, or some customized identification codes. In some other embodiments, the guide apparatus is a laser guide apparatus, configured to guide the chassis 1500 to march along a laser beam; or the guide apparatus is a short-wave receiving apparatus, which receives a preset short-wave signal to guide the chassis 1500 to march along a preset path. It should be noted that, in some other embodiments, the chassis 1500 may be omitted. The vertical framework 1100 is directly fixedly installed on the ground or other platforms, and is only configured to carry goods on the shelving unit 180 around the vertical framework 1100.

In an embodiment of the present invention, the sorting robot 110 further includes a control center. The control center is respectively electrically connected to the chassis 1500, the lifting mechanism 1200, the storing mechanism 1600, and the sorting mechanism 1300. The control center is configured to control the chassis 1500, the lifting mechanism 1200, the storing mechanism 1600, and the sorting mechanism 1300 to individually or jointly perform an action, thereby ensuring sorting efficiency of the sorting robot 110.

As shown in FIG. 8, in an embodiment of the present invention, a plurality of storing components 1610 are disposed in a plurality of columns on the vertical framework 1100, and the sorting mechanism 1300 may simultaneously correspond to a plurality of storing components 1610 at a same height when being raised or lowered. The sorting mechanism 1300 can flip around an axis in a horizontal direction at a set angle. The sorting mechanism 1300 can deliver the goods to be sorted to a corresponding sorting position 1810 when flipping around a horizontal axis 1340 at the set angle. The plurality of storing components 1610 are disposed in a plurality of columns on the vertical framework 1100, which greatly increases the quantity of goods stored by the sorting robot 110 at a time, and improves the sorting efficiency of the sorting robot 110 as a whole.

An embodiment of the present invention further provides a sorting system. As shown in FIG. 1, FIG. 8, and FIG. 9, the sorting system includes the shelving unit 180 and the sorting robot 110 described in the foregoing embodiments. The sorting robot 110 is configured to deliver the goods to be sorted to the corresponding sorting position 1810 on the shelving unit 180. The sorting system provided in this embodiment has the same advantages as the sorting robot 110 in the foregoing embodiments. In a possible implementation, an open container is placed on the shelving unit 180, and one container is one sorting position 1810. Further, the shelving unit 180 has at least two sorting positions 1810 of different heights. The sorting mechanism 1300 can be raised or lowered to a height of a corresponding sorting position 1810 under the drive of the lifting mechanism 1200. The sorting mechanism 1300 can deliver the goods to be sorted to the corresponding sorting position 1810.

As shown in FIG. 1, FIG. 8, and FIG. 9, an embodiment of the present invention provides a sorting robot 110. The sorting robot 110 includes the chassis 1500, the vertical framework 1100, the lifting mechanism 1200, the sorting mechanism 1300, and the control center. The chassis 1500 can move on ground. The vertical framework 1100 is fixedly disposed on the chassis 1500, and the vertical framework 1100 is disposed along the vertical direction. The lifting mechanism 1200 can rise or fall along the vertical direction relative to the vertical framework 1100. The sorting mechanism 1300 is disposed movably along the vertical direction on the vertical framework 1100. The sorting mechanism 1300 is connected to the lifting mechanism 1200. The sorting mechanism 1300 can be raised or lowered along the vertical direction under drive of the lifting mechanism 1200. The sorting mechanism 1300 drives goods to be sorted to be synchronously raised or lowered, and the sorting mechanism 1300 can deliver the goods to be sorted to a corresponding sorting position 1810. The control center is respectively electrically connected to the chassis 1500, the lifting mechanism 1200, and the sorting mechanism 1300. The control center is configured to control the chassis 1500, the lifting mechanism 1200, and the sorting mechanism 1300 to individually or jointly perform an action. According to the foregoing sorting robot 110, coordination among the chassis 1500, the lifting mechanism 1200, and the sorting mechanism 1300 realizes automation of goods sorting, reduces cost of the goods sorting, and greatly improves efficiency of the goods sorting. In addition, the sorting mechanism 1300 is moved to different heights under the drive of the lifting mechanism 1200, so as to put the goods to be sorted into the sorting positions 1810 of different heights, which has strong universality and reduces the area occupied by the sorting position 1810.

Figure 10:
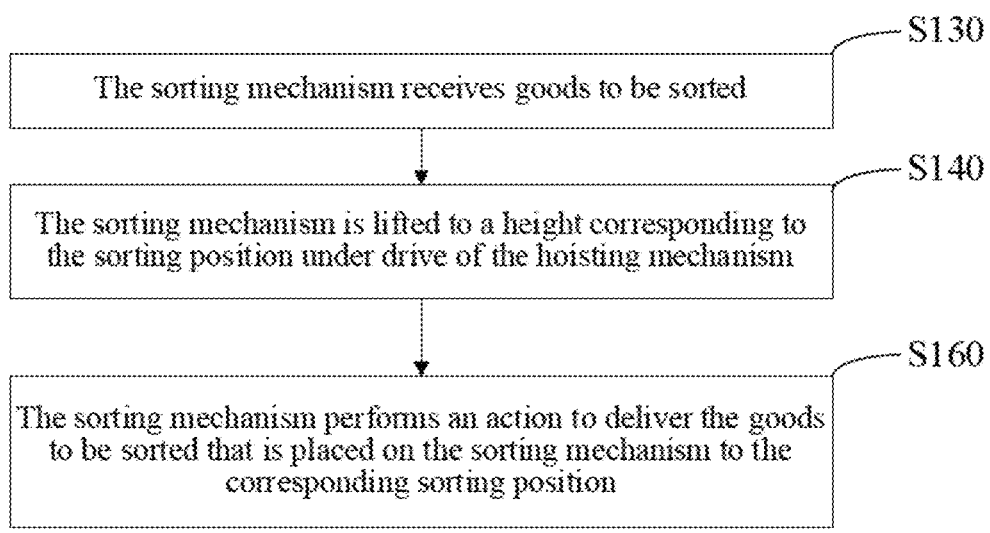
FIG. 10 is a sorting method according to an embodiment of the present invention.

An embodiment of the present invention further provides a sorting method, which is applicable to the sorting robot described in the foregoing solutions. The sorting robot is configured to deliver specific goods to be sorted to a specific sorting position, and the sorting mechanism carrying the specific goods to be sorted corresponds to the specific sorting position, as shown in FIG. 10, the sorting method includes:

S130: the sorting mechanism receiving the goods to be sorted;

S140: the sorting mechanism being raised or lowered to a height corresponding to the sorting position under drive of the lifting mechanism; and S160: the sorting mechanism performing an action to deliver the goods to be sorted that is placed on the sorting mechanism to the corresponding sorting position.

According to the foregoing sorting method, the coordination among the chassis, the lifting mechanism, and the sorting mechanism realizes automation of goods sorting, reduces cost of the goods sorting, and greatly improves efficiency of the goods sorting. In addition, the sorting mechanism is moved to different heights under the drive of the lifting mechanism, so as to put the goods to be sorted into the sorting positions of different heights, which has strong universality and reduces the area occupied by the sorting position.

In a possible implementation, each part of the sorting robot performs actions in a coordinated manner under the control of the control center, and the control center of the sorting robot keeps a communication connection with an external server. The sorting robot can identify information of the goods to be sorted, and the sorting robot can obtain information of the sorting position corresponding to each of the goods to be sorted. The sorting robot coordinates and controls various parts according to the obtained information, to efficiently complete the sorting of goods. According to the sorting robot and the sorting method provided in the foregoing embodiments, the sorting mechanism performs a delivery action only after the information of the goods to be sorted carried by the sorting mechanism corresponds to the information of the sorting position.

Figure 11:
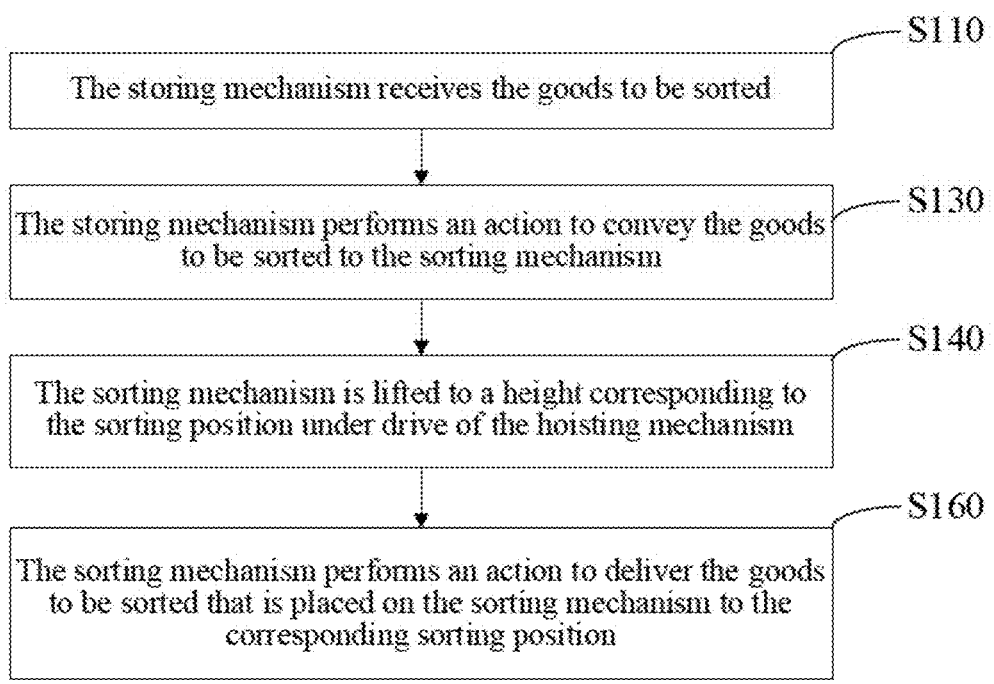
FIG. 11 is a sorting method according to another embodiment of the present invention.

In an embodiment of the present invention, in order to further improve the sorting efficiency of the sorting robot, the sorting robot further includes a storing mechanism. The storing mechanism is disposed on the vertical framework, the storing mechanism is configured to store the goods to be sorted, and the storing mechanism conveys the goods to be sorted to the sorting mechanism when performing an action, or the sorting mechanism can convey the goods to the storing mechanism. As shown in FIG. 11, before the step S130, the sorting method further includes step S110: the storing mechanism receiving the goods to be sorted; and in the step S130, the storing mechanism performs an action to convey the goods to be sorted to the sorting mechanism. The storing mechanism that can store the goods to be sorted increases a quantity of the goods to be sorted carried by the sorting robot and the sorting method in this embodiment at a time, reduces delivery time of a single one of goods to be sorted, and improves the sorting efficiency of the sorting robot.

Figure 12:
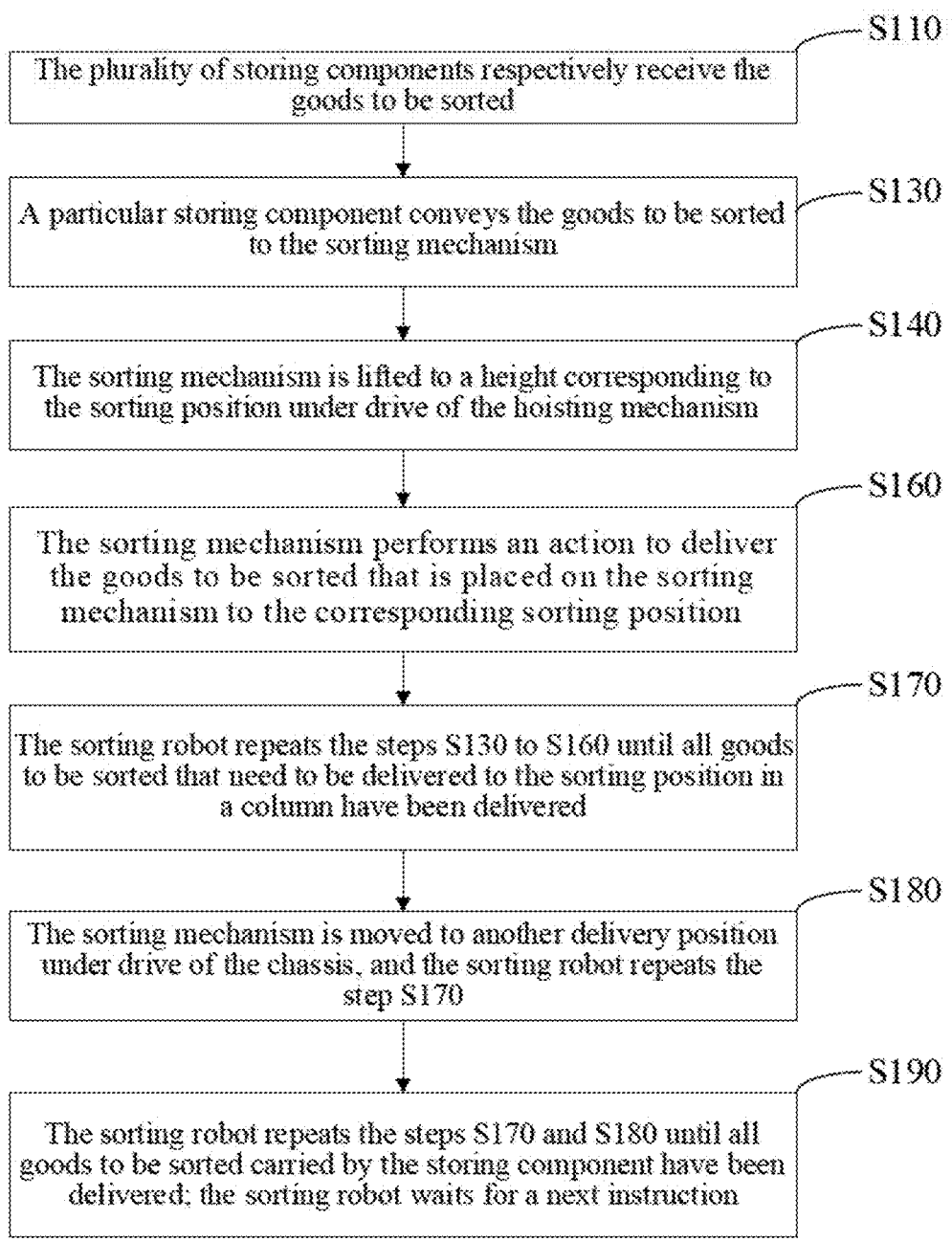
FIG. 12 is a sorting method according to still another embodiment of the present invention.

Further, the storing mechanism includes a plurality of storing components, the plurality of storing components being disposed at intervals on the vertical framework along the vertical direction, a plurality of sorting positions being disposed at intervals along the vertical direction, the storing component conveying the goods to be sorted to the sorting mechanism when performing an action, and the sorting mechanism being capable of delivering the goods to be sorted to the corresponding sorting position, or the sorting mechanism being capable of conveying the goods to a corresponding storing component. As shown in FIG. 12, in the step S110, the plurality of storing components respectively receive the goods to be sorted; in the step S130, a particular storing component conveys the goods to be sorted to the sorting mechanism; and after the step S160, the sorting method further includes step S170: the sorting robot repeating the steps S130 to S160 until all goods to be sorted that need to be delivered to the sorting positions in a column have been delivered. A plurality of storing components increase the quantity of the goods to be sorted carried by the sorting robot and the sorting method in this embodiment at a time, reduce the delivery time of single piece of goods to be sorted, and improve the sorting efficiency of the sorting robot.

According to the foregoing sorting method, the sorting robot preferentially delivers the goods to be sorted to a column of sorting positions. When a plurality of sorting positions in this column correspond to a plurality of goods to be sorted carried by the sorting robot, the sorting mechanism successively receives the goods to be sorted from a corresponding storing component and then delivers the goods to be sorted to a corresponding storing position. In an actual working condition, one sorting position may correspond to only one piece of the goods to be sorted, or one sorting position may correspond to a plurality of goods to be sorted. The sorting mechanism of the sorting robot performs a delivery action according to the corresponding information of the sorting position and the goods to be sorted. A process of the sorting mechanism delivering the goods to be sorted is accompanied by the rising or falling of the sorting mechanism. It is to be understood that when information to be sorted carried by the sorting mechanism does not correspond to the information of the sorting position, even if a height of the sorting mechanism corresponds to the sorting position, the sorting mechanism does not perform the delivery action.

In an embodiment of the present invention, the actual working condition is that a plurality of columns of the sorting positions are sequentially disposed along a horizontal direction. The plurality of columns of the sorting positions are sequentially disposed along a horizontal direction. As shown in FIG. 12, after the step S170, the sorting method further includes step S180: the sorting mechanism being moved to another delivery position under drive of the chassis, and the sorting robot repeating the step S170. The sorting robot provided in this embodiment preferentially completes delivering goods to be delivered to one column of sorting positions, and then the chassis drives the sorting mechanism to other delivery positions for delivering to other columns of sorting positions. The sorting method provided in this embodiment effectively ensures that the sorting robot delivers the goods to be sorted column by column, thereby avoiding time waste caused by the sorting robot repeatedly going back and forth to the same delivery position.

In the foregoing embodiment, after the sorting robot completes delivering to a column of sorting positions from one delivery position, the sorting robot may move to an adjacent column of sorting positions, or may move to a spaced column of sorting positions according to an actual working condition. In a possible implementation, after the sorting robot completes delivering to a column of sorting positions from one delivery position, the sorting robot preferentially is moved to the adjacent column of sorting positions. Further, as shown in FIG. 12, after the step S180, the sorting method further includes step S190: the sorting robot repeating the steps S170 and S180 until all goods to be sorted carried by the storing component have been delivered; the sorting robot waiting for a next instruction. The sorting method provided in this embodiment effectively ensures that each piece of the goods to be sorted is delivered in a case that the sorting efficiency is improved.

In an embodiment of the present invention, a plurality of storing components are disposed in a plurality of columns on the vertical framework, the sorting mechanism can simultaneously correspond to the plurality of storing components of a same height when being raised or lowered, and the sorting mechanism can flip around an axis in the horizontal direction at a set angle. In the step S160, the sorting mechanism flips at the set angle to deliver the goods to be sorted placed on the sorting mechanism to the corresponding sorting position. A plurality of storing components are disposed in a plurality of columns on the vertical framework, which greatly increases the quantity of goods stored by the sorting robot at a time, and improves the sorting efficiency of the sorting robot as a whole.

Figure 13:
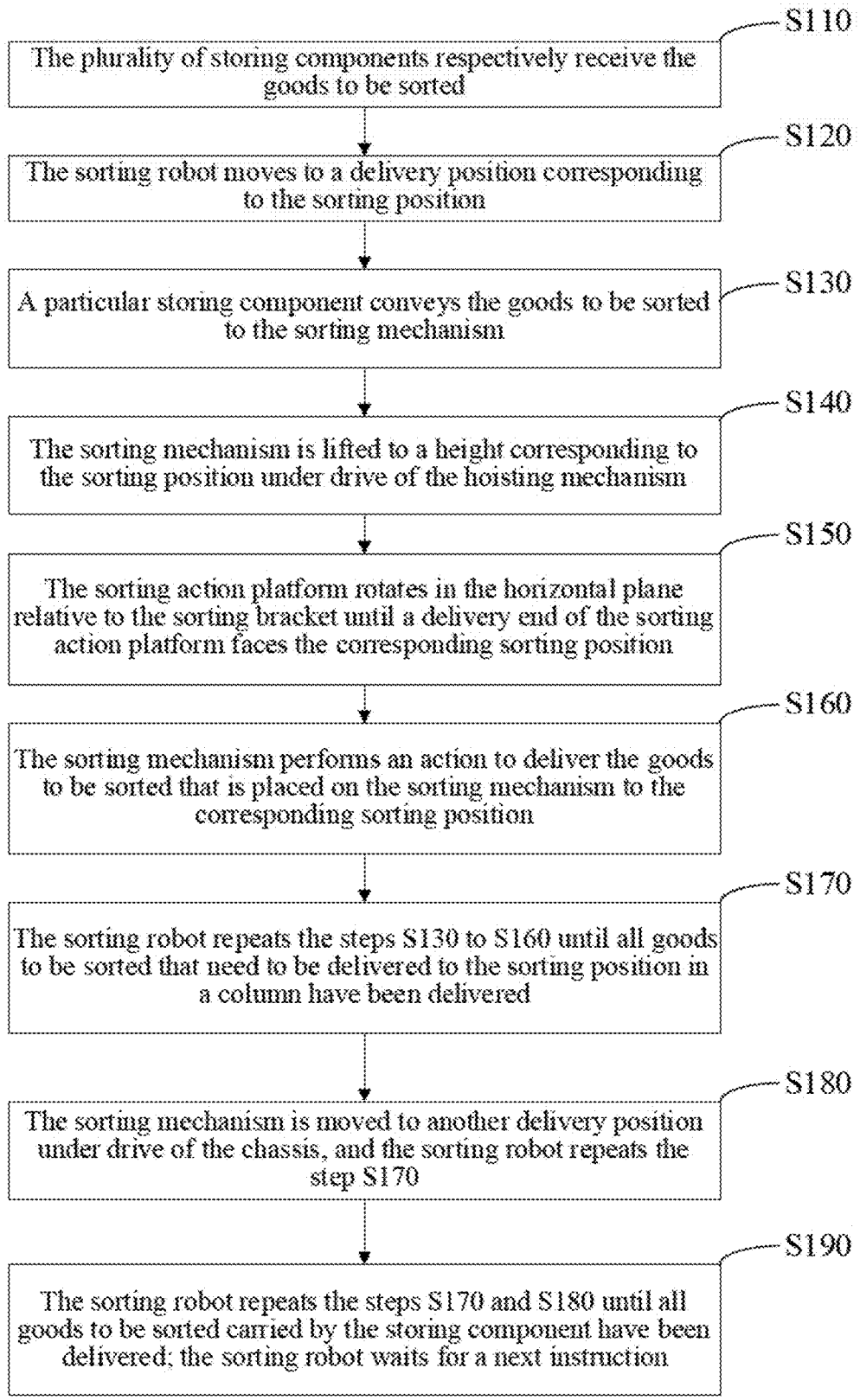
FIG. 13 is a sorting method according to still another embodiment of the present invention.

In an actual working condition, due to needs of actual warehousing, a sorting mechanism located at a same delivery position often needs to deliver the goods to be sorted in different directions. If the robot integrally adjusts an orientation to suit the delivery direction of each sorting position, it will greatly reduce the efficiency of the sorting robot in delivering the goods to be sorted. In an embodiment of the present invention, the sorting mechanism includes a sorting bracket and a sorting action platform, the sorting bracket being disposed movably along the vertical direction on the vertical framework, the sorting bracket being connected to the lifting mechanism, the sorting bracket being capable of being raised or lowered along the vertical direction under the drive of the lifting mechanism, the sorting action platform being disposed rotatably on the sorting bracket, the sorting action platform being capable of rotating in a horizontal plane relative to the sorting bracket, the sorting action platform being capable of carrying the goods to be sorted, and the sorting action platform delivering the goods to be sorted to the corresponding sorting position when performing an action, or the sorting action platform being capable of conveying the goods to the storing mechanism; and as shown in FIG. 13, before the step S160, the sorting method further includes step S150: the sorting action platform rotating in the horizontal plane relative to the sorting bracket until a delivery end of the sorting action platform faces the corresponding sorting position.

The sorting action platform disposed rotatably on the sorting bracket obviously enhances the adaptability of this embodiment to actual working conditions. When the current delivery end of the sorting action platform does not directly face the delivery direction of the corresponding sorting position, only the sorting action platform drives the goods to be sorted to move, which improves the delivery efficiency of the sorting robot.

Figure 14:
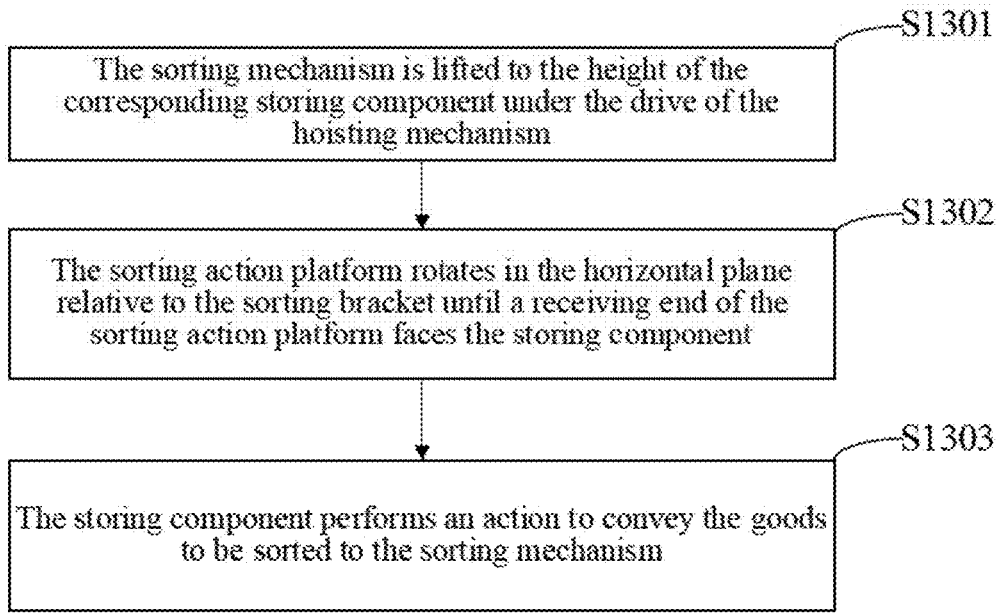
FIG. 14 shows a detailed process of step S30.

The sorting mechanism needs to receive the goods to be sorted from the corresponding storing component. In an actual working condition, the sorting mechanism and the corresponding storing component are located at a same height or different heights. Further, as shown in FIG. 14, the step S130 in the foregoing embodiments includes:

S1301: the sorting mechanism being raised or lowered to a height of a corresponding storing component under the drive of the lifting mechanism; and S1303: the storing component performing an action to convey the goods to be sorted to the sorting mechanism.

When the sorting mechanism and the corresponding storing component are located at a same height, the corresponding storing component performs an action to convey the goods to be sorted to the sorting mechanism, which effectively protects the goods to be sorted and prevents the goods to be sorted from being broken or messed.

In an actual working condition, when the sorting mechanism is raised or lowered to a height corresponding to the sorting position, a direction in which the sorting mechanism receives the goods corresponds to or does not correspond to a direction in which the storing mechanism delivers the goods. When the direction in which the sorting mechanism receives the goods does not correspond to the direction in which the storing mechanism delivers the goods, the sorting mechanism needs to adjust its orientation to be suitable for receiving the goods to be sorted. In an embodiment of the present invention, the sorting mechanism includes a sorting bracket and a sorting action platform, the sorting bracket being disposed movably along the vertical direction on the vertical framework, the sorting bracket being connected to the lifting mechanism, the sorting bracket being capable of being raised or lowered along the vertical direction under the drive of the lifting mechanism, the sorting action platform being disposed rotatably on the sorting bracket, the sorting action platform being capable of rotating in a horizontal plane relative to the sorting bracket, the sorting action platform being capable of carrying the goods to be sorted, and the sorting action platform delivering the goods to be sorted to the corresponding sorting position when performing an action, or the sorting mechanism being capable of conveying the goods to the storing component; and as shown in FIG. 14, after the step S1301, the sorting method further includes step S1302: the sorting action platform rotating in the horizontal plane relative to the sorting bracket until a receiving end of the sorting action platform faces the storing component.

The sorting action platform disposed rotatably on the sorting bracket realizes automation of the process of conveying the goods to be sorted from the storing component to the sorting mechanism, and improves the adaptability of the sorting robot in this embodiment to the actual working conditions. It is to be understood that, the sorting action platform may be rotated within a range of 360° or within a range of 180°, or within a range of 90° relative to the sorting bracket.

Figure 15:
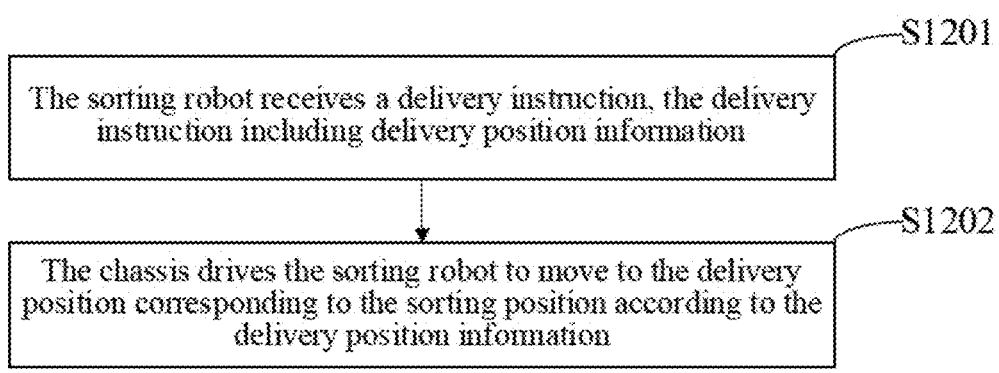
FIG. 15 shows a detailed process of step S20.

In an actual working condition, when a receiving position for receiving the goods is different from a delivery position for delivering the goods, the sorting robot needs to go back and forth between the receiving position for receiving the goods and the delivery position for delivering the goods. In an embodiment of the present invention, as shown in FIG. 13, before the step S130, the sorting method further includes step S120: the sorting robot being moved to a delivery position corresponding to the sorting position. Specifically, as shown in FIG. 15, the step S120 includes:

S1201: the sorting robot receiving a delivery instruction including delivery position information; and S1202: the chassis driving the sorting robot to move to the delivery position corresponding to the sorting position according to the delivery position information.

Further, the step S1202 includes:

S12021: the chassis driving the sorting robot to move to a sorting side of the shelving unit; and S12023: the chassis driving the sorting robot to move along a horizontal extension direction of the shelving unit until the sorting action platform moves to the delivery position corresponding to the sorting position.

Specifically, after the step S12021, the sorting method further includes step S12022: the chassis driving the sorting robot to move until the sorting action platform approaches a sorting area of the shelving unit.

Figure 16:
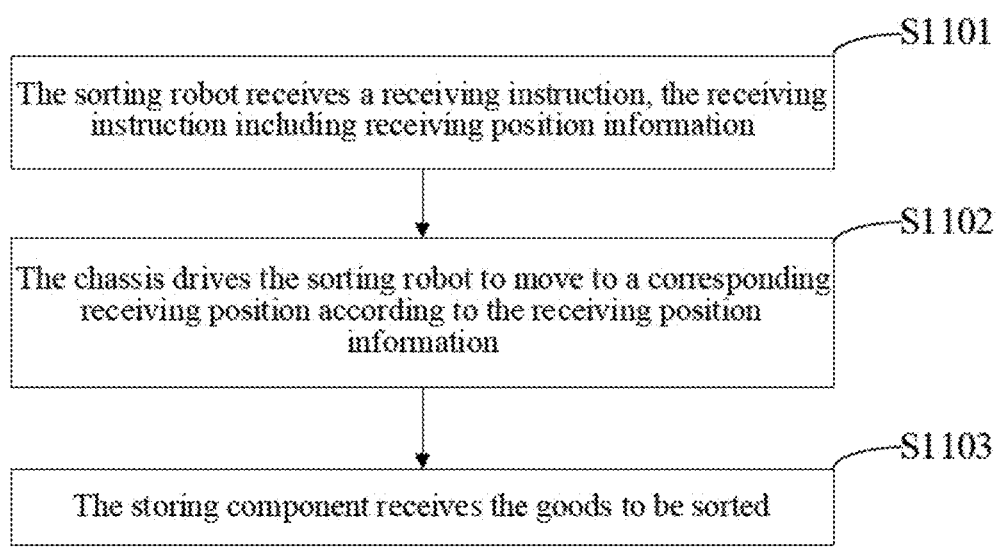
FIG. 16 shows a detailed process of step S10.

In an actual working condition, when a receiving position for receiving the goods is different from a delivery position for delivering the goods, the sorting robot needs to go back and forth between the receiving position for receiving the goods and the delivery position for delivering the goods. In an embodiment of the present invention, as shown in FIG. 16, the step S110 includes:

S1101: the sorting robot receiving a receiving instruction including receiving position information;

S1102: the chassis driving the sorting robot to move to a corresponding receiving position according to the receiving position information; and S1103: the storing component receiving the goods to be sorted.

Figure 17:
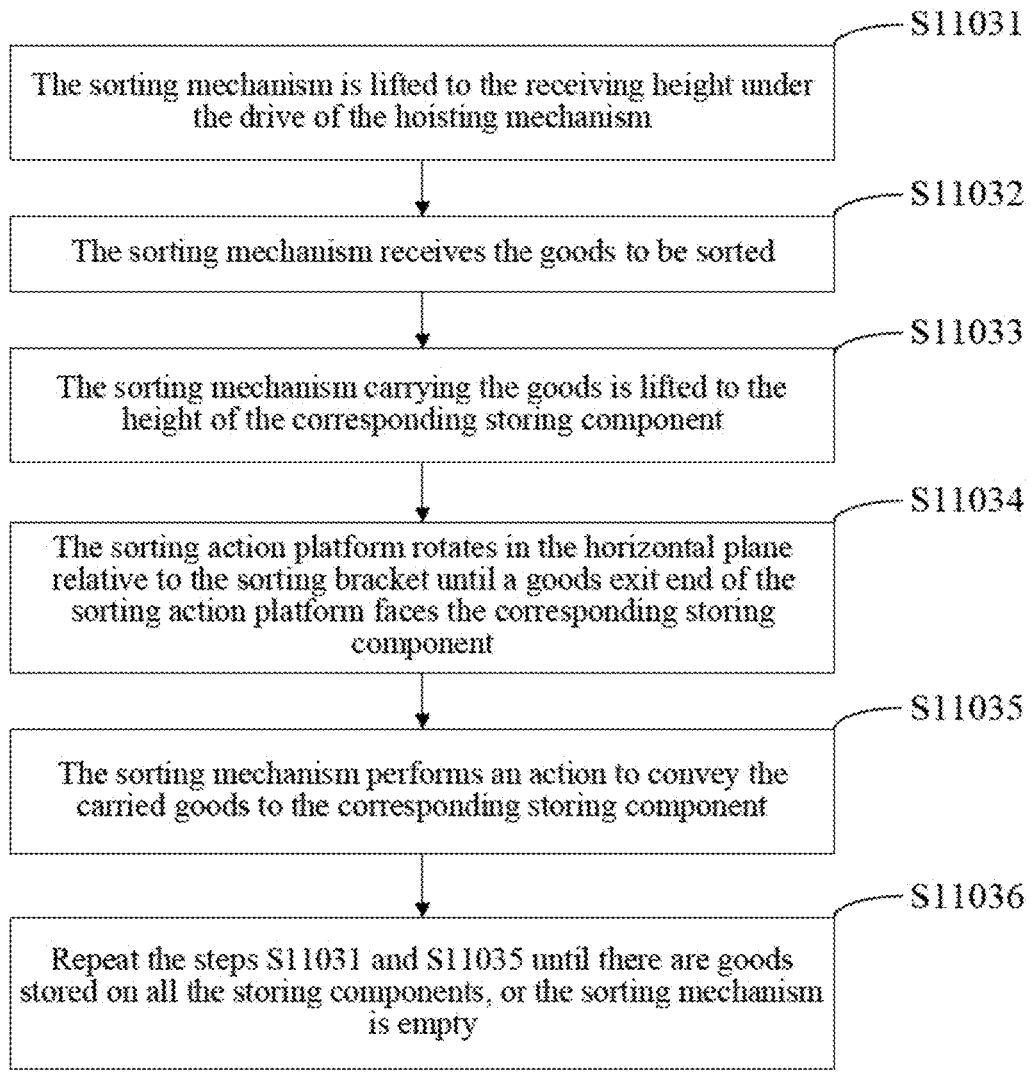
FIG. 17 shows a detailed process of step S103.

Optionally, the storing component of the sorting robot directly receives the goods to be sorted conveyed by an operator or other apparatuses, or the storing component receives the goods to be sorted through the sorting mechanism. In an embodiment of the present invention, the storing mechanism receives the goods to be sorted conveyed by the sorting mechanism, and the sorting mechanism has a receiving height when receiving the goods, and as shown in FIG. 17, the step S1103 includes:

S11031: the sorting mechanism being raised or lowered to the receiving height under the drive of the lifting mechanism;

S11032: the sorting mechanism receiving the goods to be sorted;

S11033: the sorting mechanism carrying the goods being raised or lowered to the height corresponding to the storing component;

S11035: the sorting mechanism performing an action to convey the carried goods to the corresponding storing component; and S11036: repeating the steps S11031 and S11035 until there are goods respectively stored on all the storing components, or the sorting mechanism is empty.

The sorting mechanism conveys the goods to be sorted to the storing component, so that the operator or other apparatuses only need to convey the goods to be sorted to the sorting mechanism, and the sorting mechanism that can be raised or lowered to the receiving height can receive the goods at different heights, which improves the efficiency of the sorting robot in receiving the goods to be sorted, and in addition, enhances the adaptability of the sorting robot in this embodiment to actual working conditions.

In an actual working condition, when the sorting robot receives the goods to be sorted, the receiving direction of the sorting mechanism corresponds or does not correspond to a direction in which the sorting mechanism delivers the goods to be sorted to the storing component. Further, when the receiving direction of the sorting mechanism does not correspond to the direction in which the sorting mechanism delivers the goods to be sorted to the storing component, the sorting mechanism includes the sorting bracket and the sorting action platform. The sorting bracket is movably configured on the vertical framework along the vertical direction, the sorting bracket is connected to the lifting mechanism, and the sorting bracket can be raised or lowered along the vertical direction under the drive of the lifting mechanism. The sorting action platform is rotatably configured on the sorting bracket. The sorting action platform can rotate in a horizontal plane relative to the sorting bracket, the sorting action platform can carry the goods to be sorted, and the sorting action platform delivers the goods to be sorted to the corresponding sorting position when performing an action, or the sorting mechanism can convey the goods to the storing component. As shown in FIG. 17, after the step S11033, the sorting method further includes step S11034: the sorting action platform rotating in the horizontal plane relative to the sorting bracket until a goods exit end of the sorting action platform faces the corresponding storing component. The sorting mechanism rotates to an angle at which its delivery end faces the corresponding storing component according to an actual working condition, which ensures smooth progress of the sorting robot receiving the goods.

Figure 18:
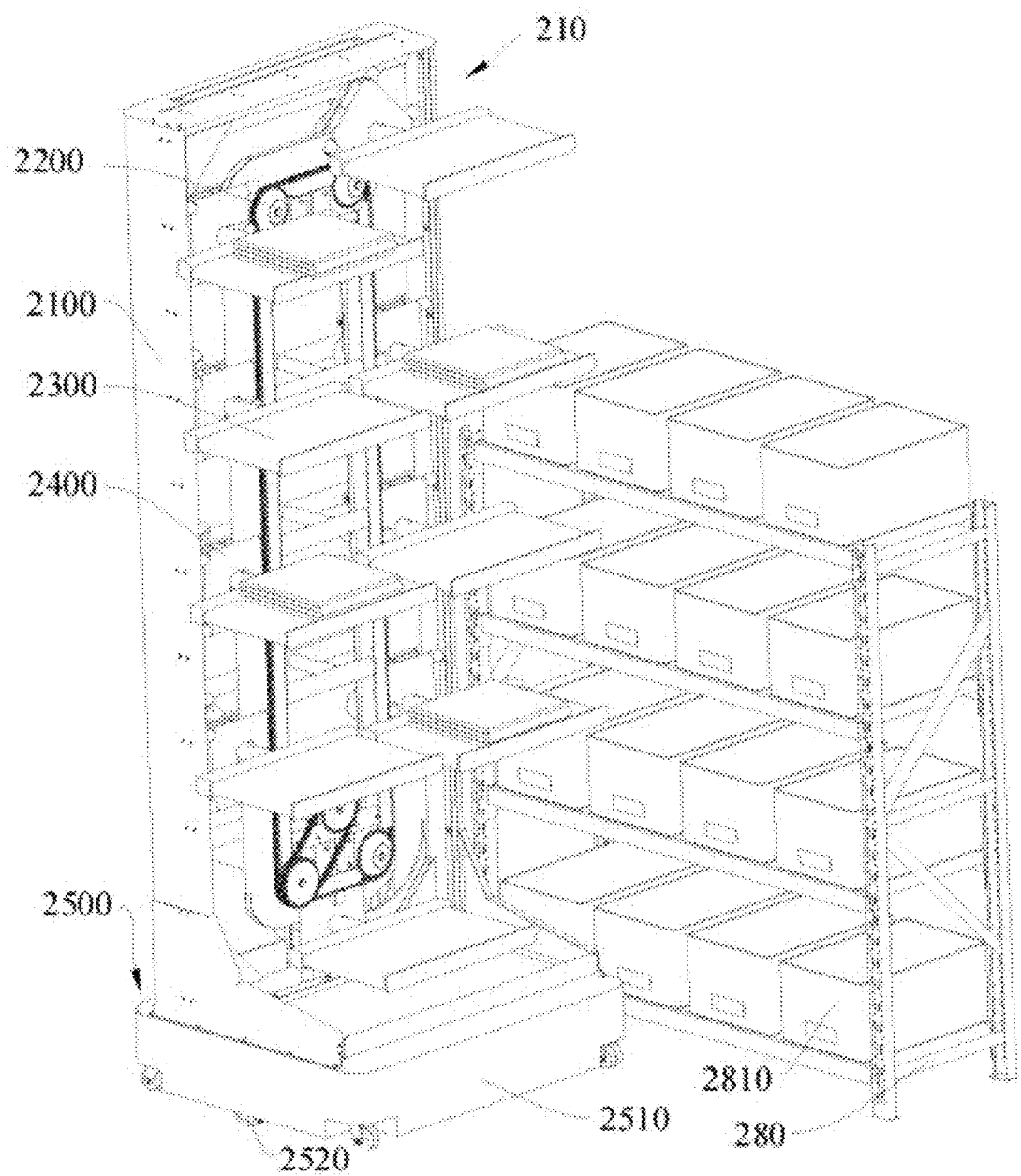
FIG. 18 is a schematic structural diagram of a sorting robot and a shelving unit according to an embodiment of the present invention.
Figure 19:
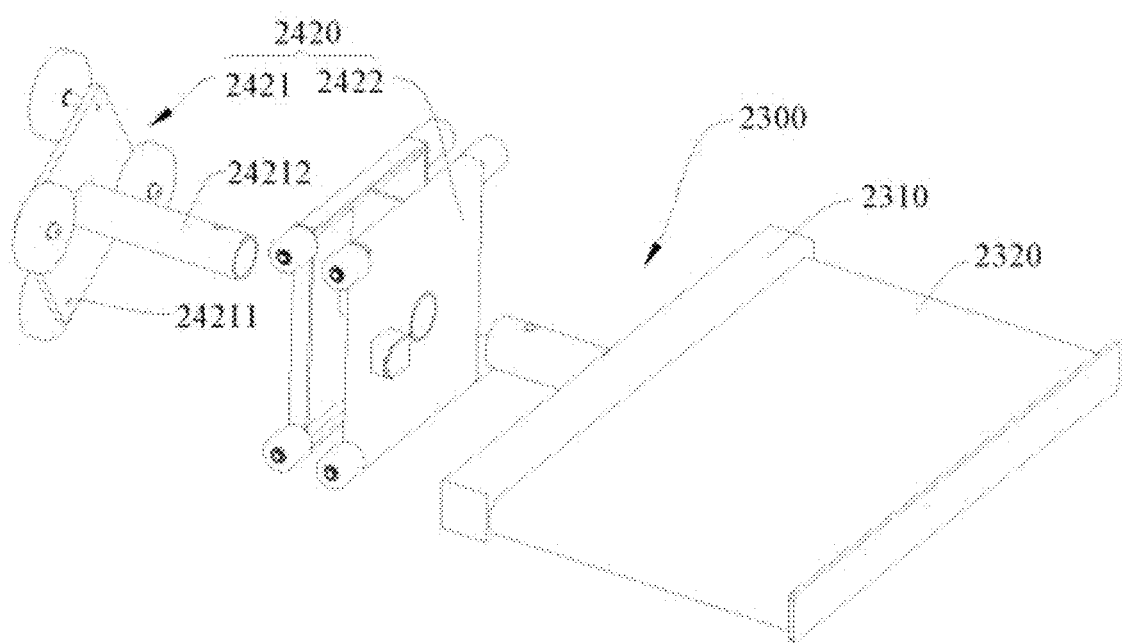
FIG. 19 is a schematic assembly diagram of a guide component and a sorting mechanism according to an embodiment of the present invention.

As shown in FIG. 18 and FIG. 19, an embodiment of the present invention provides a sorting robot 210. The sorting robot 210 includes a vertical framework 2100, a circulating lifting mechanism 2200, and a sorting mechanism 2300. The vertical framework 2100 is disposed along the vertical direction, and the circulating lifting mechanism 2200 is disposed on the vertical framework 2100. The sorting mechanism 2300 is connected to the circulating lifting mechanism 2200. The sorting mechanism 2300 can be raised or lowered cyclically along a set circulation path under drive of the circulating lifting mechanism 2200. The goods to be sorted are raised or lowered cyclically in a synchronous manner under drive of the sorting mechanism 2300. The sorting mechanism 2300 can deliver the goods to be sorted to a corresponding sorting position 2810. The sorting robot 210 and a sorting system, and the circulating lifting mechanism 2200 and the sorting mechanism 2300 work in coordination with each other, thereby realizing the automation of goods sorting, reducing the cost of goods sorting, and greatly improving the efficiency of goods sorting. In addition, the sorting mechanism 2300 is moved to different heights under drive of the circulating lifting mechanism 2200, so that the goods to be sorted can be delivered to the sorting positions 2810 having different heights, which leads to strong universality and a reduction in the occupation of the sorting positions 2810. The sorting mechanism 2300 that can be raised or lowered is also more suitable for actual working conditions in which the sorting robot 210 receives goods, and the sorting mechanism 2300 can be raised or lowered to a suitable receiving height so as to quickly complete receiving the goods.

The sorting mechanism 2300 is an action execution terminal of the sorting robot 210 provided by the present invention, and a function of the sorting mechanism 2300 is to deliver the goods to be sorted to the corresponding sorting position 2810. Optionally, the sorting mechanism 2300 is a manipulator 2330, a movable push rod, a plane having a conveying function, or the like. In a possible implementation, as shown in FIG. 19, the sorting mechanism 2300 includes a sorting bracket 2310 and a sorting action platform 2320. The sorting bracket 2310 is disposed movably on the vertical framework 2100. The sorting bracket 2310 is connected to the circulating lifting mechanism 2200. The sorting bracket 2310 can be raised or lowered cyclically along a set circulation path under drive of the circulating lifting mechanism 2200. The sorting action platform 2320 is disposed on the sorting bracket 2310. The sorting action platform 2320 is used to carry the goods to be sorted. The sorting action platform 2320 performs an action to deliver the goods to the corresponding sorting positions 2810. Structure manners of the sorting bracket 2310 and the sorting action platform 2320 are convenient for carrying the goods to be sorted, and the sorting action platform 2320 has strong adaptability to goods in different sizes or different weights, which can ensure safe sorting of volatile and fragile goods at the same time.

Optionally, when the sorting action platform 2320 performs a sorting action, a platform surface action of the sorting action platform 2320 or any other action mechanism delivers the goods to be sorted to the corresponding sorting position 2810. In an embodiment of the present invention, the sorting action platform 2320 includes a sorting belt and a sorting drive component. The sorting drive component is disposed on the sorting bracket 2310. The sorting belt is disposed rotatably on the sorting bracket 2310. The sorting belt is in transmission connection with the sorting drive component. The sorting belt is used to carry the goods to be sorted. The sorting belt delivers the goods to be sorted to the corresponding sorting positions 2810 when the sorting belt rotates under drive of the sorting drive component. An upper surface of the sorting belt which rotates forms a support surface for the goods to be sorted, and the sorting action performed by the sorting action platform 2320 is the rotation of the sorting belt. By adopting the method of sorting belt and sorting drive component, the sorting action platform 2320 does not need to occupy extra action space when performing the sorting action, and the sorting belt has the advantages of stable performance, low cost, and easy replacement. In some other embodiments of the present invention, goods placed on the sorting action platform 2320 may be pushed to the sorting position 2810 by an elastic mechanism, or pushed to the sorting position 2810 by a cam mechanism; or the platform surface of the sorting action platform 2320 is formed by a plurality of rotatable rollers. The present invention does not limit a specific structural form of the sorting action platform 2320.

The function of the sorting drive component is to drive the sorting belt to perform the rotation, for which a rotating stroke has been set, to deliver the goods to be sorted thereon to the corresponding sorting positions 2810, thereby completing the sorting action of the goods. In a possible implementation, the sorting drive component includes a sorting motor and two sorting shafts. The two sorting shafts are spaced apart on the sorting bracket 2310. The sorting belt is sheathed on the two sorting shafts. At least one sorting shaft is in transmission connection with the sorting motor. The sorting motor can rotate forward or reverse. The combination manner between the motor and the sorting shaft has advantages such as high transmission efficiency, easy control, mature technology, and low cost. Further, an output shaft of the motor is directly connected to the sorting shaft or in transmission connection with the sorting shaft through a gear structure. In an embodiment of the present invention, the motor is a stepper motor. In another possible implementation, the sorting drive component is available in the form of pneumatic motor-shaft fits or hydraulic motor-shaft drives, as long as they are capable of driving the sorting belt to rotate.

The sorting action platform 2320 can deliver the goods to be sorted to the sorting position 2810 located at its own delivery end. In an embodiment of the present invention, a platform surface of the sorting action platform 2320 is disposed rotatably on the sorting bracket 2310, and the sorting action platform 2320 can rotate with respect to the sorting bracket 2310 in a horizontal plane. When the sorting position 2810 is not directly located at a delivery end of the sorting action platform 2320, the sorting action platform 2320 can adjust the delivery end to face the sorting position 2810 by its own rotation, thereby avoiding overall rotation of the sorting robot 210, and greatly improving sorting efficiency of the sorting robot 210. In addition, the sorting action platform 2320 can, when receiving goods, enhance adaptability to receiving conditions by its own rotation, which greatly improves receiving efficiency of the sorting robot 210. In a possible implementation, the sorting mechanism 2300 further includes a rotation drive component. The rotation drive component is disposed on the sorting bracket 2310. The rotation drive component is in transmission connection with the sorting action platform 2320. The sorting action platform 2320 can rotate with respect to the sorting bracket 2310 in a horizontal plane under drive of the rotation drive component. In a specific embodiment of the present invention, the rotation drive component includes a rotation inner gear disposed on the sorting action platform 2320 and a rotation motor fixedly mounted to the sorting bracket 2310. An output shaft of the rotation motor is in transmission connection with the rotation inner gear, thereby driving the rotation of the sorting action platform 2320.

The sorting mechanism 2300 and the circulating lifting mechanism 2200 work in coordination with each other, thereby greatly improving the sorting efficiency of the sorting robot 210 provided in the present invention. In an embodiment of the present invention, as shown in FIG. 18, the sorting mechanism 2300 includes a plurality of sorting brackets 2310 and sorting action platforms 2320, and the plurality of sorting brackets 2310 and sorting action platforms 2320 are evenly distributed along a set circulation path. The plurality of sorting brackets 2310 and sorting action platforms 2320 allow the sorting robot 210 provided in this embodiment to carry a plurality of goods to be sorted at a time, which can significantly improve the sorting efficiency of the sorting robot 210. It may be understood that, the plurality of sorting brackets 2310 and sorting action platforms 2320 can perform the action of goods sorting one by one or simultaneously, which further improves the adaptability of the sorting robot 210 provided in this embodiment to actual working conditions.

In a possible implementation, the plurality of sorting action platforms 2320 rise and fall cyclically in a track of a complete loop or a semi-closed loop. In a specific embodiment of the present invention, as shown in FIG. 18, the plurality of sorting action platforms 2320 rise and fall cyclically in a track of a closed loop in a vertical plane. The number of sorting action platforms 2320 on each circulation path is nine, and the nine sorting action platforms 2320 are evenly distributed along the circulation path. When three sorting action platforms 2320 are raised or lowered cyclically to a vertical stage simultaneously, the three sorting action platforms 2320 can perform the sorting action simultaneously or individually. In other embodiments, the number of sorting action platforms 2320 may also be eight or other numbers designed according to actual working conditions.

It may be understood that, when an operator directly places the goods to be sorted onto the sorting mechanism 2300 of the sorting robot 210, the operator does not need to board a ladder or other auxiliary platform, thus reducing the risk factor of the operator directly placing the goods to be sorted onto the sorting robot 210, and effectively saving the time taken by the operator to place the goods to be sorted. In addition, compared with linear rising or falling, at the same height, the sorting robot 210 provided in this embodiment can basically be configured with twice the number of sorting action platforms 2320, so that the sorting robot 210 can load more goods to be sorted.

The sorting mechanism 2300 in the form of the sorting action platform 2320 can accommodate most types of goods. In an embodiment of the present invention, as shown in FIG.

23, the sorting mechanism 2300 further includes the manipulator 2330, which is disposed on the vertical framework 2100. The manipulator 2330 can deliver the goods to be sorted on the sorting action platform 2320 to the corresponding sorting position 2810, or the manipulator 2330 can put the goods onto the sorting action platform 2320. The manipulator 2330 can smoothly deliver the fragile, irregularly-shaped, or large-sized goods to be sorted to the corresponding sorting positions 2810. The manipulator 2330 and the sorting action platform 2320 work in coordination with each other, thereby further increasing the adaptability of the sorting robot 210 provided in this embodiment to the goods to be sorted. In a possible implementation, a plurality of manipulators 2330 acting independently are disposed in different directions of the vertical framework 2100, thereby improving the sorting efficiency of the sorting robot 210. Specifically, two opposite ends of the vertical framework 2100 are respectively provided with one manipulator 2330. Further, the manipulator 2330 is slidably disposed on the vertical framework 2100 along the vertical direction. The manipulator 2330 slidably disposed along the vertical direction can take the goods from the sorting action platforms 2320 of different heights, and can put the picked-up goods to the sorting positions 2810 having the corresponding heights, thereby avoiding all the sorting action platforms 2320 rising or falling cyclically along the circulation path and further improving the sorting efficiency of the sorting robot 210 provided in this embodiment.

Further, the sorting mechanism 2300 is also provided with a shooting component. The shooting component is used to obtain image information of the goods to be sorted or the sorting position 2810 to determine the height of the sorting action platform 2320 with respect to the sorting position 2810. In this embodiment, the image information is a QR code attached to the goods to be sorted or the sorting position.

Figure 20:
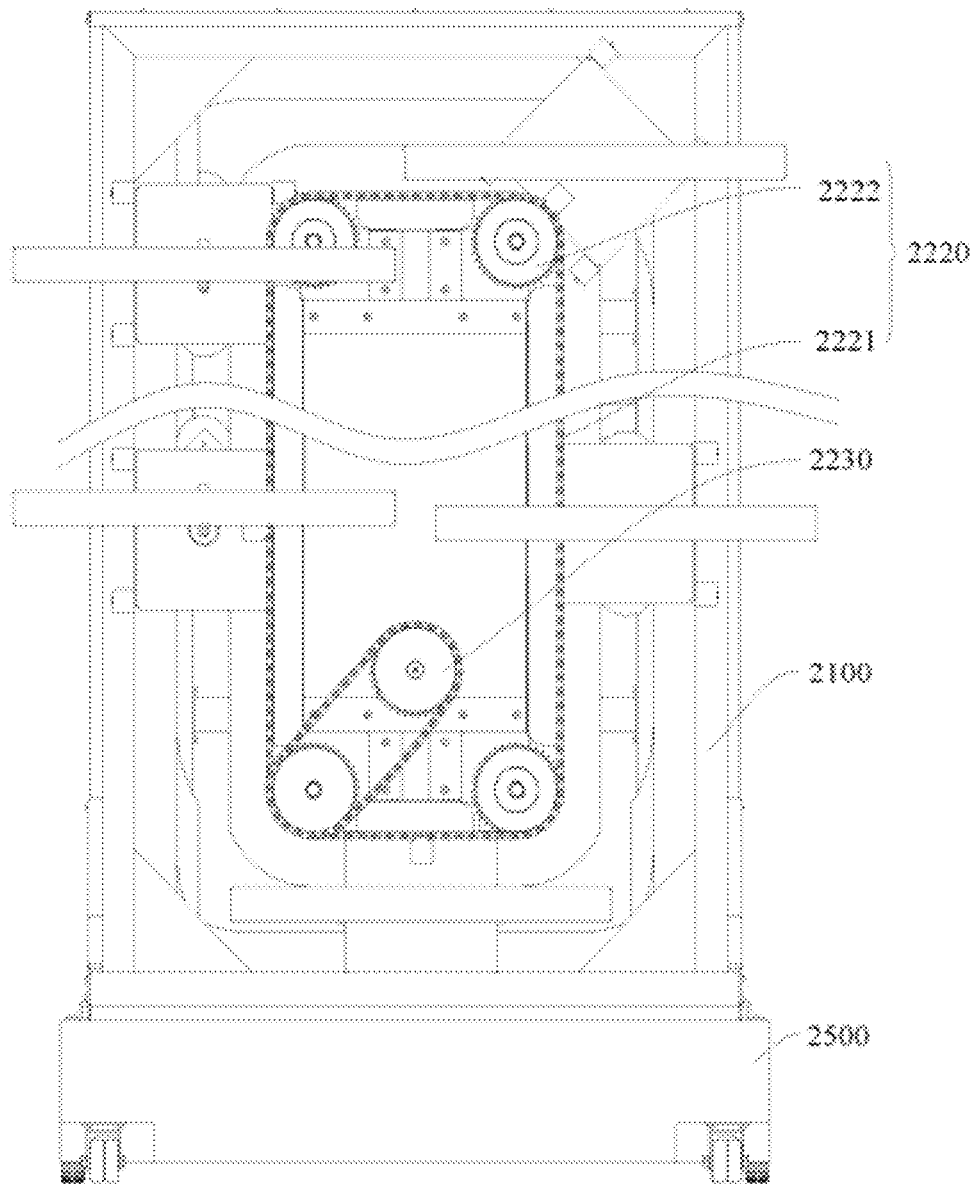
FIG. 20 is a schematic structural front view of a sorting robot according to an embodiment of the present invention.
Figure 21:
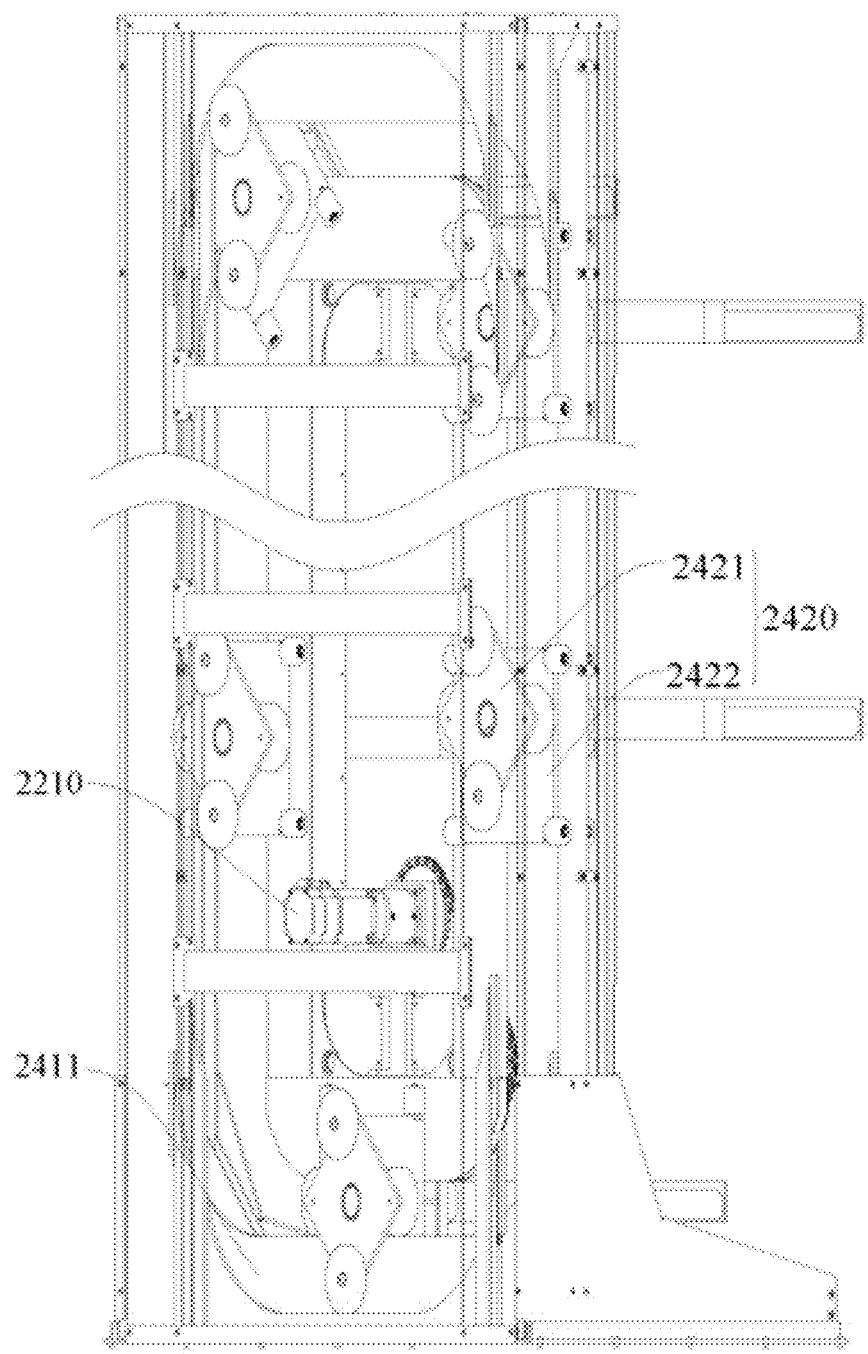
FIG. 21 is a schematic structural rear view of a sorting robot according to an embodiment of the present invention.

The function of the circulating lifting mechanism 2200 is to drive the sorting mechanism 2300 in each embodiment described above to rise or fall along the set circulation path. As shown in FIG. 18 and FIG. 20 to FIG. 21, in an embodiment of the present invention, the circulating lifting mechanism 2200 includes a circulating power supply 210 and a circulating transmission component 2220. The circulating power supply 210 and the circulating transmission component 2220 are disposed on the vertical framework 2100. The circulating power supply 210 is in transmission connection with the input side of the circulating transmission component 2220, and the output side of the circulating transmission component 2220 is in transmission connection with the sorting mechanism 2300. The circulating power supply 210 and the circulating transmission component 2220 are disposed on the vertical framework 2100, and the circulating power supply 210 and the circulating transmission component 2220 are in transmission connection with each other, thereby facilitating the disassembly and assembly of the circulating lifting mechanism 2200 on the vertical framework 2100. Optionally, the output power of the circulating power supply 210 is in the form of rotation, linear motion, or any other form of motion, and the circulating transmission component 2220 being in transmission connection with the circulating power supply 210 finally outputs a motion along the circulation path. In a possible implementation, the circulating power supply 210 includes a circulating driving motor, which is in transmission connection with the input side of the circulating transmission component 2220, and the circulating lifting mechanism 2200 is powered by at least one circulating driving motor. The circulating power supply 210 in the form of a motor operates more stably. Further, the circulating driving motor is a stepper motor with forward and/or reverse rotation, which facilitates the control of the rising and falling process of the circulating lifting mechanism 2200.

In a possible implementation, as shown in FIG. 20, the circulating transmission component 2220 includes a circulating hauling rope 2221 and at least two circulating runners 2222. The at least two circulating runners 2222 are disposed rotatably on the vertical framework 2100, and at least one circulating runner 2222 is in transmission connection with the circulating power supply 210. The circulating hauling rope 2221 is sheathed on the at least two circulating runners 2222. The circulating hauling rope 2221 is fixedly connected to the sorting mechanism 2300 along its own circulation path. At least one circulating runner 2222 rotates to drive the circulating hauling rope 2221 to move cyclically by means of meshing or friction, thereby driving the sorting mechanism 2300 to rise or fall cyclically along the set circulation path. The circulating transmission component 2220 in the form of the circulating hauling rope 2221 and the circulating runner 2222 has the advantages of simple structure, stable performance, low cost, and easy replacement while realizing the rising and falling cyclically. In this embodiment, the sorting bracket 2310 is fixedly connected to the circulating hauling rope 2221 along a direction of the circulation path.

In a specific embodiment of the present invention, as shown in FIG. 20, the circulating hauling rope 2221 is annular, the sorting mechanism 2300 is disposed on the circulating hauling rope 2221, and a plurality of runners are jointly sheathed on the circulating hauling rope 2221. Any one of the runners rotates to drive the hauling rope to move cyclically by means of friction or meshing, thereby driving the sorting mechanism 2300 in each embodiment described above to rise or fall cyclically in a vertical plane. Specifically, the number of the circulating runners 2222 is four, and the four runners are distributed in a rectangular shape. According to the actual situation, the number of the circulating runners 2222 may also be six, eight, or the like. The circulating runner 2222 is a sprocket, and the circulating hauling rope 2221 is a chain. The circulating sprocket rotates to drive the circulating chain to move cyclically by means of meshing. According to the actual situation, the circulating runner 2222 can also be a V-belt pulley. Accordingly, the circulating hauling rope 2221 can be a V-belt. The V-belt pulley rotates to drive the V-belt to move cyclically through friction. An output shaft of the circulating driving motor is in transmission connection with one or more circulating runners 2222, and the circulating runners 2222 and the circulating hauling rope 2221 rotate under drive of the circulating driving motor.

In a possible implementation, as shown in FIG. 20 and FIG. 21, the circulating transmission component 2220 further includes a sprocket wheel mechanism 2230. The circulating driving motor and the sprocket wheel mechanism 2230 are both mounted to the vertical framework 2100. The sprocket wheel mechanism 2230 is connected to the circulating driving motor and one circulating runner 2222. The circulating driving motor drives one circulating runner 2222 to rotate through the sprocket wheel mechanism 2230. According to the actual situation, the sprocket wheel mechanism 2230 can also be replaced with a turbine worm mechanism, a gear mechanism, or the like, and in addition, the sprocket wheel mechanism 2230 can be omitted. It can be understood that, in this embodiment, the circulating lifting mechanism 2200 is only powered by the circulating driving motor to drive the plurality of sorting mechanisms

2300 to rise or fall cyclically in a synchronous manner. In some other embodiments, the circulating power supply 210 includes a plurality of circulating driving motors, and each circulating driving motor provides power to drive a corresponding sorting mechanism 2300 to rise or fall cyclically. The circulating driving motor can rotate forwardly or reversely. Therefore, the circulating lifting mechanism 2200 is used to drive the sorting mechanism 2300 to rise and fall cyclically in a forward or reverse manner.

Figure 22:
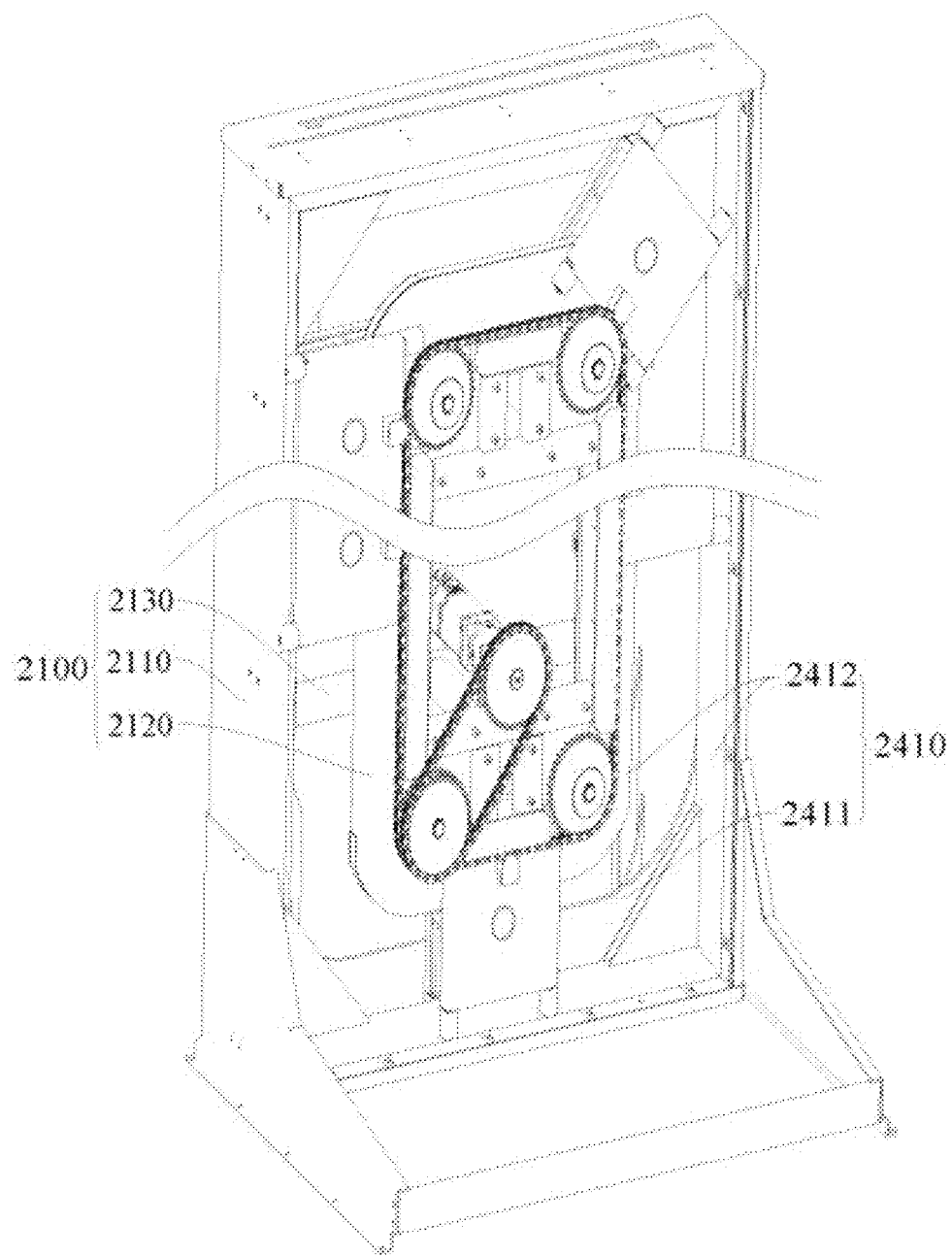
FIG. 22 is a schematic structural side view of a sorting robot according to an embodiment of the present invention.

The vertical framework 2100 mainly plays the role of supporting and forming a circulation path in the sorting robot 210. In an embodiment of the present invention, as shown in FIG. 18 and FIG. 22, the vertical framework 2100 includes an outer framework 2110 and an inner framework 2120, the inner framework 2120 is fixedly disposed in the outer framework 2110, and the inner framework 2120 is spaced apart from the outer framework 2110. The circulating lifting mechanism 2200 is disposed on the inner framework 2120. The sorting mechanism 2300 is disposed movably between the inner framework 2120 and the outer framework 2110. The outer framework 2110 and the inner framework 2120 are substantially annular in the vertical plane. The inner framework 2120 and the outer framework 2110 are separated from each other to form a circulation path of the sorting mechanism 2300 therebetween. Further, the vertical framework 2100 further includes a bend suspension 2130, which is fixedly connected to the outer framework 2110 and the inner framework 2120 respectively. The bend suspension 2130 has a bending portion, and the bending portion avoids the circulation path of the sorting mechanism 2300.

In an embodiment of the present invention, as shown in FIG. 20 to FIG. 22, the sorting robot 210 further includes a circulating guide mechanism 2400. The circulating guide mechanism 2400 is disposed on the vertical framework 2100. The circulating guide mechanism 2400 is connected to the sorting mechanism 2300. When the sorting mechanism 2300 is raised or lowered cyclically along the set circulation path under drive of the circulating lifting mechanism 2200, the circulating guide mechanism 2400 can prevent the sorting mechanism 2300 from turning over. Specifically, the circulating guide mechanism 2400 is disposed between the inner framework 2120 and the outer framework 2110, and a plurality of the circulating guide mechanisms 2400 are disposed along the circulation path. The circulating guide mechanism 2400 is fixedly connected to the circulating hauling rope 2221 along the direction of the circulation path, and the sorting bracket 2310 is fixedly connected to the circulating guide mechanism 2400 along the direction of the circulation path, so that the circulating hauling rope 2221 and the circulating guide mechanism 2400 cooperate to drive the sorting bracket 2310 and the sorting action platform 2320 to translate cyclically along the circulation path, thereby preventing the goods on the sorting action platform 2320 from falling off when the sorting mechanism 2300 performs a complete cycle of rising and falling.

In a possible implementation, as shown in FIG. 21 and FIG. 22, the circulating guide mechanism 2400 includes a guide rail 2410 and a guide component 2420. The guide rail 2410 is fixedly disposed on the vertical framework 2100, and the guide rail 2410 extends along the circulation path of the sorting mechanism 2300. The guide component 2420 is disposed movably on the vertical framework 2100, and the guide component 2420 is fixedly connected to the sorting mechanism 2300. During the rising and falling process of the sorting mechanism 2300 along the circulation path, the guide component 2420 comes into contact with the guide rail 2410, and the guide component 2420 translates along the circulation path of the sorting mechanism 2300. Specifically, the guide rail 2410 includes a translational rail 2411 and a path rail 2412. The translational rail 2411 and the path rail 2412 are fixedly disposed on the vertical framework 2100. The translational rail 2411 and the path rail 2412 extend along the circulation path of the sorting mechanism 2300. The guide component 2420 includes a translational wheel set 2421 and a path wheel set 2422. The translational wheel set 2421 is fixedly connected to the sorting mechanism 2300, and the path wheel set 2422 is rotatably connected to the sorting mechanism 2300. During the rising and falling process of the sorting mechanism 2300 along the circulation path, the translational wheel set 2421 is in rolling contact with the translational rail 2411, and the path wheel set 2422 is in rolling contact with the path rail 2412.

Further, as shown in FIG. 19 and FIG. 22, the translational rail 2411 is formed by welding of plates and profiles. The translational rail 2411 includes a plurality of sub-rails that are independent of each other. Each sub-rail is similar to the track formed when the sorting mechanism 2300 rises and falls cyclically. Under the combined action of all the sub-rails and the circulating hauling rope 2221, the translational wheel set 2421 does not rotate around its own rotating shaft during the cyclic rising and falling process, thereby ensuring that the sorting mechanism 2300 remains level throughout the cyclic rising and falling process. Specifically, the translational wheel set 2421 includes a guide portion 24211 and a connecting axial portion 24212. The path wheel set 2422 is mounted to the circulating hauling rope 2221, the path wheel set 2422 is sheathed between two ends of the connecting axial portion 24212, and the path wheel set 2422 can rotate with respect to the connecting axial portion 24212 around the connecting axial portion 24212. One end of the connecting axial portion 24212 is connected to the guide portion 24211, and the other end of the connecting axial portion 24212 is connected to the sorting bracket 2310.

The guide portion 24211 is provided with guide wheels, and the number of the guide wheels is multiple. A plurality of the guide wheels are distributed in the vertical plane and surround the guide portion 24211. Each guide wheel can only contact one corresponding sub-rail. During the vertical rising or falling of the guide portion 24211, at least two guide wheels are in contact with the corresponding sub-rails at any time, and different guide wheels are in contact with the corresponding sub-rails at different times. The sub-rail is used as a travel rail of the guide wheel. Under the combined action of the sub-rail and the circulating hauling rope 2221, a travel track of the guide wheel is limited, thereby limiting a travel track of the guide portion 24211, and ensuring that an angle of the guide portion 24211 remains unchanged during the cyclic rising and falling process.

It is worth noting that, the path wheel set 2422 can rotate around a connecting rotation shaft with respect to the guide portion 24211, so that the guide portion 24211 still has a degree of freedom of rotation with respect to the circulating hauling rope 2221, and the guide rail 2410 is also cooperatively used, thereby further limiting the guide portion 24211. Accordingly, it is ensured that, no matter what kind of circulating lifting mechanism 2200 is used, the sorting action platform 2320 remains level during the cyclic rising and falling process. The number of the circulating guide mechanisms 2400 may be multiple. A plurality of the circulating guide mechanisms 2400 are adapted to one sorting mechanism 2300.

Figure 23:
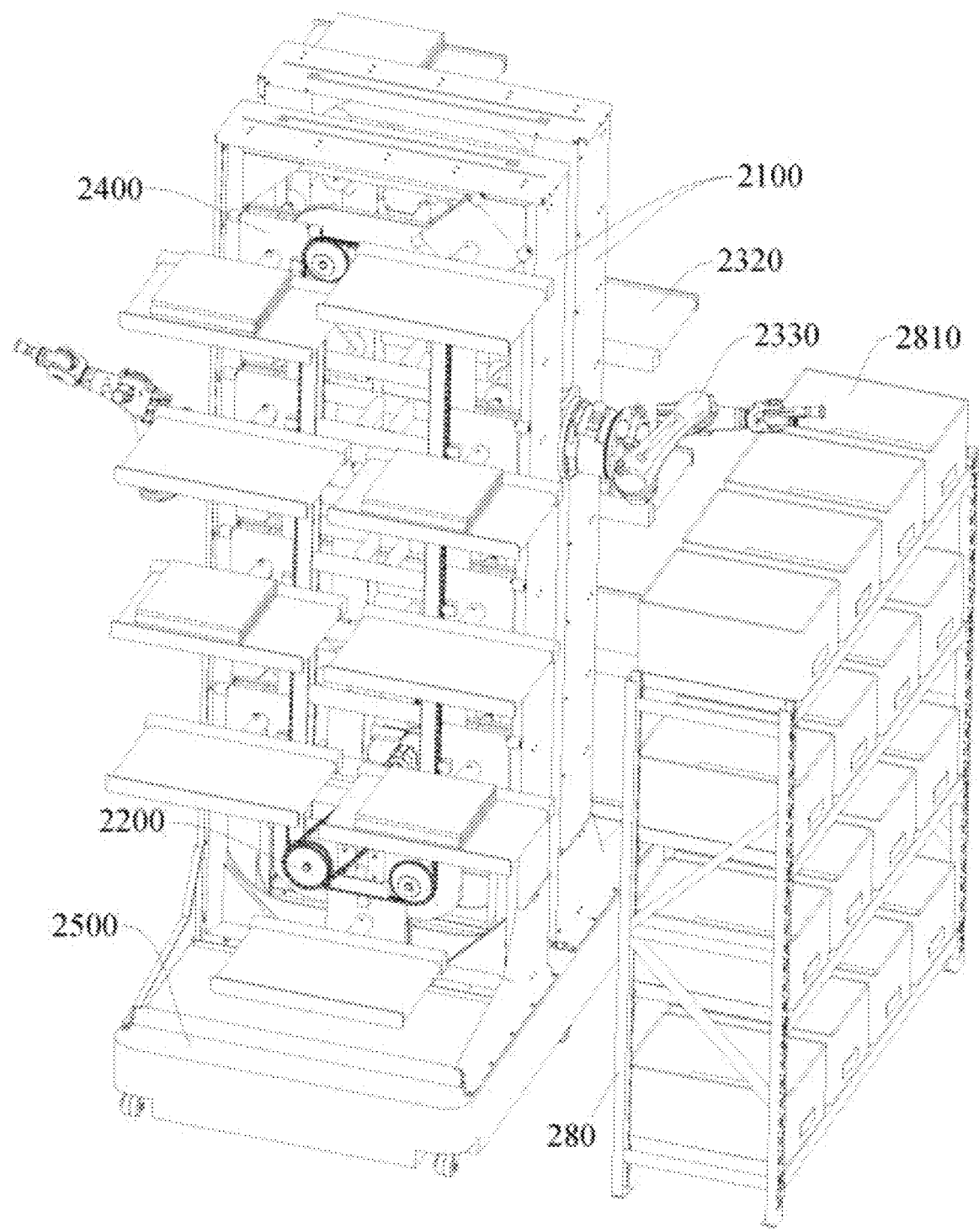
FIG. 23 is a schematic structural diagram of a sorting system according to an embodiment of the present invention.

In an embodiment of the present invention, as shown in FIG. 18, FIG. 20 and FIG. 23, the sorting robot 210 further includes a movable chassis 2500, and the outer framework 2110 of the vertical framework 2100 is disposed on the chassis 2500. The movable chassis 2500 may drive the sorting robot 210 to move, which greatly improves adaptability of the sorting robot 210 in this embodiment to actual working conditions. Specifically, the chassis 2500 includes a plate frame 2510, a marching drive component, and a plurality of rotating wheels 2520. The vertical framework 2100 is disposed on an upper part of the plate frame 2510, the plurality of rotating wheels 2520 are disposed on a bottom of the plate frame 2510, and the marching drive component is disposed on the plate frame 2510. At least one rotating wheel 2520 is in transmission connection with the marching drive component. Further, at least two rotating wheels 2520 are respectively in transmission connection with the marching drive component, and the at least two rotating wheels 2520 respectively in transmission connection with the marching drive component are distributed on two sides of the plate frame 2510 along a marching direction, thereby realizing a steering function of the chassis 2500. The marching drive component includes at least two wheel drive motors, and the at least two rotating wheels 2520 distributed on the two sides of the plate frame 2510 along the marching direction are respectively driven by separate wheel drive motors. The at least two rotating wheels 2520 distributed on the two sides of the plate frame 2510 along the marching direction are respectively driven by the separate wheel drive motors, which may simplify a transmission structure on the chassis 2500.

In a specific embodiment, a driving wheel and a driven wheel are installed on the chassis 2500. The driving wheel and the driven wheel may respectively rotate relative to the chassis 2500. The driving wheel and the driven wheel jointly support the chassis 2500. The driving wheel is driven by a wheel drive motor to make the chassis 2500 to move. By configuring the movable chassis 2500, the sorting robot 210 may deliver goods among a plurality of goods shelves 280. The number of the driving wheels is two, and the two driving wheels are symmetrically distributed. Correspondingly, the number of the wheel drive motors is two. The two driving wheels are respectively driven by the two wheel drive motors, which may enable rotation speed of the two driving wheels to be different, so as to realize steering of the chassis 2500. The number of the driven wheels is four, and the four driven wheels are distributed in a rectangular shape. The driven wheel may be a universal wheel or any other wheel structures with a steering function. According to an actual situation, the number of the driven wheels is not limited to four, but may further be six, three, or the like.

In this embodiment, a guide apparatus (not shown) is further installed on the chassis 2500, and the guide apparatus is a camera, which is configured to identify a graphic code attached to the ground, so that the chassis 2500 can march along a preset path. The graphic code may be a two-dimensional code, a barcode, or some customized identification codes. In some other embodiments, the guide apparatus is a laser guide apparatus, configured to guide the chassis 2500 to march along a laser beam; or the guide apparatus is a short-wave receiving apparatus, which receives a preset short-wave signal to guide the chassis 2500 to march along a preset path. It should be noted that, in some other embodiments, the chassis 2500 may be omitted. The vertical framework 2100 is directly fixedly installed on the ground or other platforms, and is only configured to carry goods on the shelving unit 280 around the vertical framework 1100.

In an embodiment of the present invention, the sorting robot 210 further includes a control center. The control center is electrically connected to the chassis 2500, the circulating lifting mechanism 2200, and the sorting mechanism 2300, respectively. The control center is used to control the circulating lifting mechanism 2200 and the sorting mechanism 2300 to perform actions independently or jointly, thereby ensuring the sorting efficiency of the sorting robot 210.

In an embodiment of the present invention, as shown in FIG. 23, the sorting robot 210 includes at least two sets of sorting mechanisms 2300. The at least two sets of sorting mechanisms 2300 are evenly distributed along an outer periphery of the vertical framework 2100, and the at least two sets of sorting mechanisms 2300 are driven by the circulating lifting mechanism 2200 respectively. Specifically, the sorting robot includes two sets of sorting mechanisms 2300, and the two sets of sorting mechanisms 2300 are respectively distributed on both sides of the vertical framework 2100. At least two sets of sorting mechanisms 2300 can perform the sorting action individually or simultaneously, which greatly improves the sorting efficiency of the sorting robot 210. Further, the sorting robot 210 includes at least two sets of circulating lifting mechanisms 2200, the number of the circulating lifting mechanisms 2200 is the same as that of the sorting mechanisms 2300, and each set of sorting mechanisms 2300 is driven by a separate circulating lifting mechanism 2200, which realizes that each set of sorting mechanisms 2300 individually performs the sorting action. In a possible implementation, the sorting robot 210 includes at least two vertical frameworks 2100. The at least two vertical frameworks 2100 are fixedly connected, and each set of circulating lifting mechanisms 2200 and the sorting mechanism 2300 independently driven by the circulating lifting mechanism 2200 are disposed on one vertical framework 2100, which is convenient for the assembly between the circulating lifting mechanism 2200, the sorting mechanism 2300, and the vertical framework 2100, and is also beneficial to form a modular sorting robot 210.

An embodiment of the present invention further provides a sorting system. As shown in FIG. 18 and FIG. 23, the sorting system includes the shelving unit 280 and the sorting robot 210 described in the foregoing embodiments. The sorting robot 210 is configured to deliver the goods to be sorted to the corresponding sorting position 2810 on the shelving unit 280. The sorting system provided in this embodiment has the same advantages as the sorting robot 210 in the foregoing embodiments. In a possible implementation, an open container is placed on the shelving unit 280, and one container is one sorting position 2810. Further, the shelving unit 280 has at least two sorting positions 2810 with different heights. The sorting mechanism 2300 can be raised or lowered to a height corresponding to the sorting position 2810 under drive of the circulating lifting mechanism 2200, and the sorting mechanism 2300 can deliver the goods to be sorted to the corresponding sort position 2810.

As shown in FIG. 18 and FIG. 19, an embodiment of the present invention provides a sorting robot 210, the sorting robot 210 including the chassis 2500, the vertical framework 2100, the circulating lifting mechanism 2200, the sorting mechanism 2300, and the control center. The chassis 2500 can move on ground. The vertical framework 2100 is fixedly disposed on the chassis 2500, and the vertical framework 2100 is disposed along the vertical direction. The circulating lifting mechanism 2200 is disposed on the vertical framework 2100. The sorting mechanism 2300 includes the sorting bracket 2310 and the sorting action platform 2320. The sorting bracket 2310 is disposed movably on the vertical framework 2100. The sorting bracket 2310 is connected to the circulating lifting mechanism 2200. The sorting bracket 2310 can be raised or lowered cyclically along a set circulation path under drive of the circulating lifting mechanism 2200. The sorting action platform 2320 is disposed on the sorting bracket 2310. The sorting action platform 2320 is used to carry the goods to be sorted. The sorting action platform 2320 performs an action to deliver the goods to the corresponding sorting positions 2810. The control center is electrically connected to the chassis 2500, the circulating lifting mechanism 2200, and the sorting mechanism 2300, respectively. The control center is used to control the chassis 2500, the circulating lifting mechanism 2200, and the sorting mechanism 2300 to perform actions individually or jointly.

The sorting robot 210, the circulating lifting mechanism 2200, and the sorting mechanism 2300 work in coordination with each other, thereby realizing the automation of goods sorting, reducing the cost of goods sorting, and also greatly improving the efficiency of goods sorting. In addition, the sorting mechanism 2300 is moved to different heights under drive of the circulating lifting mechanism 2200, so that the goods to be sorted can be delivered to the sorting positions 2810 having different heights, which leads to strong universality and a reduction in the occupation of the sorting positions 2810.

Figure 24:
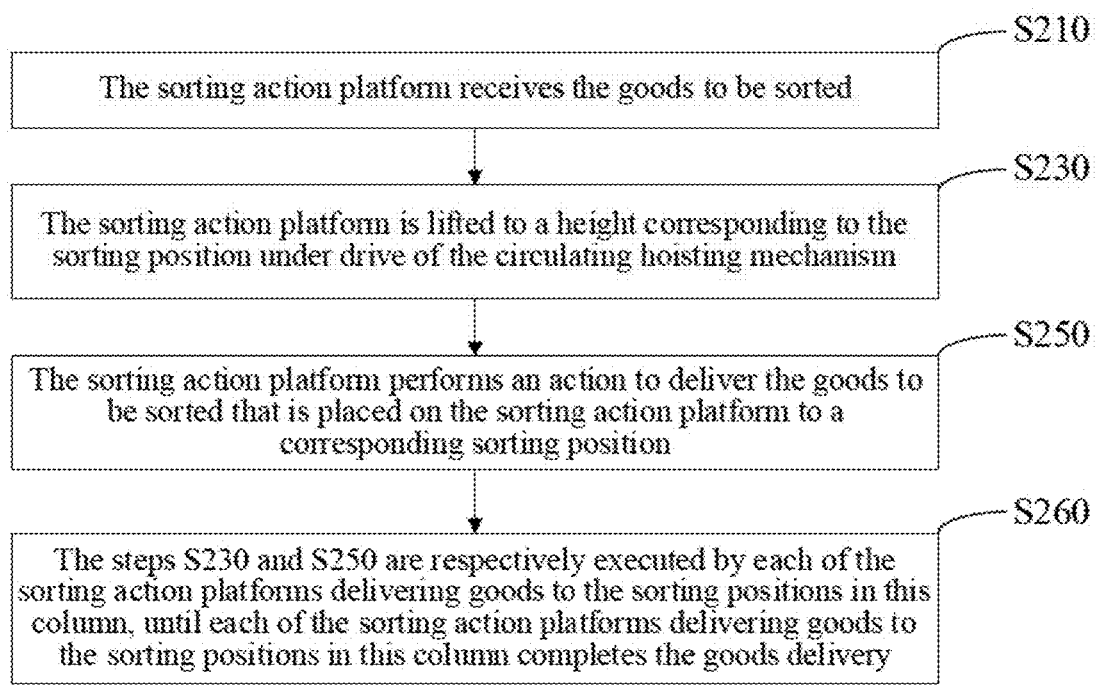
FIG. 24 is a sorting method according to an embodiment of the present invention.

As shown in FIG. 24, an embodiment of the present invention provides a sorting method applicable to the sorting robot, where the sorting robot is used to deliver particular goods to be sorted to a particular sorting position, and the sorting action platform carrying the particular goods to be sorted corresponds to the particular sorting position, the sorting method including:

S210: the sorting action platform receiving the goods to be sorted;

S230: the sorting action platform being raised or lowered to a height corresponding to the sorting position under drive of the circulating lifting mechanism; and S250: the sorting action platform performing an action to deliver the goods to be sorted that is placed on the sorting action platform to a corresponding sorting position.

In the above sorting method, the circulating lifting mechanism and the sorting mechanism work in coordination with each other, thereby realizing the automation of goods sorting, reducing the cost of goods sorting, and also greatly improving the efficiency of goods sorting. In addition, the sorting mechanism is moved to different heights under drive of the circulating lifting mechanism, so that the goods to be sorted can be delivered to the sorting positions having different heights, which leads to strong universality and a reduction in the occupation of the sorting positions.

In a possible implementation, each part of the sorting robot performs actions in a coordinated manner under the control of the control center, and the control center of the sorting robot keeps a communication connection with an external server. The sorting robot can identify information of the goods to be sorted, and the sorting robot can obtain information of the sorting position corresponding to each of the goods to be sorted. The sorting robot coordinates and controls various parts according to the obtained information, to efficiently complete the sorting of goods. In the sorting robot and sorting method provided in the above embodiments, the sorting action platform performs the delivery action only when information of the goods to be sorted carried by the sorting action platform corresponds to information of the sorting position.

In an embodiment of the present invention, in order to further improve the sorting efficiency of the sorting robot, the sorting mechanism includes a plurality of the sorting brackets and the sorting action platforms, the plurality of sorting brackets and sorting action platforms are distributed along the set circulation path, and a plurality of the sorting positions are disposed at intervals along the vertical direction. As shown in FIG. 24, after the step S250, the sorting method further includes step S260: each of the sorting action platforms delivering goods to the sorting positions in this column respectively executing the steps S230 and S250, until each sorting action platform delivering goods to the sorting positions in this column completes the goods delivery. The sorting robot provided in this embodiment can carry a plurality of goods to be sorted at a time. The plurality of sorting brackets and sorting action platforms first deliver the goods to be sorted to a column of sorting positions under drive of the circulating lifting mechanism, which gives full play to the advantage that the sorting action platform can be raised or lowered, and effectively improves the overall sorting efficiency of the sorting robot.

Optionally, during the rising and falling of the plurality of sorting action platforms, only one of the sorting action platforms is raised or lowered to the corresponding sorting position height, or the plurality of sorting action platforms are simultaneously raised or lowered to the corresponding sorting position heights. In an implementation of the present invention, in the step S230, the plurality of sorting action platforms are simultaneously raised or lowered to the corresponding sorting positions under drive of the circulating lifting mechanism; in the step S250, the plurality of sorting action platforms perform actions simultaneously to deliver the goods to be sorted to the corresponding sorting positions, respectively. The plurality of sorting action platforms simultaneously perform actions, which effectively eliminates a waiting time caused by sequential execution of delivery actions between the plurality of sorting action platforms, and effectively improves the overall sorting efficiency of the sorting robot.

It may be understood that, a height difference between a plurality of the sorting positions having different heights is the same as or different from a height difference between the plurality of sorting action platforms. When a height difference between a plurality of the sorting positions is the same as a height difference between the plurality of sorting action platforms, the plurality of sorting action platforms can be simultaneously raised or lowered to the corresponding sorting positions under drive of the circulating lifting mechanism. When a height difference between a plurality of the sorting positions is different from a height difference between the plurality of sorting action platforms, the height difference between the plurality of sorting action platforms can be adjusted until the height difference is adapted to a height difference between the corresponding sorting positions, and then the plurality of sorting action platforms perform actions simultaneously to deliver the goods to be sorted to the corresponding sorting positions.

It may be understood that, in the foregoing embodiments, the plurality of sorting action platforms can respectively correspond to different sorting positions at the same time in height, but the sorting action platform will execute the delivery action only when the information of the goods to be sorted carried by the sorting action platform corresponds to the information of the sorting position. Therefore, in actual working conditions, there will be the following working conditions: the plurality of sorting action platforms respectively correspond to different soiling positions at the same time in height, but only the information of the goods to be sorted carried by one group of sorting action platforms corresponds to the information of the sorting position. Under the work condition described above, only this group of sorting action platforms can perform the delivery action.

In an embodiment of the present invention, both sides of the circulation path of the plurality of sorting action platforms are respectively provided with a plurality of the sorting positions disposed at intervals along the vertical direction, and the sorting action platforms on both sides are simultaneously lifted to the corresponding sorting positions. In the step S250, the sorting action platforms on both sides perform actions simultaneously to deliver the goods to be sorted to the corresponding sorting positions, respectively. The sorting method provided in this embodiment allows the sorting robot to simultaneously deliver the goods to be sorted to the sorting positions on both sides of the circulation path, which not only improves the adaptability of the sorting method to actual working conditions, but also effectively improves the overall sorting efficiency of the sorting robot.

Figure 25:
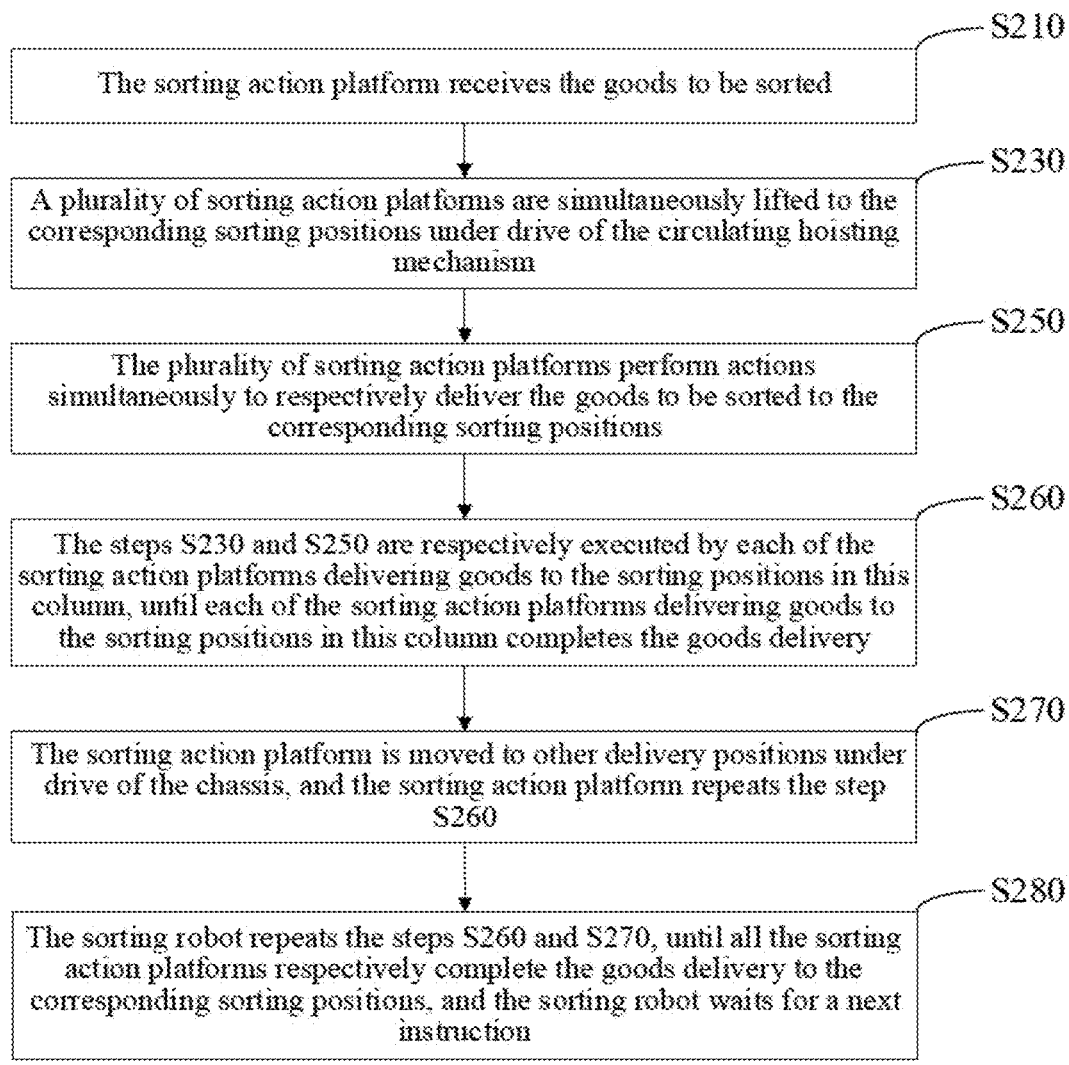
FIG. 25 is a sorting method in a case of a plurality of sorting action platforms according to an embodiment of the present invention.

In an embodiment of the present invention, the actual working condition is that a plurality of columns of the sorting positions are sequentially disposed along a horizontal direction. As shown in FIG. 25, after the step S260, the sorting method further includes step S270: the sorting action platform being moved to other delivery positions under drive of the chassis, and the sorting action platform repeating the step S260. The sorting robot provided in this embodiment preferentially completes the goods delivery to be delivered to one column of sorting positions, and then the sorting action platform is moved to other delivery positions under drive of the chassis to deliver the goods to other columns of sorting positions. The sorting method provided in this embodiment effectively ensures that the sorting robot delivers the goods to be sorted column by column, thereby avoiding time waste caused by the sorting robot repeatedly going back and forth to the same delivery position.

In the foregoing embodiment, after the sorting robot completes delivering to a column of sorting positions from one delivery position, the sorting robot may move to an adjacent column of sorting positions, or may move to a spaced column of sorting positions according to an actual working condition. In a possible implementation, after the sorting robot completes delivering to a column of sorting positions from one delivery position, the sorting robot preferentially is moved to the adjacent column of sorting positions. Further, as shown in FIG. 25, after the step S270, the sorting method further includes step S280: the sorting robot repeating the steps S260 and S270, until all the sorting action platforms respectively complete the goods delivery to the corresponding sorting positions; and the sorting robot waiting for a next instruction. The sorting method provided in this embodiment effectively ensures that each piece of the goods to be sorted is delivered in a case that the sorting efficiency is improved.

In an embodiment of the present invention, as shown in FIG. 23, the sorting robot includes at least two sets of sorting mechanisms, the at least two sets of sorting mechanisms are disposed on the vertical framework, shipping directions of the sorting action platforms in the at least two sets of sorting mechanisms are the same, the at least two sets of sorting mechanisms are respectively raised or lowered under drive of the circulating lifting mechanism, and a spacing between neighboring ones of the at least two sets of sorting mechanisms along a horizontal arrangement direction of the sorting positions is an integer multiple of a spacing between neighboring ones of the plurality of sorting positions along a horizontal direction; and each set of sorting mechanism simultaneously and independently executes the step S260. A plurality of sorting mechanisms disposed on the vertical framework can double the number of the goods to be sorted carried by the sorting robot, which significantly improves the overall sorting efficiency of the sorting robot. On the premise of the same amount of sorting tasks, the travel of the sorting robot between receiving and delivering goods is effectively saved. It may be understood that, the sorting method provided in this embodiment can also simultaneously deliver the goods to be sorted to the sorting positions on both sides of the circulation path.

Further, as shown in FIG. 23, the sorting robot includes at least two sets of circulating lifting mechanisms, the number of the circulating lifting mechanisms is the same as the number of the sorting mechanisms, and each set of sorting mechanism is driven by a separate circulating lifting mechanism; and each set of sorting mechanism simultaneously and independently executes the step S260 under drive of the separate circulating lifting mechanism. Each set of sorting mechanism is driven by a separate circulating lifting mechanism, which minimizes a waiting time caused by sequential execution of delivery actions between a plurality of sorting mechanisms, and effectively improves the overall sorting efficiency of the sorting robot.

Figure 26:
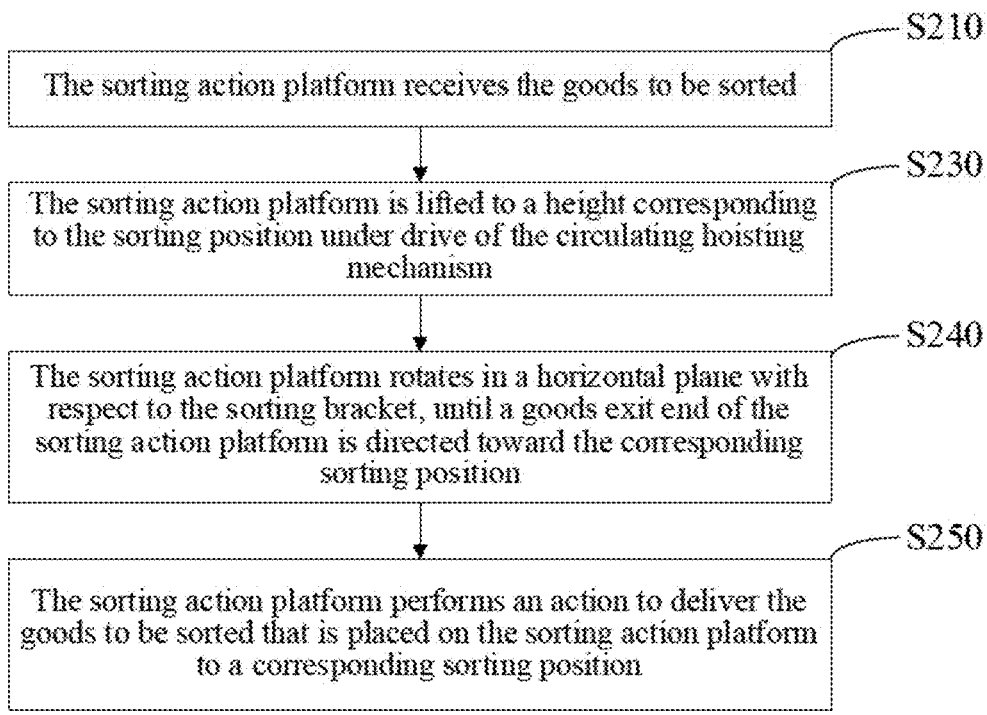
FIG. 26 is a sorting method in a case that a sorting action platform is rotatable according to an embodiment of the present invention.
Figure 27:
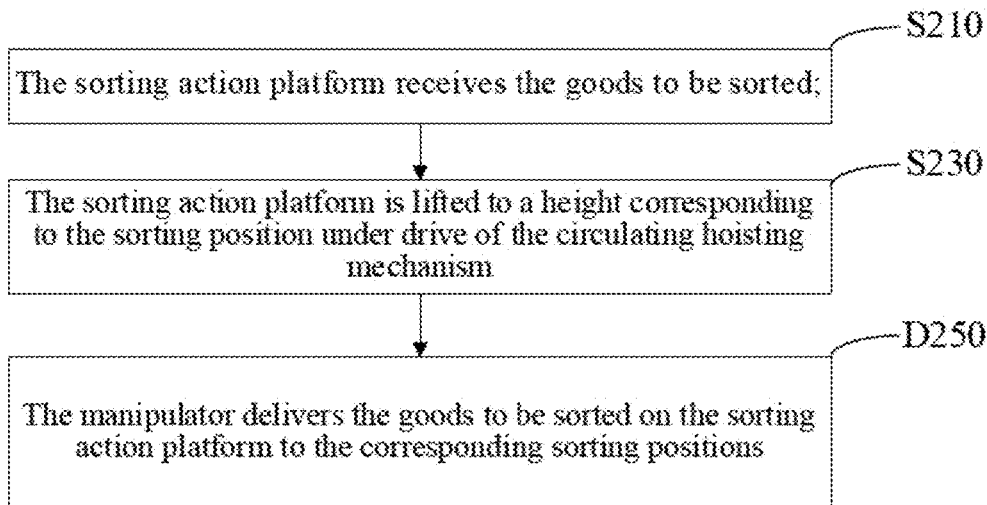
FIG. 27 is a sorting method of executing a delivery action by a manipulator according to an embodiment of the present invention.

In an embodiment of the present invention, in order to further improve the adaptability of the sorting robot and the sorting method to actual working conditions, and improve the sorting efficiency of the sorting robot and the sorting method, the sorting action platform is disposed rotatably on the sorting bracket, and the sorting action platform can rotate in a horizontal plane with respect to the sorting bracket; As shown in FIG. 26, after the step S230, the sorting method further includes step S240: the sorting action platform rotating in a horizontal plane with respect to the sorting bracket, until a goods exit end of the sorting action platform is directed toward the corresponding sorting position. The sorting method provided in this embodiment solves the situation that an initial delivery end of the sorting action platform does not correspond to the sorting position. In addition, the sorting method provided in this embodiment can allow the sorting action platform to deliver goods to sorting positions in different directions at one delivery position.

In an actual working condition, sorting robots need to deliver fragile, large-sized, or irregularly-shaped goods. As shown in FIG. 23 and FIG. 10, in an embodiment of the present invention, the sorting mechanism further includes a manipulator, the manipulator is disposed on the vertical framework, the manipulator is able to deliver the goods to be sorted on the sorting action platform to the corresponding sorting positions, or the manipulator is able to put the goods onto the sorting action platform; and the sorting method includes step D250 which is an alternative of the step S250: the manipulator delivering the goods to be sorted on the sorting action platform to the corresponding sorting positions. The manipulator and the sorting action platform work in coordination with each other, thereby improving the adaptability of the sorting method provided in this embodiment to actual working conditions. It may be understood that, when the sorting robot receives the goods to be sorted, the manipulator can also put the goods onto the sorting action platform.

Figure 28:
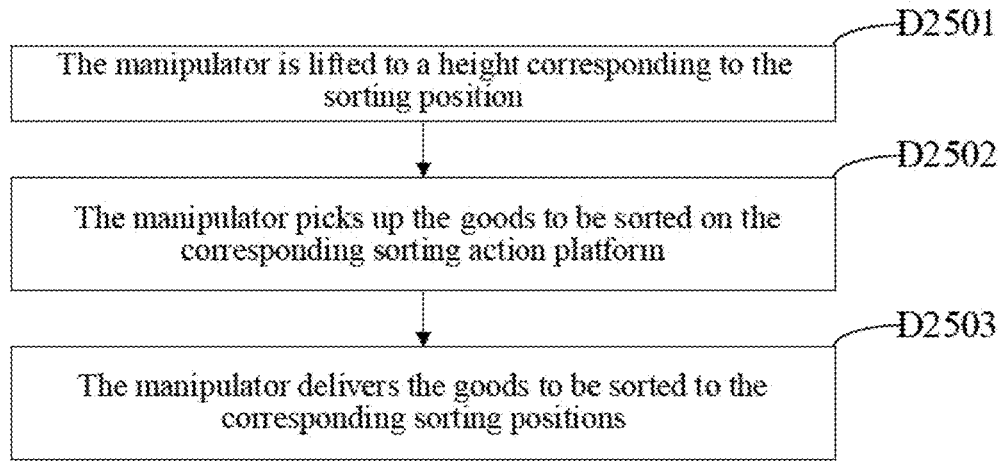
FIG. 28 shows a detailed process of step D50 in FIG. 27.

Further, as shown in FIG. 28, the manipulator is slidably disposed on the vertical framework along the vertical direction; and the step D250 includes:

D2501: the manipulator being raised or lowered to a height corresponding to the sorting position;

D2502: the manipulator picking up the goods to be sorted on the corresponding sorting action platform;

D2503: the manipulator delivering the goods to be sorted to the corresponding sorting positions.

The manipulator slidably disposed along the vertical direction can take goods of different heights, and can also deliver the taken goods to sorting positions of different heights, or convey the taken goods onto the sorting action platforms of different heights.

Figure 29:
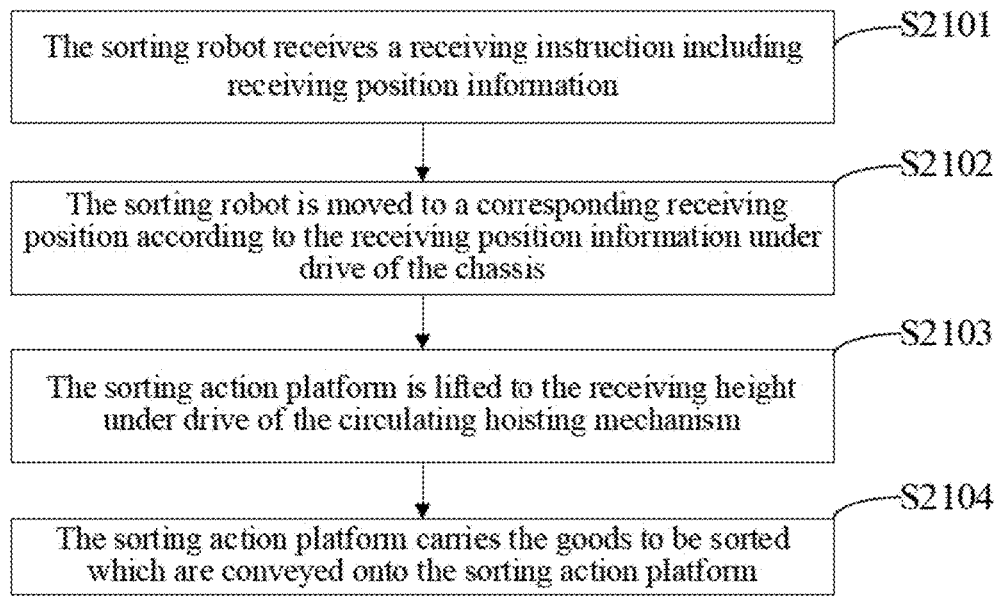
FIG. 29 shows a process of receiving goods by a sorting robot according to an embodiment of the present invention.

In an actual working condition, when a receiving position for receiving the goods is different from a delivery position for delivering the goods, the sorting robot needs to go back and forth between the receiving position for receiving the goods and the delivery position for delivering the goods. As shown in FIG. 29, in an embodiment of the present invention, the step S210 includes:

S2101: the sorting robot receiving a receiving instruction including receiving position information;

S2102: the chassis driving the sorting robot to move to a corresponding receiving position according to the receiving position information; and S2104: the sorting action platform carrying the goods to be sorted which are conveyed onto the sorting action platform.

Further, the sorting action platform has a receiving height when receiving the goods, and after the step S2102, the method further includes step S2103: the sorting action platform being raised or lowered to the receiving height under drive of the circulating lifting mechanism. It may be understood that, when a receiving end of the sorting action platform is inconsistent with an incoming direction, the sorting action platform rotates until the receiving end of the sorting action platform is consistent with the incoming direction.

Figure 30:
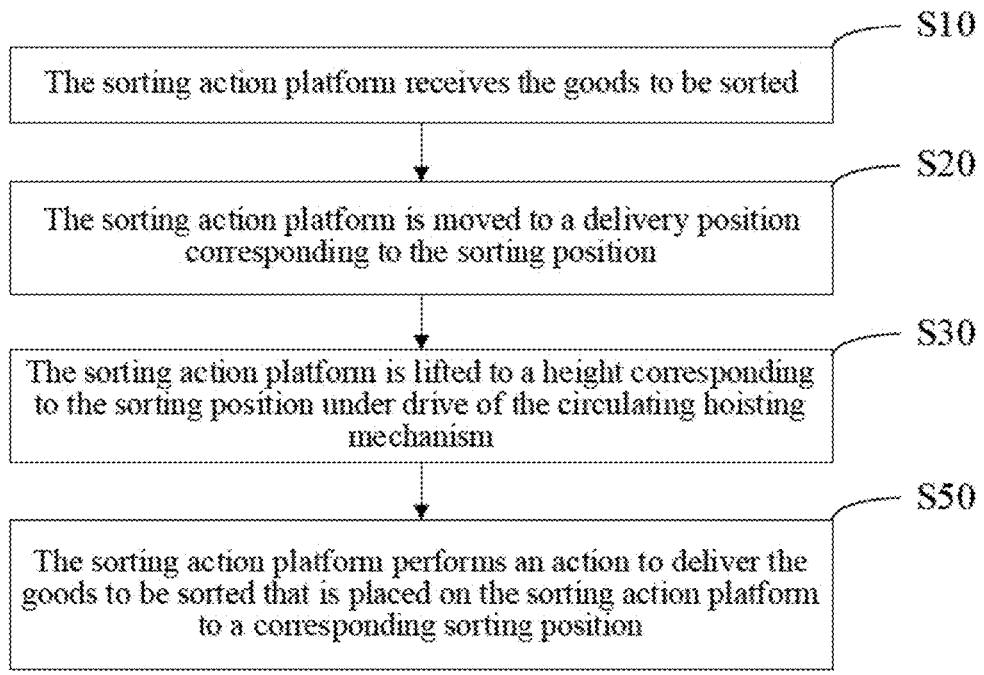
FIG. 30 is a sorting method according to still another embodiment of the present invention.
Figure 31:
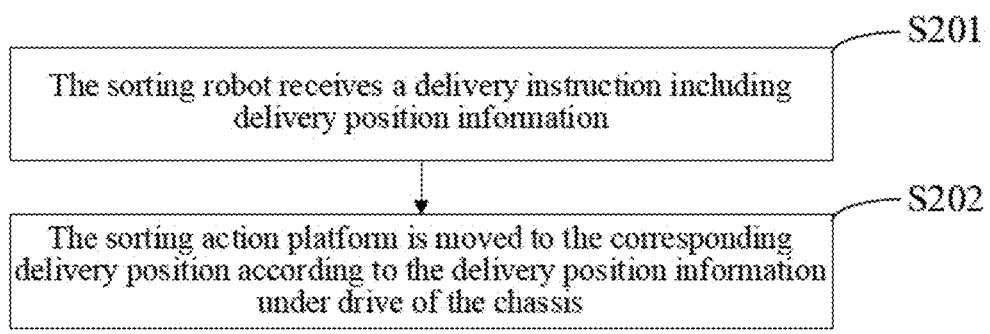
FIG. 31 shows a detailed process of step S20 in FIG. 30.

In an embodiment of the present invention, as shown in FIG. 30, before the step S230, the sorting method further includes S220: the sorting action platform being moved to a delivery position corresponding to the sorting position. Specifically, as shown in FIG. 31, the step S220 includes:

S2201: the sorting robot receiving a delivery instruction including delivery position information; and S2202: the sorting action platform is moved to the corresponding delivery position according to the delivery position information under drive of the chassis.

Further, the step S2202 includes:

S22021: the chassis driving the sorting robot to move to a sorting side of the shelving unit; and S22023: the chassis driving the sorting robot to move along a horizontal extension direction of the shelving unit until the sorting action platform moves to the delivery position corresponding to the sorting position.

Specifically, after the step S22021, the sorting method further includes step S22022: the chassis driving the sorting robot to move until the sorting action platform approaches a sorting area of the shelving unit.

Figure 32:
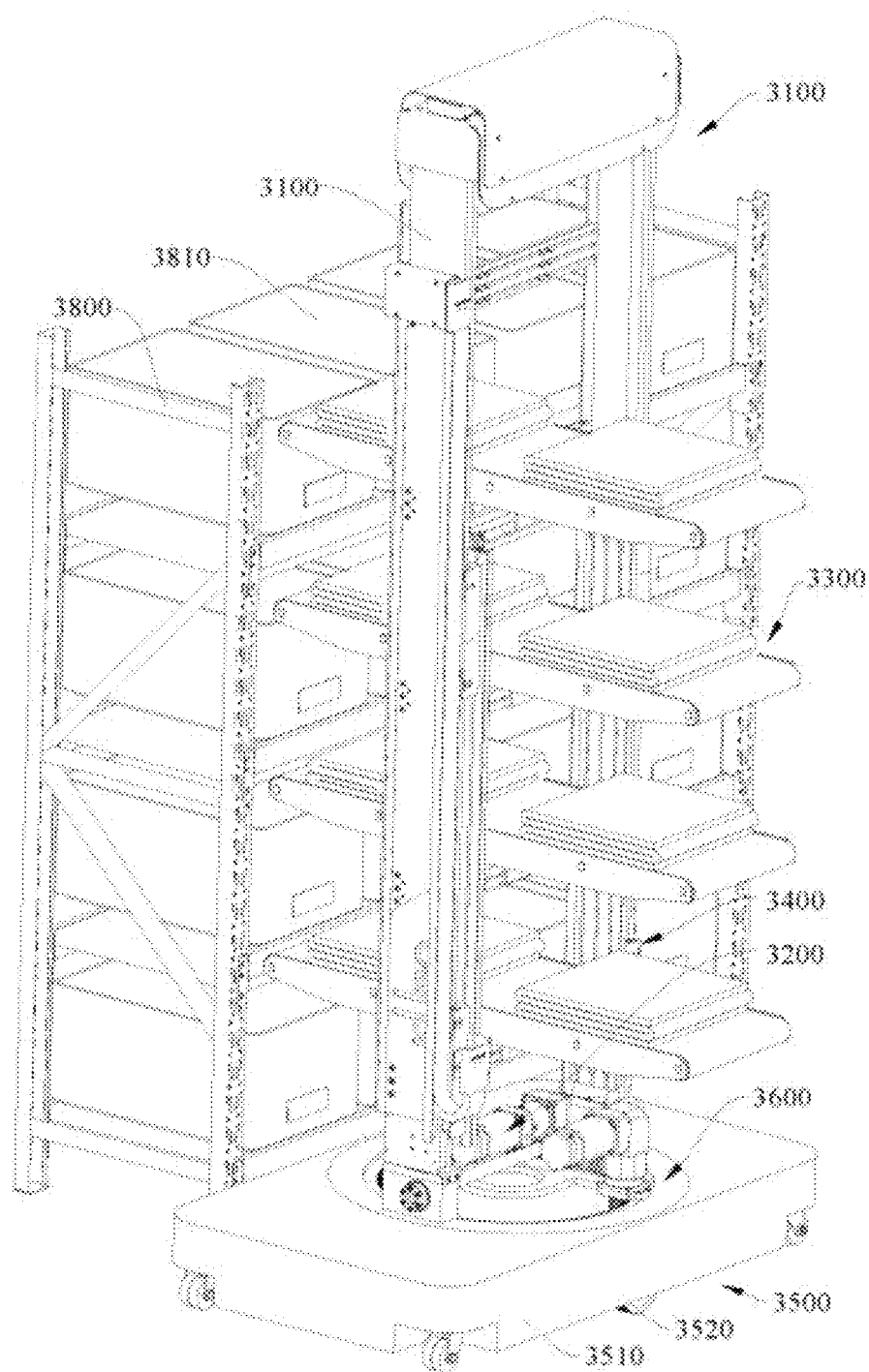
FIG. 32 is a schematic structural diagram of a sorting robot delivering goods to a shelving unit according to an embodiment of the present invention.
Figure 33:
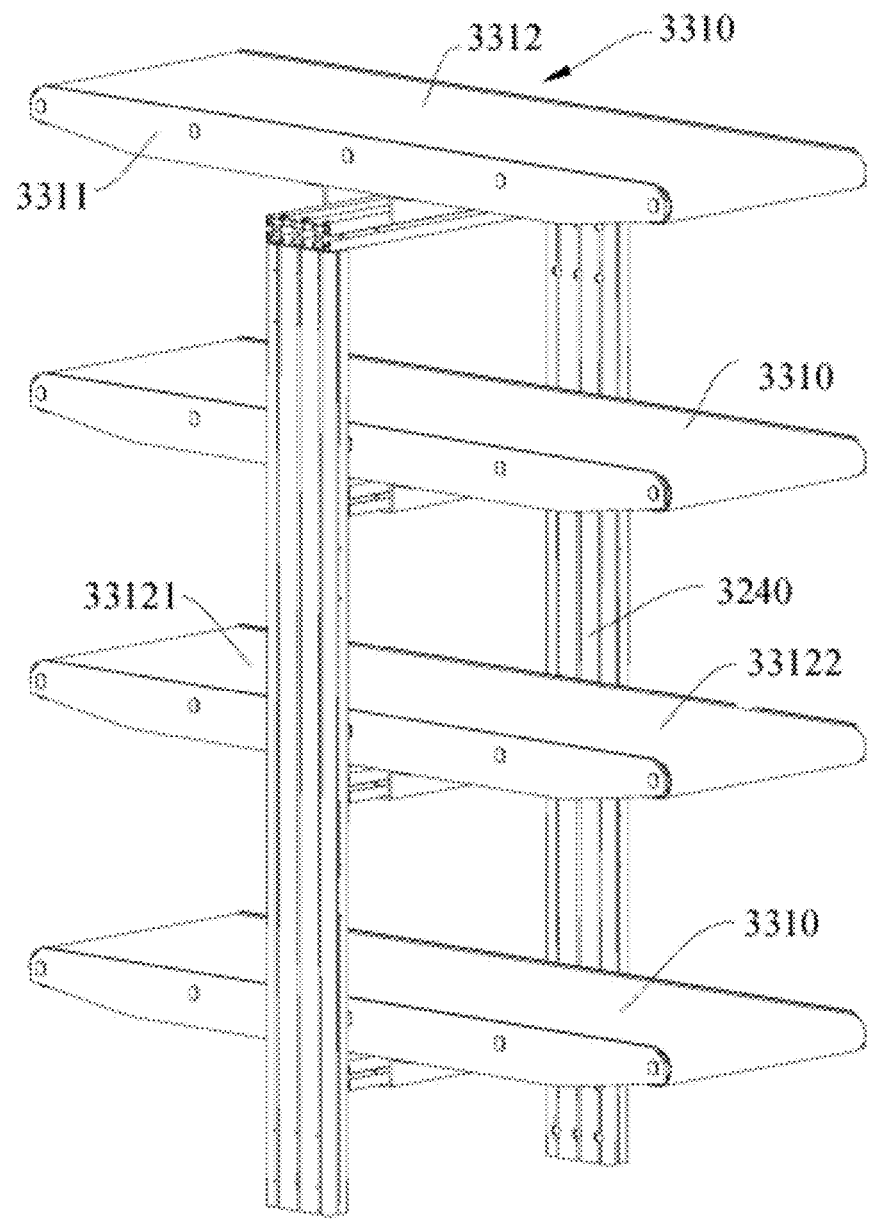
FIG. 33 is a schematic structural diagram of a plurality of sorting components disposed at intervals according to an embodiment of the present invention.

As shown in FIG. 32 and FIG. 33, an embodiment of the present invention provides a sorting robot 310. The sorting robot 310 includes a vertical framework 3100, a lifting mechanism 3200, and a sorting mechanism 3300. The vertical framework 3100 is disposed along a vertical direction. The lifting mechanism 3200 is capable of rising or falling along the vertical direction with respect to the vertical framework 3100. The sorting mechanism 3300 is disposed movably along the vertical direction on the vertical framework 3100. The sorting mechanism 3300 is connected to the lifting mechanism 3200. The sorting mechanism 3300 can be raised or lowered along the vertical direction under drive of the lifting mechanism 3200. The sorting mechanism 3300 drives goods to be sorted to be synchronously raised or lowered, and the sorting mechanism 3300 can deliver the goods to be sorted to a corresponding sorting position 3810. The sorting robot 310, the lifting mechanism 3200, and the sorting mechanism 3300 work in coordination with each other, thereby realizing the automation of goods sorting, reducing the cost of goods sorting, and greatly improving the efficiency of goods sorting. In addition, the sorting mechanism 3300 is moved to different heights under drive of the lifting mechanism 3200, so that the goods to be sorted can be delivered to the sorting positions 3810 having different heights, which leads to strong universality and a reduction in the occupation of the sorting position 3810.

The sorting mechanism 3300 is an action execution terminal of the sorting robot 310 provided by the present invention, and a function of the sorting mechanism 2300 is to deliver the goods to be sorted to the corresponding sorting position 3810. The number and arrangement of execution terminals that the sorting robot 310 can use to deliver the goods to be sorted can directly affect the overall sorting efficiency of the sorting robot 310. As shown in FIG. 32 and FIG. 33, in an embodiment of the present invention, the sorting mechanism 3300 includes a plurality of sorting components 3310. The plurality of sorting components 3310 are disposed on the vertical framework 3100 at intervals along the vertical direction. The plurality of sorting components 3310 are connected to the lifting mechanism 3200, and can be synchronously raised or lowered along the vertical direction under drive of the lifting mechanism 3200. Each of the sorting components 3310 can respectively drive the goods to be sorted to synchronously rise or fall, and can deliver the goods to be sorted to the corresponding sorting position 3810. The plurality of sorting components 3310 allow the sorting robot 310 provided in this embodiment to carry a plurality of goods to be sorted at a time, which can significantly improve the sorting efficiency of the sorting robot 310. It may be understood that, the plurality of sorting components 3310 can perform actions of goods delivery one by one or deliver the goods simultaneously, which further improves the adaptability of the sorting robot 310 provided in this embodiment to actual working conditions.

It may be understood that, when the operator directly places the goods to be sorted on the sorting component 3310 of the sorting robot 310, the sorting component 3310 can be raised or lowered to a suitable height, and the operator does not need to board a ladder or other auxiliary platform. Therefore, the risk factor of the operator directly placing the goods to be sorted on the sorting robot 310 is reduced, and the time for the operator to place the goods to be sorted is effectively saved.

Optionally, the sorting mechanism 3300 is a manipulator, a push rod capable of acting, a plane with a conveying function or the like. In a possible implementation, as shown in FIG. 33, the sorting component 3310 includes a sorting bracket 3311 and a sorting action platform 3312. The sorting bracket 3311 is disposed movably on the vertical framework 3100. The sorting bracket 3311 is connected to the lifting mechanism 3200, and can be raised or lowered along the vertical direction under drive of the lifting mechanism 3200. The sorting action platform 3312 is disposed on the sorting bracket 3311, and can carry the goods to be sorted. The sorting action platform 3312 delivers the goods to be sorted to the corresponding sorting position 3810 when performing an action. Structure manners of the sorting bracket 3311 and the sorting action platform 3312 are convenient for carrying the goods to be sorted, and the sorting action platform 3312 has strong adaptability to goods in different sizes or different weights, which can ensure safe sorting of volatile and fragile goods at the same time.

Optionally, when the sorting action platform 3312 performs a sorting action, a platform surface action of the sorting action platform 3312 or any other action mechanism delivers the goods to be sorted to the corresponding sorting position 3810. In an embodiment of the present invention, the sorting action platform 3312 includes a sorting belt and a sorting drive component. The sorting drive component is disposed on the sorting bracket 3311. The sorting belt is disposed rotatably on the sorting bracket 3311. The sorting belt is in transmission connection with the sorting drive component. The sorting belt is used to carry the goods to be sorted. The sorting belt delivers the goods to be sorted to the corresponding sorting positions 3810 when the sorting belt rotates under drive of the sorting drive component. An upper surface of the rotating sorting belt forms a support surface for the goods to be sorted, and the delivery action performed by the sorting action platform 3312 is the rotation of the sorting belt. By adopting the method of sorting belt and sorting drive component, the sorting action platform 3312 does not need to occupy extra action space when performing the sorting action, and the sorting belt has the advantages of stable performance, low cost, and easy replacement. In some other embodiments of the present invention, goods placed on the sorting action platform 3312 may be pushed to the sorting position 3810 by an elastic mechanism, or pushed to the sorting position 3810 by a cam mechanism; or the platform surface of the sorting action platform 3312 is formed by a plurality of rotatable rollers. The present invention does not limit a specific structural form of the sorting action platform 3312.

The function of the sorting drive component is to drive the sorting belt to perform the rotation of the set stroke, to deliver the goods to be sorted thereon to the corresponding sorting position 3810, thereby completing the delivery action of the goods. In a possible implementation, the sorting drive component includes a sorting motor and two sorting shafts. The two sorting shafts are spaced apart on the sorting bracket 3311. The sorting belt is sheathed on the two sorting shafts. At least one sorting shaft is in transmission connection with the sorting motor. The sorting motor can rotate forward or reverse. The combination manner between the motor and the sorting shaft has advantages such as high transmission efficiency, easy control, mature technology, and low cost. Further, an output shaft of the motor is directly connected to the sorting shaft or in transmission connection with the sorting shaft through a gear structure. In an embodiment of the present invention, the motor is a stepper motor. In another possible implementation, the sorting drive component is available in the form of pneumatic motor-shaft fits or hydraulic motor-shaft drives, as long as they are capable of driving the sorting belt to rotate.

Further, the sorting mechanism 3300 is further equipped with a photographing component. The photographing component is configured to obtain image information of the goods or the sorting position 3810, to judge the height of the sorting action platform 3312 with respect to the sorting position 3810. In this embodiment, the image information is a two-dimensional code affixed to the goods to be sorted or the sorting position 3810.

In an embodiment of the present invention, as shown in FIG. 33, the sorting action platform 3312 has a first sorting position 33121 and a second sorting position 33122 along a direction for delivering goods by the sorting belt. The first sorting position 33121 and the second sorting position 33122 are configured to carry the goods to be sorted. When the sorting belt rotates, the goods to be sorted at the first sorting position 33121 and the goods to be sorted at the second sorting position 33122 are sequentially delivered to the corresponding sorting positions 3810. The first sorting position 33121 and the second sorting position 33122 on the sorting action platform 3312 allow one sorting action platform 3312 to simultaneously carry two goods to be sorted, which multiplies the number of goods to be sorted carried by the sorting robot 310. It may be understood that, the goods to be sorted at the first sorting position 33121 and the goods to be sorted at the second sorting position 33122 need to be delivered to different sorting positions 3810 or to the same sorting position 3810. In other embodiments, when the sorting belt rotates, the goods to be sorted at the second sorting position 33122 and the goods to be sorted at the first sorting position 33121 are sequentially delivered to the corresponding sorting positions 3810.

In another embodiment of the present invention, two sorting components 3310 are disposed at each vertical height where the sorting component 3310 is installed on the vertical framework 3100, and delivery directions of the two sorting components 3310 located at the same vertical height are opposite. The disposal of two sorting components 3310 at each vertical height where the sorting component 3310 is installed on the vertical framework 3100 also implements the multiplication of the number of goods to be sorted carried by the sorting robot 310. In addition, delivery directions of the two sorting components 3310 at the same height are opposite. When there are sorting positions 3810 in the delivery directions of the two sorting components 3310 at the same vertical height, the two sorting components 3310 at the same height can simultaneously and respectively perform the sorting action, which increases the number of goods to be sorted carried by the sorting robot 310, and further improves the delivery efficiency of the sorting robot 310.

Figure 34:
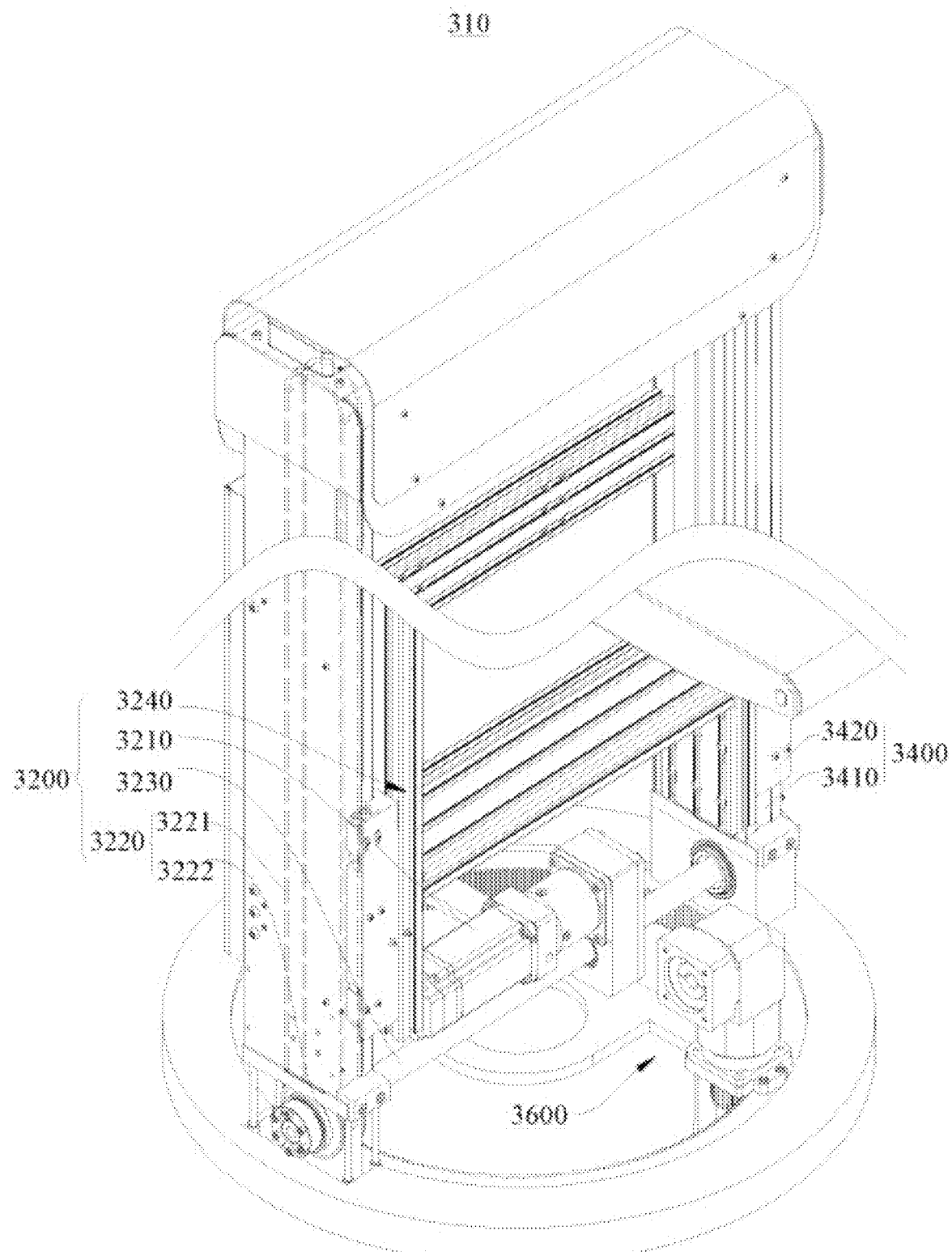
FIG. 34 is a schematic diagram of a lifting structure in a sorting robot according to an embodiment of the present invention.

Optionally, the plurality of sorting components 3310 installed on the vertical framework 3100 can be respectively raised or lowered independently or synchronously, which may be designed according to actual working conditions. In an embodiment of the present invention, as shown in FIG. 33 and FIG. 34, the lifting mechanism 3200 includes a lifting frame 3240 disposed movably along the vertical direction on the vertical framework 3100. The plurality of sorting components 3310 are fixedly disposed on the lifting frame 3240 along the vertical direction, and the lifting mechanism 3200 drives, by the lifting frame 3240, the plurality of sorting components 3310 to synchronously rise or fall along the vertical direction. It can be understood that the lifting frame 3240 is a closed framework or any structure in which the sorting components 3310 can be fixedly installed along the vertical direction, and the present invention does not limit the specific structure of the lifting frame 3240. In a possible implementation, the lifting frame 3240 is a rectangular framework, and the plurality of sorting components 3310 are respectively fixedly installed on the lifting frame 3240 along the vertical direction. Using the lifting frame 3240 to implement the synchronous rising or falling of the plurality of sorting components 3310 effectively ensures the mechanical strength of the sorting robot 310, and the plurality of sorting components 3310 and the lifting frame 3240 can be made into modules, which effectively improves the efficiency of assembly, disassembly, and maintenance of the sorting robot 310. It should be understood that after the plurality of sorting components 3310 and the lifting frame 3240 are made into modules, there is high interchangeability between modules.

A function of the lifting mechanism 3200 is to drive the sorting mechanism 3300 in the foregoing embodiments to be raised or lowered along the vertical direction. In an embodiment of the present invention, as shown in FIG. 32 and FIG. 34, the lifting mechanism 3200 further includes a power supply 3210 and a transmission component 3220. The power supply 3210 and the transmission component 3220 are respectively disposed on the vertical framework 3100. The power supply 3210 is in transmission connection with an input side of the transmission component 3220, and an output side of the transmission component 3220 is connected to the lifting frame 3240. The power supply 3210 and the transmission component 3220 are respectively disposed on the vertical framework 3100, and the transmission connection between the power supply 3210 and the transmission component 3220 facilitates mounting or removal of the lifting mechanism 3200 on the vertical framework 3100. Optionally, the power supply 3210 outputs power in a form of rotation, linear motion, or any other form of motion, and the transmission component 3220 in transmission connection with the power supply 3210 finally outputs motion along the vertical direction. In a possible implementation, the power supply 3210 includes a drive motor. The drive motor is in transmission connection with the input side of the transmission component 3220. The power supply 3210 in the form of a motor operates more stably. Further, the drive motor can rotate forward or reverse, which is convenient for controlling a rising and falling process of the lifting mechanism 3200.

In a possible implementation, as shown in FIG. 32 to FIG. 34, the transmission component 3220 includes a hauling rope 3221 and at least two runners 3222. The at least two runners 3222 are disposed rotatably on the vertical framework 3100, and are arranged on the vertical framework 3100 at intervals along the vertical direction. At least one runner 3222 is in transmission connection with the power supply 3210. The hauling rope 3221 is sheathed on the at least two runners 3222, and is fixedly connected to the lifting frame 3240. When at least one runner 3222 rotates, it drives the hauling rope 3221 to move in a manner of meshing or friction, and then drives the lifting frame 3240 to rise or fall along the vertical direction. The transmission component 3220 in a form of the hauling rope 3221 and the runner 3222 has advantages such as simple structure, stable performance, low cost, and easy replacement while realizing rising and falling. In this embodiment, the sorting bracket 3311 is fixedly connected to the hauling rope 3221.

In a specific embodiment of the present invention, as shown in FIG. 32 to FIG. 34, the hauling rope 3221 is annular, and the sorting bracket 3311 is fixedly installed on the hauling rope 3221. The two runners 3222 are disposed at intervals on the vertical framework 3100 along the vertical direction, and the hauling rope 3221 is sleeved on the two runners 3222 disposed along the vertical direction. Any of the runners 3222 drives the hauling rope 3221 to rotate in a vertical plane by friction or meshing when rotating, thereby driving the sorting mechanism 3300 to be raised or lowered in the vertical plane. The runner 3222 is a V-belt wheel, and the hauling rope 3221 is a V-belt. The V-belt wheel drives the V-belt to move by friction when rotating. According to an actual situation, the runner 3222 may further be a sprocket. Correspondingly, the hauling rope 3221 may be a chain. The sprocket drives the chain to move by meshing when rotating. An output shaft of the drive motor is in transmission connection with one or more V-belt wheels, and the drive motor drives the runner 3222 and the hauling rope 3221 to rotate.

The lifting frame 3240 in a form of a rectangular framework drives the plurality of sorting components 3310 to rise or fall along the vertical direction in a vertical plane. Further, the lifting mechanism 3200 includes a plurality of transmission components 3220. Input sides of the plurality of transmission components 3220 are respectively in transmission connection with the power supply 3210, and output sides of the plurality of transmission components 3220 are respectively connected to different positions of the lifting frame 3240. In a specific embodiment, as shown in FIG. 34, the lifting mechanism 3200 includes two transmission components 3220, the lifting frame 3240 has two lifting columns extending in the vertical direction, and the two lifting columns serve as two opposite sides of the rectangular framework in the vertical direction. The input sides of the two transmission components 3220 are respectively in transmission connection with the power supply 3210, and the output sides of the plurality of transmission components 3220 are respectively fixedly connected to the two lifting columns of the lifting frame 3240. In a possible implementation, the transmission component 3220 further includes a transmission shaft 3230. An output end of the drive motor is in transmission connection with the middle part of the transmission shaft 3230, and two ends of the transmission shaft 3230 are respectively connected to the runners 3222 of the two transmission components 3220, so that the synchronous rising or falling of the two transmission components 3220 driven by the one power supply 3210 is implemented, and the lifting stability of the lifting mechanism 3200 is increased. In other embodiments, the number of transmission components 3220 may alternatively be three or the like.

Figure 35:
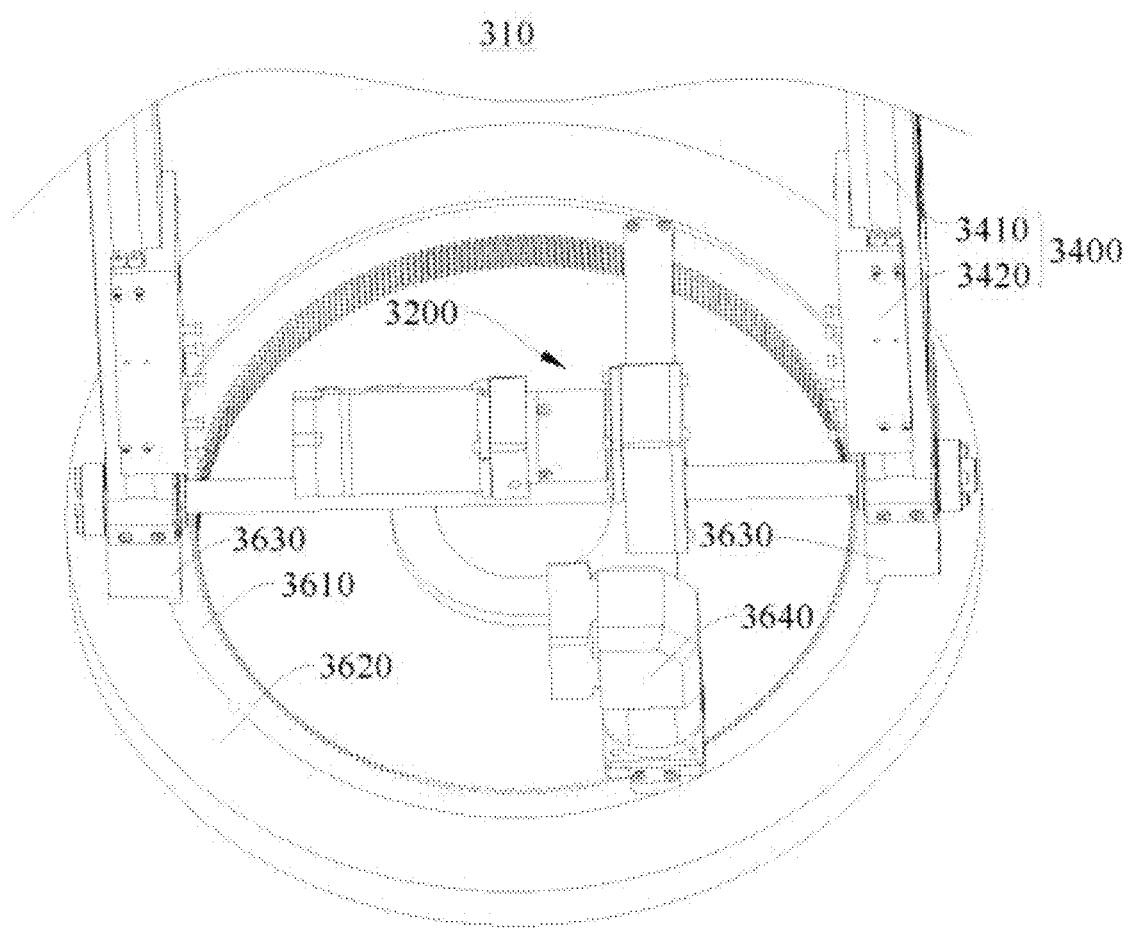
FIG. 35 is a schematic diagram of a rotation structure in a sorting robot according to an embodiment of the present invention.

In an embodiment of the present invention, as shown in FIG. 34 and FIG. 35, the sorting robot 310 further includes a guide mechanism 3400. The guide mechanism 3400 is disposed between the vertical framework 3100 and the lifting frame 3240, and is configured to keep the lifting frame 3240 to rise or fall along the vertical direction. Specifically, the guide mechanism 3400 includes a guide rail 3410 and a guide component 3420. The guide rail 3410 is fixedly disposed on the vertical framework 3100 in the vertical direction, the guide component 3420 is fixedly connected to the lifting frame 3240, and the guide component 3420 keeps in contact with the guide rail 3410 during the rising or falling of the lifting frame 3240 along the vertical direction. Optionally, contact between the guide component 3420 and the guide rail 3410 is rolling contact, sliding contact, or other kinds of contact. Further, the guide component 3420 includes a guide slider, and the guide slider is fixedly connected to the lifting frame 3240. During the rising or falling of the lifting frame 3240 along the vertical direction, the guide slider keeps in sliding contact with the guide rail 3410.

In an embodiment of the present invention, as shown in FIG. 34 and FIG. 35, the guide mechanism 3400 includes a plurality of guide rails 3410 and a plurality of guide components 3420. The plurality of guide rails 3410 cooperate with the plurality of guide components 3420 one by one. The plurality of guide rails 3410 are respectively fixedly disposed on the vertical framework 3100 along the vertical direction. Each of the guide components 3420 are fixedly connected to the lifting frame 3240, and each guide component 3420 respectively keeps in contact with the corresponding guide rail 3410 during the rising or falling of the lifting frame 3240 along the vertical direction. The plurality of guide rails 3410 and the plurality of guide components 3420 further ensure the smooth rising and falling of the lift frame 3240 along the vertical direction. In a possible implementation, the vertical framework 3100 has two uprights disposed in parallel along the vertical direction, and guide rails 3410 are respectively installed on the two uprights. The guide rail 3410 is formed by group welding of sheet material and section bar.

In the foregoing embodiments, as shown in FIG. 32, the sorting robot 310 further includes a movable chassis 3500, and the vertical framework 3100 is disposed on the chassis 3500. The movable chassis 3500 may drive the sorting robot 310 to move, which greatly improves adaptability of the sorting robot 310 in this embodiment to actual working conditions. Specifically, the chassis 3500 includes a plate frame 3510, a marching drive component, and a plurality of rotating wheels 3520. The vertical framework 3100 is disposed on an upper part of the plate frame 3510, the plurality of rotating wheels 3520 are disposed on a bottom of the plate frame 3510, and the marching drive component is disposed on the plate frame 3510. At least one rotating wheel 3520 is in transmission connection with the marching drive component. Further, at least two rotating wheels 3520 are respectively in transmission connection with the marching drive component, and the at least two rotating wheels 3520 respectively in transmission connection with the marching drive component are distributed on two sides of the plate frame 3510 along a marching direction, thereby realizing a steering function of the chassis 3500. The marching drive component includes at least two wheel drive motors, and the at least two rotating wheels 3520 distributed on the two sides of the plate frame 3510 along the marching direction are respectively driven by separate wheel drive motors. The at least two rotating wheels 3520 distributed on the two sides of the plate frame 3510 along the marching direction are respectively driven by the separate wheel drive motors, which may simplify a transmission structure on the chassis 3500.

In a specific embodiment, a driving wheel and a driven wheel are installed on the chassis 3500. The driving wheel and the driven wheel may respectively rotate relative to the chassis 3500. The driving wheel and the driven wheel jointly support the chassis 3500. The driving wheel is driven by a wheel drive motor to make the chassis 3500 to move. By configuring the movable chassis 3500, the sorting robot 310 may deliver goods among a plurality of goods shelves 380. The number of the driving wheels is two, and the two driving wheels are symmetrically distributed. Correspondingly, the number of the wheel drive motors is two. The two driving wheels are respectively driven by the two wheel drive motors, which may enable rotation speed of the two driving wheels to be different, so as to realize steering of the chassis 3500. The number of the driven wheels is four, and the four driven wheels are distributed in a rectangular shape. The driven wheel may be a universal wheel or any other wheel structures with a steering function. According to an actual situation, the number of the driven wheels is not limited to four, but may further be six, three, or the like.

In this embodiment, a guide apparatus (not shown) is further installed on the chassis 3500, and the guide apparatus is a camera, which is configured to identify a graphic code attached to the ground, so that the chassis 3500 can march along a preset path. The graphic code may be a two-dimensional code, a barcode, or some customized identification codes. In some other embodiments, the guide apparatus is a laser guide apparatus, configured to guide the chassis 3500 to march along a laser beam; or the guide apparatus is a short-wave receiving apparatus, which receives a preset short-wave signal to guide the chassis 3500 to march along a preset path. It should be noted that, in some other embodiments, the chassis 3500 may be omitted. The vertical framework 3100 is directly fixedly installed on the ground or other platforms, and is only configured to carry goods on the shelving unit 380 around the vertical framework 1100.

In an embodiment of the present invention, as shown in FIG. 32 and FIG. 35, the vertical framework 3100 is disposed rotatably around the axis in the vertical direction on the chassis 3500 to allow the plurality of sorting components 3310 to simultaneously rotate in a horizontal plane, which improves the adaptability of the sorting robot 310 to actual working conditions. Especially in a case that there are two sorting components 3310 with opposite delivery directions at the same height, when the sorting components 3310 on one side complete the delivery, the vertical framework 3100 drives all the sorting components 3310 to rotate by 1380° in the horizontal plane, and the sorting components 3310 on the other side starts to deliver the goods to be sorted. In addition, the vertical framework 3100 disposed rotatably on the chassis 3500 can be automatically adjusted to the delivery direction of the sorting mechanism 3300 to face the sorting position 3810, which improves the adaptability of the sorting robot 310 to actual working conditions and the efficiency of sorting goods.

In a possible implementation, as shown in FIG. 32 and FIG. 35, the sorting robot 310 further includes a rotating mechanism 3600. The rotating mechanism 3600 includes a ring gear 3610, a rotating track 3620, a rotating block 3630, and a rotating motor 3640. The ring gear 3610 and the rotating track 3620 are fixedly disposed on the top of the chassis 3500. The rotating block 3630 is disposed at the bottom of the vertical framework 3100, and is slidably matched with the rotating track 3620. The rotating motor 3640 is fixedly disposed at the bottom of the vertical framework 3100, and an output end thereof is meshed with the ring gear 3610. When rotating, the rotating mechanism 3640 drives the vertical framework 3100 to rotate with respect to the chassis 3500 around the axis in the vertical direction. In other embodiments, alternatively, the rotating motor 3640 may be fixedly installed on the chassis 3500, and the ring gear 3610 may be fixedly installed at the bottom of the vertical framework 3100. This embodiment does not limit the specific manner for the vertical framework 3100 to implement the rotation with respect to the chassis 3500.

In an embodiment of the present invention, the sorting robot 310 further includes a control center. The control center is electrically connected to each of the lifting mechanism 3200 and the sorting mechanism 3300. The control center is configured to control the lifting mechanism 3200 and the sorting mechanism 3300 to perform actions independently or jointly, thereby ensuring the sorting efficiency of the sorting robot 310. In a possible implementation, the control center controls the coordinated action of the chassis 3500, the lifting mechanism 3200, and the sorting mechanism 3300.

Figure 36:
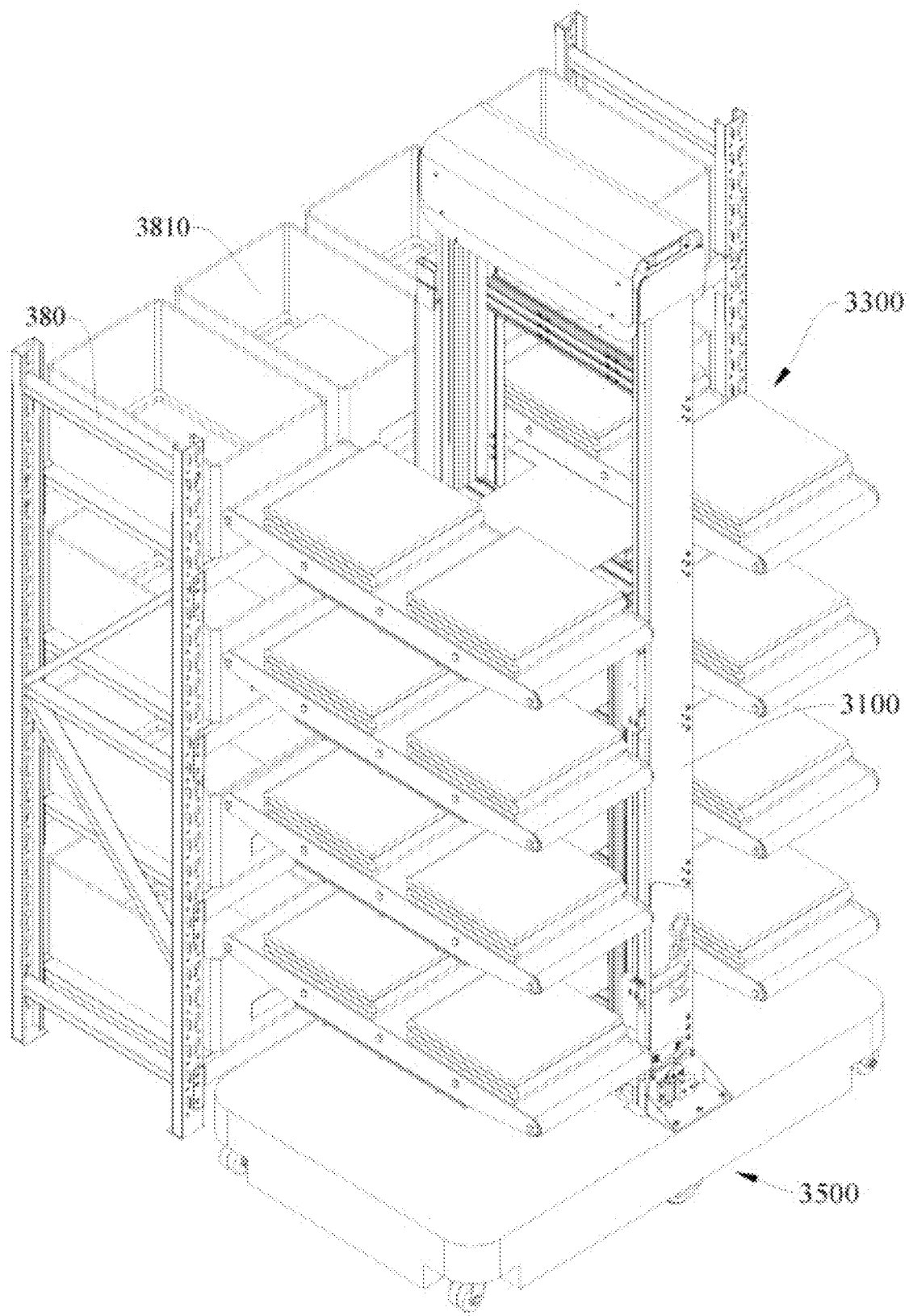
FIG. 36 is a schematic structural diagram of a sorting system according to an embodiment of the present invention.

In an embodiment of the present invention, as shown in FIG. 36, the sorting robot 310 includes two sorting mechanisms 3300 provided in the foregoing embodiments. The two sorting mechanisms 3300 are respectively disposed on two sides of the vertical framework 3100, and are connected to the lifting mechanism 3200. The two sorting mechanisms 3300 can be raised or lowered along the vertical direction under drive of the lifting mechanism 3200. At least two sets of sorting mechanisms 3300 can perform the sorting action individually or simultaneously, which greatly improves the sorting efficiency of the sorting robot 310. Further, the sorting robot 310 includes two lifting mechanisms 3200. The two lifting mechanisms 3200 can be respectively raised or lowered with respect to the vertical framework 3100 along the vertical direction. The two lifting mechanisms 3200 are respectively located on two sides of the vertical framework 3100, and are respectively raised or lowered along the vertical direction under drive of a separate lifting mechanism 3200, so that each sorting mechanism 3300 can perform the sorting action independently. In a possible implementation, the sorting robot 310 further includes two vertical frames 3100. The two vertical frames 3100 are fixedly disposed on the chassis 3500. Each lifting mechanism 3200 and the sorting mechanism 3300 independently driven thereby are disposed on one vertical framework 3100, which is convenient for the assembly of the lifting mechanism 3200, the sorting mechanism 3300, and the vertical framework 3100, and is conducive to form a modular sorting robot 310.

As shown in FIG. 32 and FIG. 36, an embodiment of the present invention further provides a sorting system. The sorting system includes a shelving unit 380 and the sorting robot 310 described in the foregoing embodiments. The sorting robot 310 is configured to deliver the goods to be sorted to the corresponding sort position 3810 on the shelving unit 380. The sorting system provided in this embodiment has the same advantages as the sorting robot 310 in the foregoing embodiments. In a possible implementation, an open container is placed on the shelving unit 380, and one container is one sorting position 3810. Further, the shelving unit 380 has at least two sorting positions 3810 of different heights. The sorting mechanism 3300 can be raised or lowered to a height of a corresponding sorting position 3810 under the drive of the lifting mechanism 3200. The sorting mechanism 3300 can deliver the goods to be sorted to the corresponding sorting position 3810.

As shown in FIG. 32 and FIG. 33, an embodiment of the present invention provides a sorting robot 310. The sorting robot 310 includes the chassis 3500, the vertical framework 3100, the lifting mechanism 3200, the sorting mechanism 3300, and the control center. The chassis 3500 is capable of moving on the ground. The vertical framework 3100 is disposed on the chassis 3500, and is disposed along the vertical direction. The lifting mechanism 3200 is capable of rising or falling along the vertical direction with respect to the vertical framework 3100. The sorting mechanism 3300 includes a plurality of sorting components 3310. The plurality of sorting components 3310 are disposed on the vertical framework 3100 at intervals along the vertical direction. The plurality of sorting components 3310 are respectively connected to the lifting mechanism 3200, and can be synchronously raised or lowered along the vertical direction under drive of the lifting mechanism 3200. Each of the sorting components 3310 can be synchronously raised or lowered while carrying the goods to be sorted, and can deliver the goods to be sorted to the corresponding sorting position 3810. The control center is electrically connected to each of the chassis 3500, the lifting mechanism 3200, and the sorting mechanism 3300, and is configured to control the lifting mechanism 3200 and the sorting mechanism 3300 to perform actions individually or jointly.

The sorting robot 310, the lifting mechanism 3200, and the sorting mechanism 3300 work in coordination with each other, thereby realizing the automation of goods sorting, reducing the cost of goods sorting, and greatly improving the efficiency of goods sorting. In addition, the sorting mechanism 3300 is moved to different heights under drive of the lifting mechanism 3200, so that the goods to be sorted can be delivered to the sorting positions 3810 having different heights, which leads to strong universality and a reduction in the occupation of the sorting positions 3810.

Figure 37:
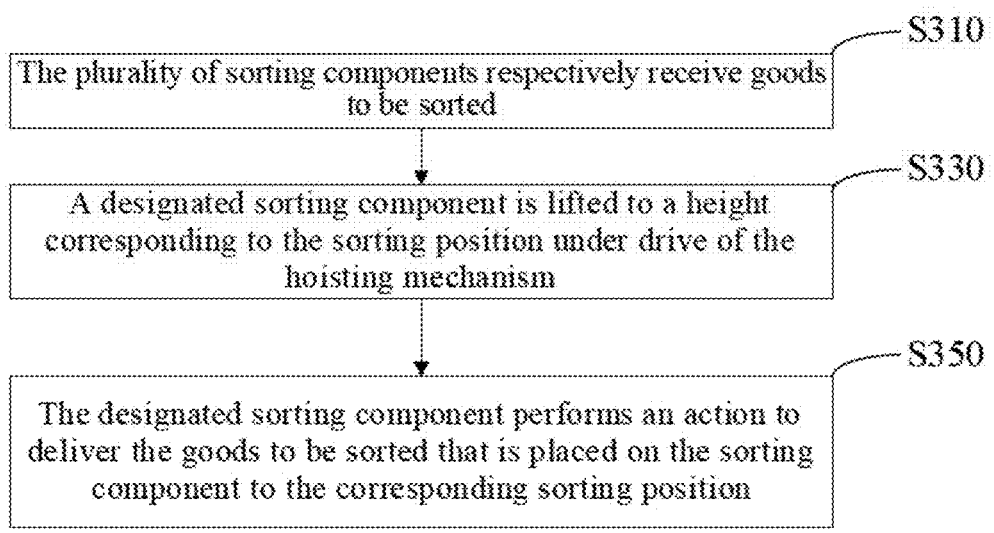
FIG. 37 is a sorting method according to an embodiment of the present invention.

As shown in FIG. 37, an embodiment of the present invention provides a sorting method, which is applicable to the sorting robot, where the sorting robot is configured to deliver specific goods to be sorted to a specific sorting position, and the sorting component carrying the specific goods to be sorted corresponds to the specific sorting position. The sorting method includes:

S310: the plurality of sorting components respectively receiving goods to be sorted;

S330: a designated sorting component being raised or lowered to a height corresponding to the sorting position under drive of the lifting mechanism; and S350: the designated sorting component performing an action to deliver the goods to be sorted that is placed on the sorting component to the corresponding sorting position.

In the foregoing sorting method, the lifting mechanism and the sorting mechanism work in coordination with each other, thereby realizing the automation of goods sorting, reducing the cost of goods sorting, and greatly improving the efficiency of goods sorting. In addition, the sorting mechanism is moved to different heights under drive of the lifting mechanism, so that the goods to be sorted can be delivered to the sorting positions having different heights, which leads to strong universality and a reduction in the occupation of the sorting positions.

In a possible implementation, each part of the sorting robot performs actions in a coordinated manner under the control of the control center, and the control center of the sorting robot keeps a communication connection with an external server. The sorting robot can identify information of the goods to be sorted, and the sorting robot can obtain information of the sorting position corresponding to each of the goods to be sorted. The sorting robot coordinates and controls various parts according to the obtained information, to efficiently complete the sorting of goods. In the sorting robot and sorting method provided in the foregoing embodiments, the sorting component performs the delivery action only when the information of the goods to be sorted carried by the sorting component corresponds to the information of the sorting position.

Figure 38:
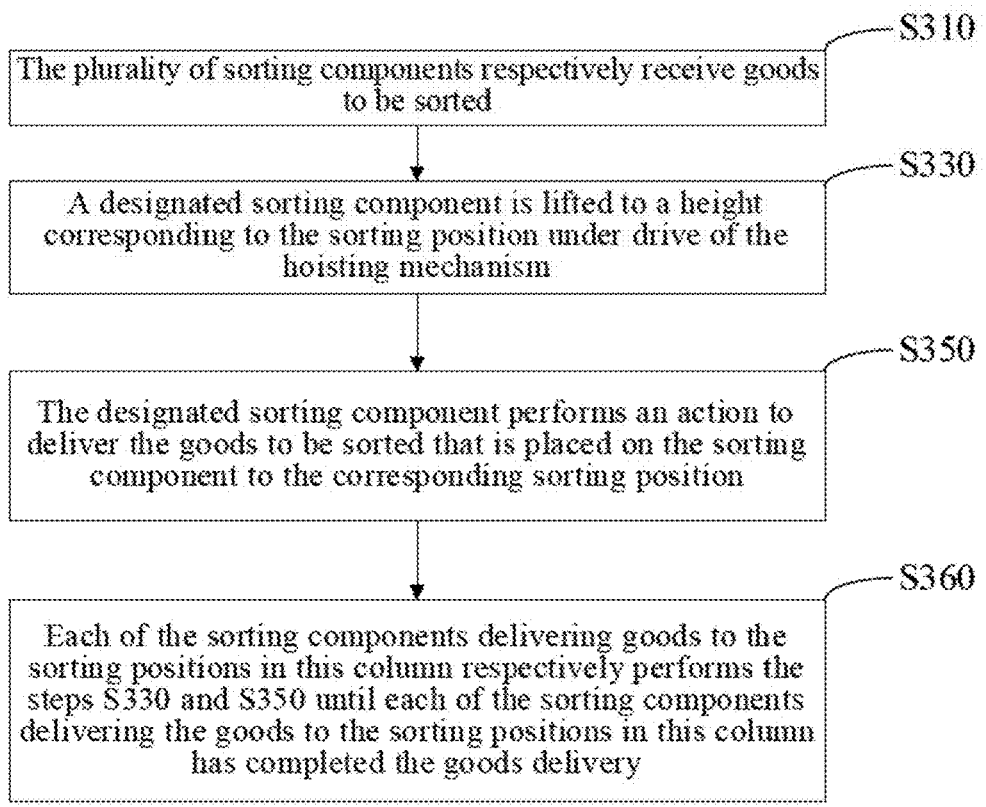
FIG. 38 is a sorting method according to another embodiment of the present invention.

In an embodiment of the present invention, as shown in FIG. 38, the plurality of sorting positions are disposed at intervals along the vertical direction; and after the step S350, the sorting method further includes step S360: each of the sorting components delivering goods to the sorting positions in this column respectively executing the steps S330 and S350 until each of the sorting components delivering goods to the sorting positions in this column has completed the goods delivery. The sorting robot provided in this embodiment can carry a plurality of goods to be sorted at a time. The lifting mechanism drives the plurality of sorting components to first deliver the goods to be sorted to a column of sorting positions, which gives full play to the advantages of the sorting mechanism being able to rise or fall, and effectively improves the overall sorting efficiency of the sorting robot.

Figure 39:
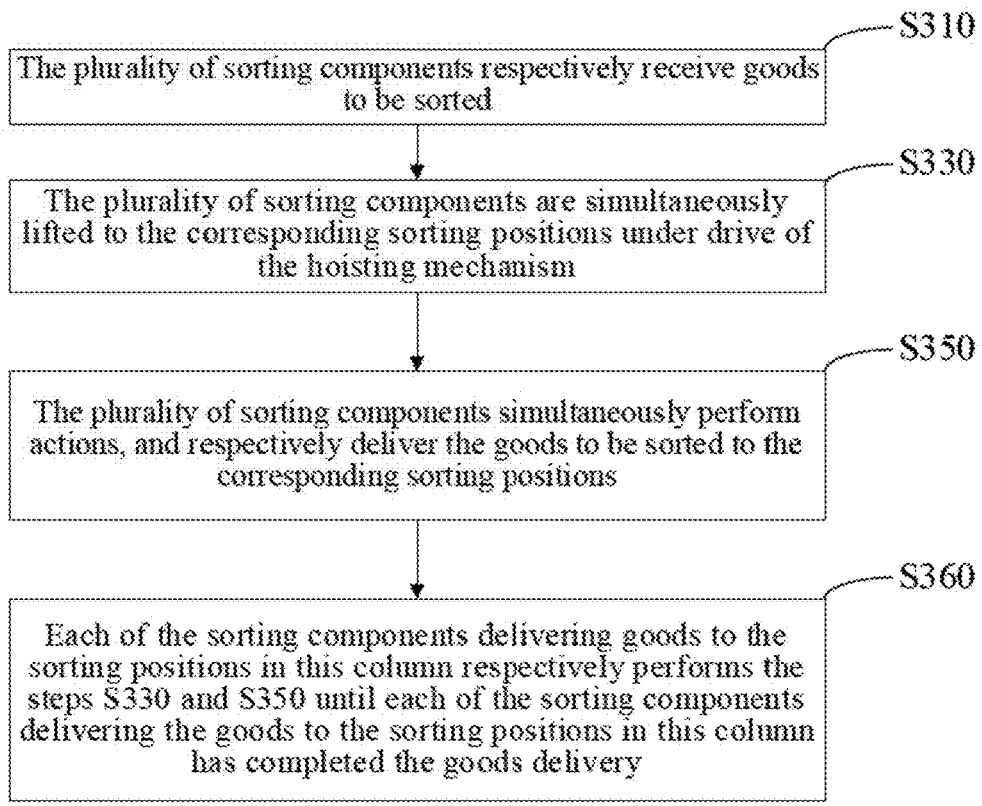
FIG. 39 is a sorting method according to still another embodiment of the present invention.

Optionally, during the synchronous rising or falling of the plurality of sorting components, only one sorting component is raised or lowered to the corresponding sorting position height, or the plurality of sorting components are simultaneously raised or lowered to the corresponding sorting position heights. In an implementation of the present invention, as shown in FIG. 39, in the step S330, the plurality of sorting components are simultaneously raised or lowered to the corresponding sorting positions under drive of the lifting mechanism; and in the step S350, the plurality of sorting components simultaneously perform actions, to respectively deliver the goods to be sorted to the corresponding sorting positions. The step of simultaneously performing actions by the plurality of sorting components effectively eliminates a waiting time caused by performing delivery actions sequentially among the plurality of sorting components, and effectively improves the overall sorting efficiency of the sorting robot.

It may be understood that, the height difference between the plurality of sorting positions with different heights is the same as or different from the height difference between the plurality of sorting components. When the height difference between the plurality of sorting positions is the same as the height difference between the plurality of sorting components, the plurality of sorting components can be simultaneously lifted to the corresponding sorting positions under drive of the circulating lifting mechanism. When the height difference between the plurality of sorting positions is different from the height difference between the plurality of sorting components, the height difference between the plurality of sorting components may be adjusted until being adapted to the height difference between the corresponding sorting positions, and then the plurality of sorting components simultaneously perform actions to respectively deliver the goods to be sorted to the corresponding sorting positions.

It may be understood that, in the foregoing embodiments, the plurality of sorting components can simultaneously correspond to different sorting positions in height respectively, but the sorting components perform the delivery action only after the information of the goods to be sorted carried by the sorting components correspond to the information of the sorting position. Therefore, in actual working conditions, there will be the following working conditions: the plurality of sorting components simultaneously correspond to different sorting positions in height respectively, but the information of the goods to be sorted carried by only one sorting component corresponds to the information of the sorting position. In the working condition, only this sorting component performs the delivery action.

In an embodiment of the present invention, the sorting components each includes two opposite delivery directions, and two ends of the plurality of sorting components in the delivery direction are respectively provided with a plurality of sorting positions disposed at intervals along the vertical direction; in the step S330, the plurality of sorting components are simultaneously raised or lowered to the corresponding sorting positions on the corresponding side; and in the step S350, the plurality of sorting components simultaneously perform actions, to deliver the goods to be sorted to the corresponding sorting positions on the corresponding side. The sorting method provided in this embodiment allows the sorting robot to simultaneously deliver the goods to be sorted to the sorting positions at two ends in the delivery direction, which not only improves the adaptability of the sorting method to actual working conditions, but also effectively improves the overall sorting efficiency of the sorting robot.

In an embodiment of the present invention, two sorting components are disposed at each vertical height where the sorting component is installed on the vertical framework, and delivery directions of the two sorting components located at the same vertical height are opposite; the two sides of the plurality of sorting components in the delivery direction are respectively provided with a plurality of sorting positions disposed at intervals along the vertical direction; in the step S330, the plurality of sorting components are simultaneously raised or lowered to the corresponding sorting positions on the corresponding side; and in the step S350, the plurality of sorting components simultaneously perform actions, to deliver the goods to be sorted to the corresponding sorting positions on the corresponding side. The sorting method provided in this embodiment allows the sorting robot to simultaneously deliver the goods to be sorted to the sorting positions on two sides in the delivery direction, which not only improves the adaptability of the sorting method to actual working conditions, but also effectively improves the overall sorting efficiency of the sorting robot.

Figure 40:
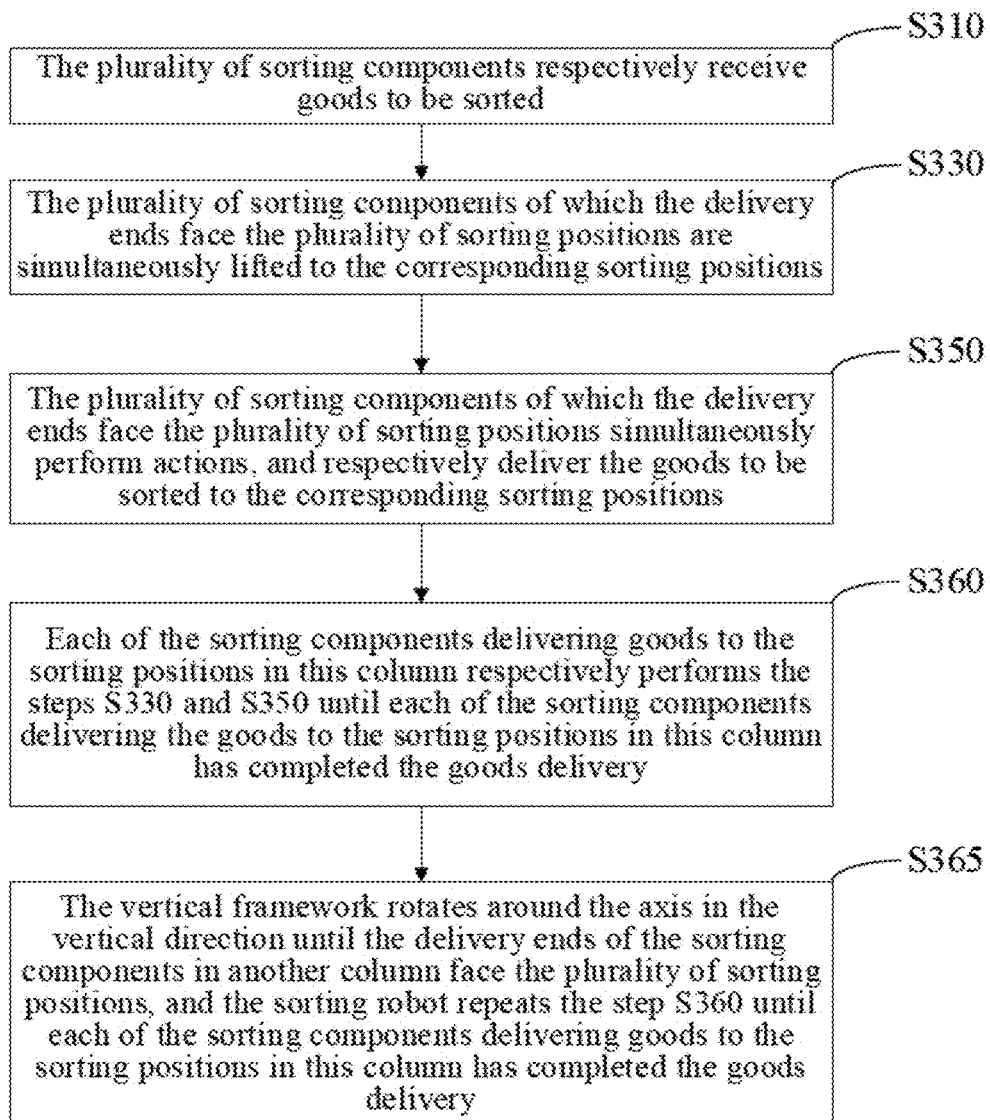
FIG. 40 is a sorting method according to still another embodiment of the present invention.

In an embodiment of the present invention, as shown in FIG. 40, in order to further improve the adaptability of the sorting robot and the sorting method to actual working conditions and improve the sorting efficiency of the sorting robot and the sorting method, the vertical framework is disposed rotatably around an axis in the vertical direction on the chassis, two sorting components are disposed at each vertical height where the sorting component is installed on the vertical frame, delivery ends of the plurality of sorting components disposed in a same column are oriented in a same direction, and delivery ends of the sorting components in two columns are oriented oppositely; in the step S330, the plurality of sorting components of which the delivery ends face the plurality of sorting positions are simultaneously raised or lowered to the corresponding sorting positions; in the step S350, the plurality of sorting components of which the delivery ends face the plurality of sorting positions simultaneously perform actions, to deliver the goods to be sorted to the corresponding sorting positions; and after the step S360, the sorting method further includes step S365: the vertical framework rotating around the axis in the vertical direction until the delivery ends of the sorting components in another column face the plurality of sorting positions, and the sorting robot repeating the step S360 until each of the sorting components delivering goods to the sorting positions in this column has completed the goods delivery. The sorting method and the sorting robot in this embodiment allow carrying of more goods to be sorted, and ensure orderly delivery of goods by the sorting robot by using a way of delivering one side first and then the other side, thereby improving the overall sorting efficiency of the sorting robot.

In an embodiment of the present invention, the sorting component includes a first sorting position and a second sorting position along a direction in which the sorting component delivers goods, the first sorting position and the second sorting position are respectively configured to carry goods to be sorted, and when the sorting component delivers goods to be sorted at the first sorting position to the corresponding sorting position, the goods to be sorted originally located at the second sorting position move to the first sorting position; in the step S330, the sorting component is raised or lowered to a height of the sorting position corresponding to the goods to be sorted at the first sorting position; and in the step S350, the sorting component delivers the goods to be sorted that is placed at the first sorting position to the corresponding sorting position. The sorting method and the sorting robot in this embodiment can not only carry more goods to be sorted, but when the goods to be sorted at the first sorting position are delivered, the goods to be sorted originally located in the second sorting position move to the first sorting position, and no additional structure is required to convey the goods to be sorted originally located at the second sorting position to the first sorting position, and there is no need for the time for waiting the goods to be sorted originally located in the second sorting position to move to the first sorting position as well, thereby improving the overall sorting efficiency of the sorting robot.

Figure 41:
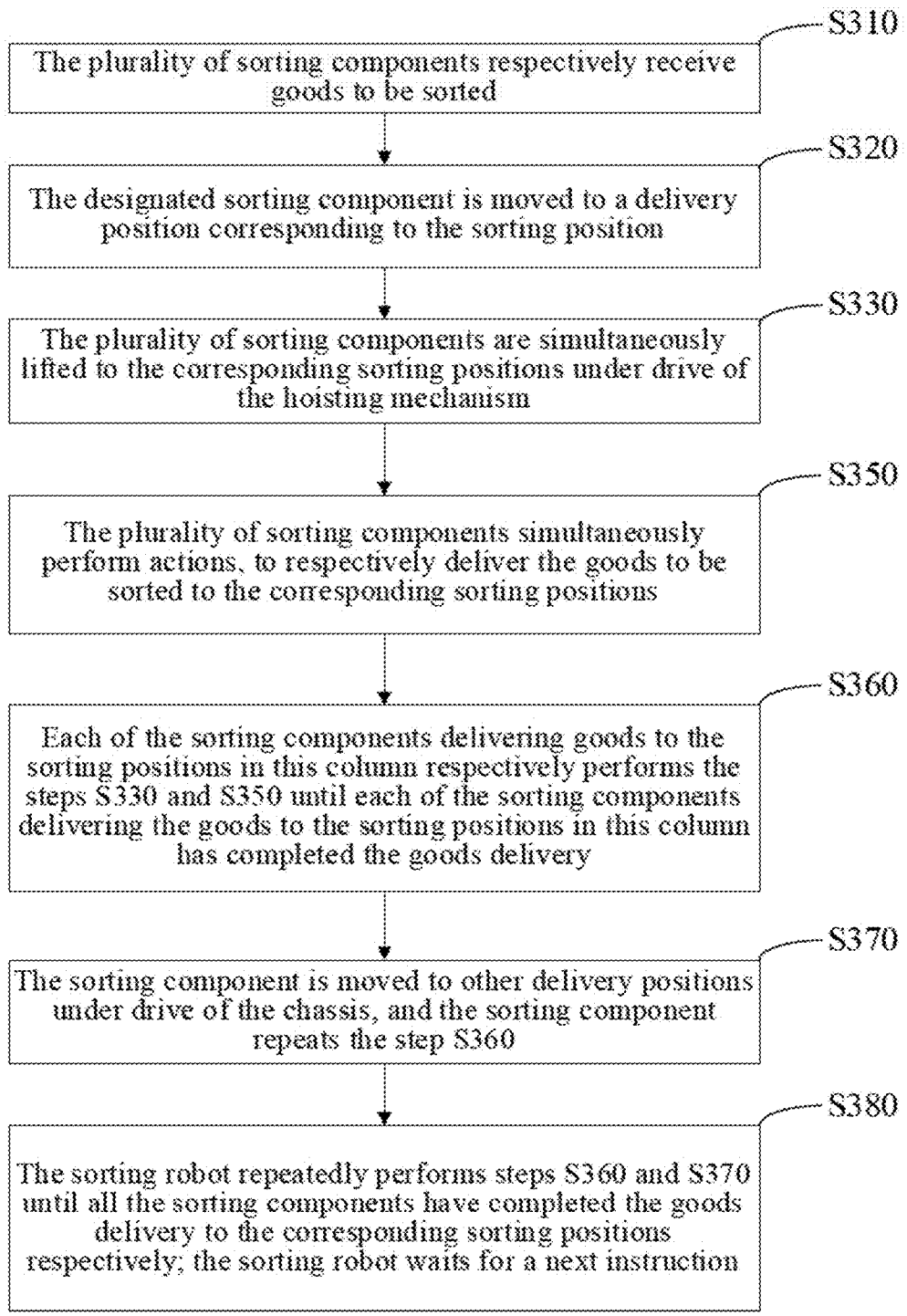
FIG. 41 is a sorting method according to still another embodiment of the present invention.

In an embodiment of the present invention, in the actual working condition, the plurality of columns of sorting positions are disposed in sequence along the horizontal direction. As shown in FIG. 41, after the step S350, the sorting method further includes step S360: the sorting component being moved to other delivery positions under drive of the chassis, and the sorting component repeating the step S360. The sorting robot provided in this embodiment preferentially completes the delivery of the goods to be delivered to a column of sorting positions, and then the chassis drives the sorting component to other delivery positions to deliver the goods to other columns of sorting positions. The sorting method provided in this embodiment effectively ensures that the sorting robot delivers the goods to be sorted column by column, thereby avoiding time waste caused by the sorting robot repeatedly going back and forth to the same delivery position.

in the foregoing embodiments, after the sorting robot completes delivering to a column of sorting positions from one delivery position, the sorting robot may move to an adjacent column of sorting positions, or may move to a spaced column of sorting positions according to an actual working condition. In a possible implementation, after the sorting robot completes delivering to a column of sorting positions from one delivery position, the sorting robot preferentially is moved to the adjacent column of sorting positions. Further, as shown in FIG. 41, after the step S370, the sorting method further includes step S380: the sorting robot repeating the steps S360 and S370 until all the sorting components have completed the goods delivery to the corresponding sorting positions respectively; and the sorting robot waiting for a next instruction. The sorting method provided in this embodiment effectively ensures that each piece of the goods to be sorted is delivered in a case that the sorting efficiency is improved.

In an embodiment of the present invention, the sorting robot includes two sorting mechanisms, the two sorting mechanisms are respectively disposed on two sides of the vertical framework, and are respectively configured to be raised or lowered under drive of the lifting mechanism, and a spacing between the two sorting mechanisms along a horizontal arrangement direction of the sorting position is an integer multiple of a spacing between neighboring ones of the plurality of columns of the sorting positions along the horizontal direction; and each of the sorting mechanisms simultaneously and independently executes the step S360. The two sorting mechanisms disposed on the vertical framework can multiply the number of goods to be sorted carried by the sorting robot, which significantly improves the overall sorting efficiency of the sorting robot. On the premise of the same amount of sorting tasks, the travel of the sorting robot between receiving and delivering goods is effectively saved. It may be understood that, the sorting method provided in this embodiment can also simultaneously deliver the goods to be sorted to the sorting positions on two sides in the delivery direction of the sorting component.

Figure 42:
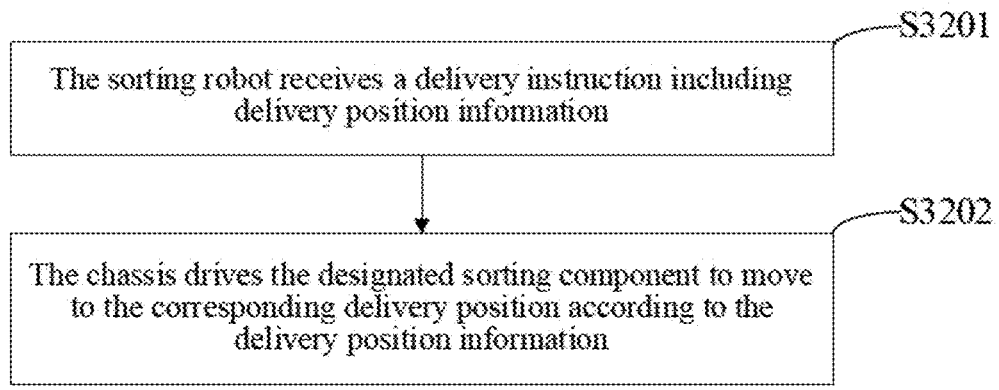
FIG. 42 shows a detailed process of step S320 according to an embodiment of the present invention.

In an actual working condition, when a receiving position for receiving the goods is different from a delivery position for delivering the goods, the sorting robot needs to go back and forth between the receiving position for receiving the goods and the delivery position for delivering the goods. In an embodiment of the present invention, as shown in FIG. 41, before the step S330, the sorting method further includes step S320: the designated sorting component being moved to a delivery position corresponding to the sorting position. Specifically, as shown in FIG. 42, the step S320 includes:

S3201: the sorting robot receiving a delivery instruction including delivery position information;

S3202: the chassis driving the designated sorting component to move to the corresponding delivery position according to the delivery position information.

Further, the step S3203 includes:

S32021: the chassis driving the sorting robot to move until the sorting component approaches the sorting area of the shelving unit.

S32023: the chassis driving the sorting robot to move along the horizontal extension direction of the shelving unit until the sorting component moves to a delivery position corresponding to the sorting position.

Specifically, after the step S32021, the sorting method further includes step S32022: the chassis driving the sorting robot to move until the sorting component approaches a sorting area of the shelving unit.

In an actual working condition, when a receiving position for receiving the goods is different from a delivery position for delivering the goods, the sorting robot needs to go back and forth between the receiving position for receiving the goods and the delivery position for delivering the goods. In an embodiment of the present invention, as shown in FIG. 43, the step S310 includes:

S3101: the sorting robot receiving a receiving instruction including receiving position information;

S3102: the chassis driving the sorting robot to move to a corresponding receiving position according to the receiving position information; and S3104: the plurality of sorting components carrying goods to be sorted which are conveyed onto the plurality of sorting components.

Figure 43:
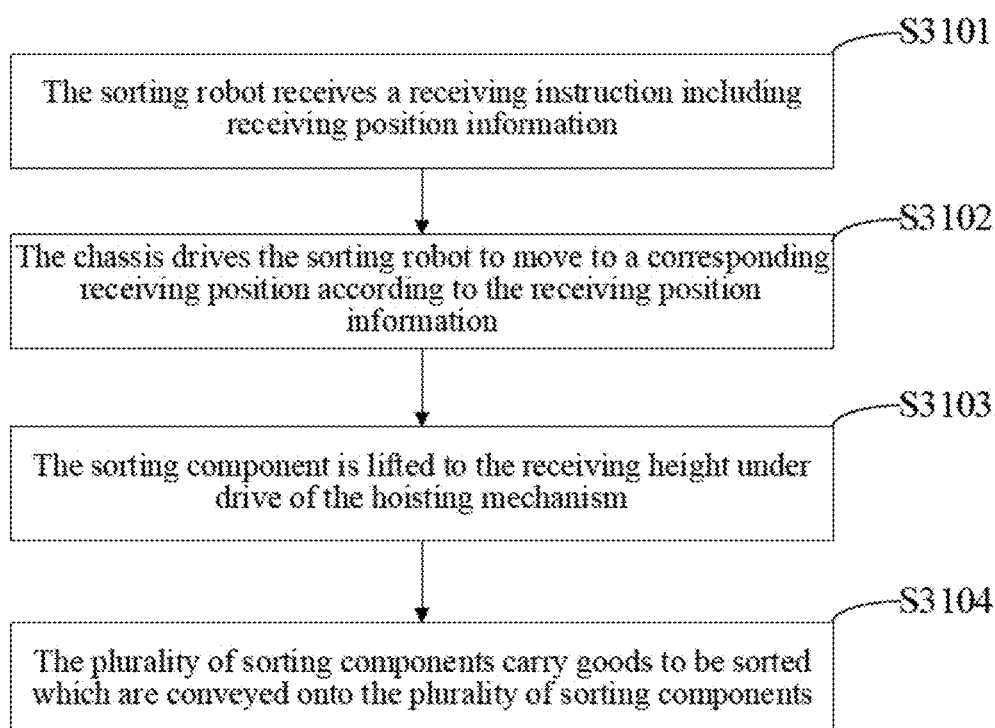
FIG. 43 shows a detailed process of step S310 according to an embodiment of the present invention.

Further, as shown in FIG. 43, the sorting component has a receiving height when receiving goods, and after the step S3102, the sorting method further includes step S3103: the sorting component being raised or lowered to the receiving height under drive of the lifting mechanism. The step in which the sorting component is raised or lowered to the receiving height under drive of the lifting mechanism improves the efficiency of the sorting robot for receiving goods.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of the present disclosure, and their description is specific and detailed, but cannot therefore be understood as a limitation to the patent scope of the present invention. It should be noted that, a person of ordinary skill in the art may further make some variations and improvements without departing from the concept of the present invention, and the variations and improvements belong to the protection scope of the present invention. Therefore, the protection scope of the patent of the present invention shall be topic to the claims.

What is claimed is:

1. A sorting robot, comprising:
   a chassis, capable of moving on ground;
   a vertical framework, fixedly disposed on the chassis, and disposed along a vertical direction;
   a lifting mechanism, capable of rising or falling along a vertical direction relative to the vertical framework;
   a sorting mechanism, disposed movably along the vertical direction on the vertical framework, wherein the sorting mechanism is connected to the lifting mechanism, the sorting mechanism can be raised or lowered along the vertical direction under drive of the lifting mechanism, the sorting mechanism is synchronically raised or lowered with goods to be sorted, and the sorting mechanism can deliver the goods to be sorted to a corresponding sorting position;
   a control center, respectively electrically connected to the chassis, the lifting mechanism, and the sorting mechanism, wherein the control center is configured to control the chassis, the lifting mechanism, and the sorting mechanism to individually or jointly perform an action; and
   a storing mechanism, the storing mechanism being disposed on the vertical framework, the storing mechanism being configured to store the goods to be sorted, the storing mechanism being configured to convey the goods to be sorted to the sorting mechanism when performing an action, or the sorting mechanism being capable of conveying goods to the storing mechanism;
   the storing mechanism comprises a plurality of storing components, the plurality of storing components are disposed in a plurality of columns on the vertical framework, the sorting mechanism being capable of simultaneously corresponding to the plurality of storing components of the same height when being raised or lowered, and the sorting mechanism being capable of flipping around an axis in a horizontal direction at a set angle;
   each of the plurality of storing components comprises a storing bracket and a storing action platform, the storing bracket is fixedly disposed on the vertical framework, the storing action platform is disposed on the storing bracket, the storing action platform is configured to store the goods to be sorted and convey the goods to be sorted to the sorting mechanism through a platform surface action when performing an action.

2. A sorting method, applicable to the sorting robot according to claim 1, wherein the sorting robot is configured to deliver particular goods to be sorted to a particular sorting position, the sorting mechanism carrying the particular goods to be sorted corresponding to the particular sorting position, and the sorting method comprises:
   S130: the sorting mechanism receiving the goods to be sorted;
   S140: the sorting mechanism being raised or lowered to a height corresponding to the sorting position under drive of the lifting mechanism; and
   S160: the sorting mechanism performing an action to deliver the goods to be sorted that is placed on the sorting mechanism to the corresponding sorting position.

3. The sorting method according to claim 2, wherein before the step S130, the sorting method further comprises step S110: the storing action platform receiving the goods to be sorted; and in the step S130, the storing action platform performing an action to convey the goods to be sorted to the sorting mechanism.

4. The method according to claim 3, wherein the plurality of storing components being disposed at intervals on the vertical framework along the vertical direction, the storing component conveying the goods to be sorted to the sorting mechanism when performing an action, and the sorting mechanism being capable of delivering the goods to be sorted to the corresponding sorting position, or the sorting mechanism being capable of conveying the goods to a corresponding storing component; in the step S110, a plurality of storing action platforms of the plurality of storing components respectively receive the goods to be sorted; in the step S130, the storing action platform of a particular storing component conveys the goods to be sorted to the sorting mechanism; and after the step S160, the sorting method further comprises step S170: the sorting robot repeating the steps S130 to S160 until all goods to be sorted that need to be delivered to the sorting positions in a column have been delivered.

5. The sorting method according to claim 4, wherein a plurality of columns of the sorting positions are sequentially disposed along a horizontal direction, and after the step S170, the sorting method further comprises step S180: the sorting mechanism being moved to another delivery position under drive of the chassis, and the sorting robot repeating step S170.

6. The sorting method according to claim 5, wherein after the step S180, the sorting method further comprises step S190: the sorting robot repeating the steps S170 and S180 until all goods to be sorted carried by the storing component have been delivered, and the sorting robot waiting for a next instruction.

7. The sorting method according to claim 4, wherein in the step S160, the sorting mechanism flips at the set angle to deliver the goods to be sorted placed on the sorting mechanism to the corresponding sorting position.

8. The sorting method according to claim 4, wherein the step S130 comprises:
   S1301: the sorting mechanism being raised or lowered to a height of a corresponding storing component under the drive of the lifting mechanism; and
   S1303: the storing action platform performing an action to convey the goods to be sorted to the sorting mechanism.

9. The sorting method according to claim 8, wherein the sorting mechanism comprises a sorting bracket and a sorting action platform, the sorting bracket being disposed movably along the vertical direction on the vertical framework, the sorting bracket being connected to the lifting mechanism, the sorting bracket being capable of being raised or lowered along the vertical direction under the drive of the lifting mechanism, the sorting action platform being disposed rotatably on the sorting bracket, the sorting action platform being capable of rotating in a horizontal plane relative to the sorting bracket, the sorting action platform being capable of carrying the goods to be sorted, and the sorting action platform delivering the goods to be sorted to the corresponding sorting position when performing an action, or the sorting mechanism being capable of conveying the goods to the storing component; and after the step S1301, the sorting method further comprises step S1302: the sorting action platform rotating in the horizontal plane relative to the sorting bracket until a receiving end of the sorting action platform faces the storing component.

10. The sorting method according to claim 4, wherein the step S110 comprises:

S1101: the sorting robot receiving a receiving instruction, and the receiving instruction comprising receiving position information;

S1102: the chassis driving the sorting robot to move to a corresponding receiving position according to the receiving position information; and S1103: the storing action platform receiving the goods to be sorted.

11. The sorting method according to claim 10, wherein the sorting mechanism has a receiving height when receiving the goods, and the step S1103 comprises:

S11031: the sorting mechanism being raised or lowered to the receiving height under the drive of the lifting mechanism;

S11032: the sorting mechanism receiving goods to be sorted;

S11033: the sorting mechanism carrying the goods being raised or lowered to the height corresponding to the storing action platform;

S11035: the sorting mechanism performing an action to convey the carried goods to the corresponding storing action platform; and S11036: repeating the steps S11031 and S11035 until there are goods respectively stored on all the storing components, or the sorting mechanism is empty.

12. The sorting method according to claim 11, wherein the sorting mechanism comprises a sorting bracket and a sorting action platform, the sorting bracket being disposed movably along the vertical direction on the vertical framework, the sorting bracket being connected to the lifting mechanism, the sorting bracket being capable of being raised or lowered along the vertical direction under the drive of the lifting mechanism, the sorting action platform being disposed rotatably on the sorting bracket, the sorting action platform being capable of rotating in a horizontal plane relative to the sorting bracket, the sorting action platform being capable of carrying the goods to be sorted, and the sorting action platform delivering the goods to be sorted to the corresponding sorting position when performing an action, or the sorting mechanism being capable of conveying the goods to the storing component; and after the step S11033, the sorting method further comprises step S11034: the sorting action platform rotating in the horizontal plane relative to the sorting bracket until a goods exit end of the sorting action platform faces the corresponding storing component.

13. The sorting method according to claim 2, wherein the sorting mechanism comprises a sorting bracket and a sorting action platform, the sorting bracket being disposed movably along the vertical direction on the vertical framework, the sorting bracket being connected to the lifting mechanism, the sorting bracket being capable of being raised or lowered along the vertical direction under the drive of the lifting mechanism, the sorting action platform being disposed rotatably on the sorting bracket, the sorting action platform being capable of rotating in a horizontal plane relative to the sorting bracket, the sorting action platform being capable of carrying the goods to be sorted, and the sorting action platform delivering the goods to be sorted to the corresponding sorting position when performing an action, or the sorting action platform being capable of conveying the goods to the storing mechanism; and before the step S160, the sorting method further comprises step S150: the sorting action platform rotating in the horizontal plane relative to the sorting bracket until a delivery end of the sorting action platform faces the corresponding sorting position.

14. The sorting method according to claim 2, wherein before the step S130, the sorting method further comprises step S120: the sorting robot moving to a delivery position corresponding to the sorting position.

15. The sorting method according to claim 14, wherein the step S120 comprises:

S1201: the sorting robot receiving a delivery instruction comprising delivery position information; and S1202: the chassis driving the sorting robot to move to the delivery position corresponding to the sorting position according to the delivery position information.

* * * * *